US005933392A

United States Patent [19]

Sato et al.

[11] Patent Number: 5,933,392

[45] Date of Patent: Aug. 3, 1999

[54] ELECTRONIC WATCH

[75] Inventors: Koichi Sato; Fumio Kanno, both of Tokyo, Japan

[73] Assignee: Citizen Watch Co., Ltd., Tokyo, Japan

[21] Appl. No.: 08/717,260

[22] Filed: Sep. 20, 1996

[30] Foreign Application Priority Data

| | | | |
|---|---|---|---|
| Sep. 20, 1995 | [JP] | Japan | 7-241360 |
| Sep. 20, 1995 | [JP] | Japan | 7-241364 |
| Oct. 3, 1995 | [JP] | Japan | 7-256057 |

[51] Int. Cl.$^{6}$ .......... G04B 19/00; G05B 19/40; H02P 8/00

[52] U.S. Cl. .......... 368/157; 318/685; 318/696

[58] Field of Search .......... 368/80, 157, 160, 368/200, 204; 318/685, 696

[56] References Cited

U.S. PATENT DOCUMENTS

| | | | |
|---|---|---|---|
| 4,192,131 | 3/1980 | Hosokawa et al. | 368/157 |
| 4,326,278 | 4/1982 | Shida et al. | 368/157 |
| 4,340,946 | 7/1982 | Kanno et al. | 368/76 |
| 4,370,065 | 1/1983 | Kawamura et al. | 368/157 |
| 4,382,691 | 5/1983 | Shida et al. | 368/157 |
| 5,247,235 | 9/1993 | Tu et al. | 318/685 |

FOREIGN PATENT DOCUMENTS

| | | |
|---|---|---|
| 0 510 730 A2 | 10/1992 | European Pat. Off. . |
| 1 764 894 A1 | 3/1997 | European Pat. Off. . |
| 52-080063 | 7/1977 | Japan . |
| 63-058192 | 3/1988 | Japan . |

*Primary Examiner*—Vit Miska
*Attorney, Agent, or Firm*—Scully, Scott, Murphy and Presser

[57] ABSTRACT

An electronic watch 400 which comprises a power supply 401 and a watch circuit 402. The watch circuit 402 comprises an oscillator circuit 403, a frequency divider circuit 404, a drive pulse generation means 405, a drive motor 406 which, in response to a drive pulse P1 that is output by the above-noted drive pulse generation means 405, drives at least one of the hour/minute, second, and functional hands including chronograph hands, a drive circuit means 407 which controls the drive of the drive motor 406, a drive circuit control means 408 which controls the above-noted drive circuit means 407, and a control condition detection means 409 which is connected to the above-noted drive circuit control means 408 and which detect the control condition in the drive circuit control means 408, the control condition detection means 409 being provided with a non-proper condition detection means 410 which senses the occurrence of a condition in which it is not possible to properly drive the above-noted drive motor 406 under a prescribed condition in a prescribed control mode currently being executed, and a control mode change-instructing means 411 which, in response to a detection signal of the above-noted non-proper condition detection means 410, issues an instruction to the drive circuit control means 408 to change the control mode currently being executed.

23 Claims, 18 Drawing Sheets

H3a
d1
d2
d3
d4
d5
d6
H3
G

Vo1
P1
V6
Vth
5msec
V3
V4
V5

Vo2
V2
Vth
V1

Pk
Pk3
Pk2
Pk1
Pkn
Pkn+1
Pk7
Pk13
Pkn+6
6 msec
t1
t2
t3
t4
t5
t6

H2
d'5
d4
d3
d1
d2
d5
H1
G

O2
P2
V5
Vth

5msec
O1
V4
Vth

V1 V2 V3
Pk3
Pk2
Pk1
Pk4
Pk5
Pk13

6 msec
t1 t2 t3 t4 t5

ELECTRONIC WATCH

BACKGROUND OF THE INVENTION

1. Field of the Invention

The present invention relates to an electronic watch, and more specifically it relates to an electronic watch having a drive motor which is driven by a normal hand-movement drive pulse and a drive motor which is driven by a non-normal hand-movement drive pulse that differs from the above-noted normal hand-movement drive pulse, so that even if the power supply voltage or drive conditions change, a proper drive condition is maintained for the drive motor which is driven by a normal hand-movement drive pulse, and which can also achieve low-power-consumption operation 2. Description of the Related Art There is a usual type of stepping motor for an electronic watch rotates in the forward direction only in response to, for example, an input signal, and is configured so as not top rotate in the reverse direction.

For this reason, if it is desirable to cause the rotor to rotate in the reverse direction, for example to set the hand positions, it is necessary to perform drive with a special reverse drive pulse.

A disclosure of such a special reverse drive pulse was made in Japanese Unexamined Patent Publication (KOKAI) No. 52-80063, in which there is a reverse-rotation pulse in which two alternating pulses form one group, and a reverse-rotation pulse in which three alternating pulses form one group.

Of late, many solar cell watches, which have a solar cell, the light incident to which is converted to electrical energy, which is stored in a capacitor or secondary cell, this capacitor or secondary cell being used as the drive source.

In this type of solar cell watch, electrical energy is generally stored during the day and discharged during the evening, and there is a considerable variation in the voltage of the capacitor or secondary cell over even a period of one day.

Therefore, in this type of solar cell watch in particular, it is desirable that a stepping motor operates normally with as low a voltage as possible.

However, the reverse rotation operation of the above-noted stepping motor exhibits a narrower range of operating voltage than for forward operation, and it is particularly difficult to achieve normal operation at a low voltage.

Additionally, because the drive frequency for fast forward drive is high, the pulse width must be made narrow, making normal operation at a low voltage difficult.

An example of a system for hand movement in an electronic watch having a stepping motor in the past is disclosed in Japanese Unexamined Patent Publication (KOKAI) No. 63-58192, in which the rotation and non-rotation of the rotor are detected, and when the rotor is non-rotating, load compensation is performed by outputting a compensation drive pulse, thereby causing the stepping motor to rotate reliably, and to drive, via the gear train, the second hand, minute hand, and hour hand.

The disclosure of Japanese Unexamined Patent Publication (KOKAI) No. 63-58192 will be generally explained, with reference made to FIG. 1, FIG. 2, and FIG. 3. FIG. 1 is a block diagram of a electronic watch of the past.

FIG. 2 and FIG. 3 are waveform diagrams which show the rotation detection operation of the load compensation of the electronic watch which is shown in FIG. 1, in which FIGS. 2 (*a*), (*b*), (*c*), and FIGS. 3 (*a*), (*b*), and (*c*) are approximately the same as FIGS. 4, 5, 6, 7, 8, and 9 in the Japanese Unexamined Patent Publication (KOKAI) No. 63-58192.

In FIG. 1, the normal watch section 200 corresponds to the FIG. 1 in the Japanese Unexamined Patent Publication (KOKAI) No. 63-58192, this drawing having been simplified for the purpose of the description.

In this drawing, the reference numeral 10 denotes a first stepping motor, 13 is a first rotor which is a rotor of the first stepping motor 10, 201 is an oscillator circuit, 202 is a frequency divider circuit, 203 is a normal drive pulse generation circuit, 204 is a compensation drive pulse generation circuit, 205 is a coil switching pulse generation circuit, 206 is a drive pulse supply means, 207 is a load compensation control circuit, 208 is a coil switching pulse supply means, 209 is a drive circuit, and 210 is a detection circuit.

In this same drawing, 300 is a chronograph section, 20 is a second stepping motor, 301 is a chronograph pulse generation circuit, 302 is a chronograph pulse supply means, 303 is a second drive circuit, 116 is an S switch, and 117 is an R switch.

The normal watch section 200 will be described first. The oscillator circuit 201 outputs a 32768-Hz signal, based on the oscillation of a quartz crystal. The frequency divider circuit 202 divides the frequency of this signal.

The normal drive pulse generation circuit 203 generates a normal drive pulse P1 as shown in FIG. 2 (*b*), based on a signal of the frequency divider circuit 202.

The normal drive pulse P1 is a 5-ms pulse which has a ¼-ms pulse resting period in every 1 ms. The compensation drive pulse generation circuit 204 generates a compensation drive pulse pH when it is judged that the first stepping motor 10 cannot rotate, as will be described later, based on a signal of the frequency divider circuit 202.

The coil switching pulse generation circuit 205 generates the coil switching pulses Pk1 through Pk13 such as shown in FIG. 2 (*d*), based on a signal of the frequency divider circuit 202. The coil switching pulse Pk1 is from Pk2 are sequentially output. Each of the coil switching pulses Pk has a pulse width of 0.125 ms.

The normal drive pulse P1 which is output by the normal drive pulse generation circuit 203 is supplied to the drive circuit 209 via the drive pulse supply means 206.

Then pulses are alternately supplied to the first stepping motor 10 from the coil terminals O1 and O2, the first rotor 13 rotating, at which time the current waveforms H3 and H4, shown in FIG. 2 (*a*) and FIG. 3 (*a*), are generated.

The current waveform H3 is the waveform when the first rotor 13 could rotate, and the current waveform H4 is the waveform when the first rotor 13 could not rotate.

The current waveforms H3 and H4, as shown by the current waveforms H3*a* and H4*a*, are considerable different current waveforms from the point in time after the normal drive pulse P1 is finished being output.

The detection of rotation and non-rotation conditions is judged by detecting the difference in these current waveforms by detecting the difference in the induced voltage when the coil switching pulse Pk is applied to the drive circuit of the first stepping motor 10.

That is, as shown in FIG. 2 (*d*) and FIG. 3 (*d*), at an elapsed time of 6 ms, at which point the rotation of the first rotor 13 has not completely finished, the coil switching pulse form the coil switching pulse generation circuit 205 is applied to the drive circuit 209 via the coil switching pulse supply means 208.

It is then output to the first stepping motor 10 from the coil terminal O2.

The detection circuit 210 detects whether or not the induced voltage V1 at this time exceeds the threshold voltage Vth. The load compensation control circuit 207 receives the results of this detection, and in the case in which the induced voltage V1 does not exceed the threshold voltage Vth, the next coil switching pulse Pk2 is output from the coil terminal O2.

If the induced voltage does not exceed the threshold voltage Vth, this repeated until the coil switching pulse Pk13 is output from the coil terminal O2.

If none of the induced voltages for all the coil switching pulses Pk1 through Pk13 exceeds the threshold voltage Vth, the load compensation control circuit 207 judges that the first stepping motor 10 did not rotate, and performs controls of the drive pulse supply means 206 so as to output a compensation drive pulse which is generated by the compensation drive pulse generation circuit 204, thereby causing the first stepping motor 10 to rotate, via the drive circuit 209.

However, if one of the Pk coil switching pulses Pkn has an induced voltage Vn which exceeds the threshold voltage, the next coil switching pulse Pkn+1 is switched so as to be output not from the coil terminal O2, but rather from the coil terminal O1.

Then once again the detection is performed by the detection circuit 210 of whether or not the induced voltage of, for example, coil switching pulses Pkn+1 through Pkn+6 exceed the threshold voltage Vth.

The load compensation control circuit 207 receives the results of this detection and, if even at least one of the induced voltages Vn+1 through Vn+6 of coil switching pulse Pkn+1 to Pknt+6, exceeded the threshold voltage, the judgment is made that the first stepping motor 10 has rotated, and the load compensation control circuit 207 controls the drive pulse supply means 206 so as not to output a compensation drive pulse Ph which is generated by the compensation drive pulse generation circuit 204.

If, however, not even one of the induced voltages Vn+1 through Vn+6, exceeded the threshold voltage, the judgment is made that the first stepping motor 10 did not rotate, the output of coil switching pulses Pkn+7 and thereafter being stopped, and the load compensation control circuit 207 performing control of the drive pulse supply means 206 so that a compensation drive pulse which is generated by the compensation drive pulse Ph generation circuit 204 is output to the first stepping motor 10, thereby compensation for the delay caused by non-rotation.

The above-noted detection of rotation and non-rotation will next be described in further detail. FIG. 2 (*a*) shows the current waveform H3 occurring when the first stepping motor 10 rotates normally, and FIG. 2 (*b*) and (*c*) show the voltages Vo1 and Vo2 occurring at this time at coil terminals O1 and O2.

FIG. 3 (*a*) shows the current waveform H4 which occurs when the first stepping motor load is heavy and it could not rotate, while FIGS. 3 (*b*) and (*c*) show the voltages Vo1 and Vo2 occurring at this time at coil terminals O1 and O2.

The detection of rotation of the first stepping motor 10 in FIG. 2 will next be described. As shown in FIG. 3 (*b*), after a normal drive pulse P1 is applied to the coil terminal O1, the coil switching pulse Pk1 is applied to the coil terminal O2 at the detection time T1, the detection circuit 210 detecting whether or not the induced voltage V1 at that time exceeds the threshold voltage Vth.

If at this time the current waveform H3 shown at FIG. 2 (*a*) is above the reference line G, the induced voltage V1 exceeds the threshold voltage Vth, but if it is below the reference line G, the induced voltage does not exceed the threshold voltage Vth.

The position of the current waveform H3 at the detection time t1 is d1, and because this is below the reference line G, the induced voltage V1 does not exceed the threshold voltage Vth. However, at detection time t2, the current waveform H3 is at the position d2, which is above the reference line G, this indicating that the induced voltage V2 exceeds the threshold voltage Vth.

When the coil switching voltage Pkn is applied to the coil terminal O2, if the induced voltage Vn exceeds the threshold voltage Vth, the next coil switching pulse Pkn+1 is switched so as to be applied not to the coil terminal O2, but rather to coil terminal O1. In this case, the coil switching pulses are applied to the coil terminal O1 starting with the coil switching pulse Pk3 output at the detection time t3.

In this case, in contrast to the case in which the coil switching pulse is applied to the coil terminal O2, if the current waveform H3 shown at FIG. 2 (*a*) is below the reference line G, the induced voltage V3 exceeds the threshold voltage Vth, whereas if the current waveform H3 is above the reference line G, the induced voltage does not exceed the threshold voltage Vth.

At the detection time t3, the coil switching pulse Pk3 is output from the coil terminal O1, and because the position of the current waveform at that time is d3, which is above the reference line G, the induced voltage V3 does not exceed the threshold voltage Vth.

Further, at the detection times t4 and t5 as well, the current waveform H3 is at the positions, d4 and d5, respectively, these both being above the reference line G, indicating that the induced voltages V4 and V5 do not exceed the threshold voltage Vth.

However, at the next detection time, t6, the current waveform H3 is at the position d6, which is below the reference line G, thereby indicating that the induced voltage V6 exceeds the threshold voltage Vth. At the six coil switching pulses Pk3 through Pk8 which are applied to the coil terminal O1, if even one of the induced voltages V3–V8 exceeds the threshold voltage Vth, the judgment is made that the first stepping motor 10 rotated.

In this case, because the induced voltage V6 exceeds the threshold voltage, the judgment is made that the first stepping motor rotated, so that the detection at coil switching pulses Pk7 and thereafter is stopped, and the compensation drive pulse Ph is not output.

Next, referring to FIG. 3, the rotation detection when the first stepping motor 10 did not rotate will be described. In this case, because the phase is 180 deg. different from the case of FIG. 2, a normal drive pulse P1 is applied to the coil terminal O2 as shown at FIG. 3 (*b*).

Then, the coil switching pulse Pk1 is applied to the coil terminal O2 at the detection time t1, detection being made as to whether or not the induced voltage V1 at that time exceeds the threshold voltage Vth.

In this case, similar to the case of FIG. 2 (*a*), if the current waveform H4 shown in FIG. 3 (*a*) is above the reference line G, the induced voltage V1 exceeds the threshold voltage Vth, and if it is below the reference line G, the induced voltage V1 does not exceed the threshold voltage Vth.

The position of the current waveform H4 at the detection time t1 is d1, which is below the reference line G, indicating that the induced voltage V1 does not exceed the threshold voltage Vth. Further, at the detection times t2 and t3, the current waveform H4 positions are d2 and d3, respectively, these both being below the reference line G, indicating that the induced voltages V2 and v3 do not exceed the threshold voltage Vth.

Then at the next detection time t4, the current waveform H4 position is d4, which is above the reference line G, indicating that the induced voltage V4 exceeds the threshold voltage Vth.

With the coil switching pulse Pk applied to the coil terminal O1, if the induced voltage at that time exceeds the threshold voltage Vth, the next coil switching pulse Pkn+1 is switched so as to be applied not to the coil terminal O1 but rather to the coil terminal O2. In this case, the coil switching pulses starting with the coil switching pulse at the detection time t5 will be applied to the coil terminal O2.

In this case, in contrast to the case in which the coil switching pulses are applied to the coil terminal O1, if the current waveform H4 is below the reference line G in FIG. 3 (*a*) the induced voltage V5 exceeds the threshold voltage Vth, and if it is above the reference line G the induced voltage V5 doe snot exceed the threshold voltage Vth.

The position of the current waveform H4 at the detection time t5 is d5, which is above the reference line G, thereby indicating that the induced voltage V5 does not exceed the threshold voltage Vth. Further at the detection times t6 through t10 as well, the current waveform H4 is at the positions d6 through d10, respectively, these all being above the reference line G, indicating that the induced voltages V6 through V10 do not exceed the threshold voltage Vth.

The coil switching pulse Pk which is applied to the coil terminal O2 is controlled by a counter, so that if during a prescribed period of time ( in this case the period between detection times t5 to t10) there is not even one time of where the threshold voltage is exceeded, detection is stopped, a judgment is made that the first stepping motor did not rotate, 32 ms after which a compensation drive pulse Ph is output to perform compensation drive of the first stepping motor 10. By doing this, the non-rotation condition is detected and load compensation operation is performed so as to output a compensation drive pulse only in the case in which it is required.

In recent years, multifunction electronic watches have appeared which have, for example, a chronograph function (abbreviated as chronograph function hereinafter) in addition to the normal time display. FIG. 4 shows a plan view of an electronic watch module of the past having a chronograph function, this electronic watch applying as well to the present invention.

In this drawing, the reference number 10 is the first stepping motor which is shown in FIG. 1, this comprising a first coil 11, a first yoke 12, and a first rotor 13. The reference numeral 20 is the second stepping motor which is shown in FIG. 1, this comprising a second coil 21, a second yoke 22, and a second rotor 23. The numeral 4 denotes a time gear train, 5 is a second hand, 6 is a chronograph gear train, 7 is a functional hand including a chronograph hand, 116 is an S used to start and stop the function including chronograph function, and 117 is an R switch used to reset function, for example, the function, for example, and chronograph function.

The first stepping motor 10 rotates the first rotor 13, 180 deg. every one second, thereby driving the second hand 5 via the time gear train, and further driving the hour hand, and the minute hand (not shown in the drawing) to perform a normal display of the time.

the second stepping motor 20 performs a chronograph operation by means of the S switch 116, rotating the second rotor 23 by 180 deg. in each 10 ms by means of a high-speed 100-Hz pulse, thereby driving the chronograph hand 7 via the chronograph gear train 6 to perform a functional display including chronograph display.

Next, the chronograph circuit operation will be described, with reference being made to FIG. 1 and FIG. 5. Since the normal watch section 200 in FIG. 1 has already been described, this description will focus on the chronograph section 300. FIG. 5 shows the pulse waveforms output by an electronic watch of the past.

A chronograph pulse generation circuit 301 generates the chronograph pulse P11 as shown at FIG. 5 (*b*), based on a signal from the frequency divider circuit 202. The chronograph pulse P11 is supplied from a chronograph pulse supply means 302 to a second drive circuit 303 by means of a start operation of the S switch 116, output being made alternately from coil terminal O3 and O4 of the second drive circuit 303, thereby driving the second stepping motor 20.

The normal drive pulse P1 which is applied to the coil terminal O1 of the above-noted first stepping motor 10 is a 5-ms pulse such as shown at FIG. 5 (*a*), this having a ¼-ms resting period each 1 ms. Rotation and non-rotation are detected by the earlier-described method, and in the case of non-rotation, as shown at FIG. 5 (*a*), a compensation drive pulse Ph with a pulse width of 10 ms is output after 32 ms.

After one second, a normal drive pulse P1 is applied to the other coil terminal O2, this being alternately repeated. Next, the pulse which is applied to the second stepping motor 20 will be described. With regard to the pulse which is applied to the second stepping motor 20, as shown in FIG. 5 (*b*), at the point at which the S switch is operated to start the chronograph function a chronograph pulse P11 having a pulse width of 4 ms is output from the coil terminal O3 of the second coil 21.

Then, after 10 ms, the chronograph pulse P11 is applied other coil terminal O4. These outputs are alternately repeated each 10 ms.

Although the above-noted first stepping motor 10 and the second stepping motor 20 should be designed so as to be distant from one another to avoid interaction between their magnetic fields, because of a reduction in module size and the associated design requirements, there are cases in which the first stepping motor 10 and the second stepping motor 20 are disposed as shown in FIG. 4, with just a small space D between them.

Thus, when one stepping motor rotates, it magnetically interferes with the other stepping motor. In a motor such as the first stepping motor, in which detection is made of rotation and non-rotation, the above-noted magnetic interference can result in a misjudgment that the first stepping motor has rotated, when in fact it has not rotated, thereby resulting in inhibiting of the output of the compensation drive pulse, this resulting in a disturbance of the timekeeping by the watch.

In particular in the case of a stepping motor such as the second stepping motor which is rotating at a high speed of 1 Hz or higher, because pulses are constantly being output, the influence this motor drive has on the first stepping motor 10 is unavoidable. The mechanism of this erroneous detection will be described below.

FIG. 6 shows the waveforms which illustrate the rotation and non-rotation detection in the load compensation operation of the past. FIG. 6 (*a*) the current waveform when a normal drive pulse P2 is applied form the coil terminal O2 of the first stepping motor 10 for the case in which the first stepping motor 10 could not rotate. The solid line waveform H1 is the current waveform when there is magnetic interference from the second stepping motor 20 (that is, when the chronograph is operating), while the dotted line wave form H2 is the current waveform when there is no magnetic interference therefrom (that is, when the chronograph is not operating).

FIG. 6 (*b*) shows the current waveform of the second stepping motor 20 at that time. FIG. 6 (*c*) and FIG. 6 (*d*) show the voltage Vo2 at the coil terminal O2 of the first stepping motor 10 and the voltage Vo1 at the coil terminal O1 of the first stepping motor 10, respectively.

FIG. 6 (*e*) shows the waveforms of the coil switching pulses Pk1 through Pk13.

The current waveform of the first stepping motor 10 is a waveform such as shown as H2 in FIG. 6 (*a*) as long as the second stepping motor 20 is not being driven. However, if the second stepping motor 20 is being driven, it creates magnetic interference as shown in FIG. 6 (*b*), this resulting in the current waveform such as shown as H1 in FIG. 6 (*a*).

Turning now to what happens if detection of rotation and non-rotation is performed under these conditions, first a normal drive pulse P1 is output from the coil terminal O2.

Then the coil switching pulse Pk1 is applied at the coil terminal O1 at the detection time t1 and detection is made of whether or not the induced voltage V1 at that time exceeds the threshold voltage Vth. If at this time the waveform H1 is above the reference line G, the induced voltage V1 exceeds the threshold voltage, but if it is below the reference line G, it does not exceed the threshold voltage Vth.

The position of the current waveform H1 at the detection time t1 is d1, which is below the reference line G, indicating that the induced voltage V1 does not exceed the threshold voltage Vth. Additionally at detection times t2 and t3 the current waveform H1 is at the positions d2 and d3, which are both below the reference line G, indicating that the induced voltages V2 and V3 do not exceed the threshold voltage Vth. At the next detection time t4, the current waveform H1 position is d4, which is above the reference line G, thereby indicating that the induced voltage V4 exceeds the threshold voltage Vth.

With the coil switching pulse Pkn applied to the coil terminal O1, if the induced voltage at this time exceeds the threshold voltage Vth, the next coil switching pulse Pkn+1 is switch so as to be applied not to the coil terminal O1, but rather to the coil terminal O2. That is, the coil switching pulses Pk5 starting from the coil switching pulse Pk5 at detection time t5 are applied to the coil terminal O2.

In this case, in contrast to the case in which coil switching pulses are applied to the coil terminal O1, if the current waveform is below the reference line G, the induced voltage at that time exceeds the threshold voltage Vth, but if the current waveform is above the reference line G, the induced voltage does not exceed the threshold voltage Vth.

With regard to the coil switching pulse Pk5 which is now applied to the coil terminal O2 at the detection time t5, because of the influence of magnetic interference, the current waveform position H1 is d5, whereas it should normally have been at d'5. For this reason, although without the magnetic interference the position of the current waveform H2 would have been above the reference line G at d'5, indicating that the induced voltage V5 did not exceed the threshold voltage Vth, the effect of the magnetic interference is to move the position of the current waveform H1 at the d5, which is below the reference line G, indicating that the induced voltage V5 exceeds the threshold voltage Vth.

If the any one of the induced voltages V5 through V10 for the coil switching pulses Pk5 through Pk10 exceeds the threshold voltage Vth, the judgment is made that the stepping motor was driven.

Thus, although the first stepping motor has not actually rotated, an erroneous detection to the effect that it did not rotate occurs, and a compensation drive pulse Ph is not output as a result. Therefore, the action of the above-noted compensation drive pulse Ph in compensating the first stepping motor does not occur, and the time kept by this motor lags.

In addition, in the past there has been a commercially produced electronic watch which used a solar cell on the clock face, this being used in combination with a storage means such as an electrical double-layer capacitor or the like, rather than a battery (this electronic watch being referred to hereinafter as a solar watch).

Because the output voltage of an electrical double-layer capacitor is not constant, the stepping motor drive method in the solar watch was that of making a plurality of normal pulses available, these having differing driving forces. Additionally a means for detecting rotation and non-rotation was provided, a normal drive pulse being selected and output from the plurality of normal drive pulses which would enable drive with the minimum current a the voltage present at that time, thereby driving the stepping motor in a manner that accommodated the varying voltage.

The solar watch of the past will be described, with reference being made to FIG. 7. FIG. 7 shows the block diagram of the solar watch of the past, and FIG. 8 shows the waveforms of the normal pulse Ps of the solar watch which is shown in FIG. 7. In FIG. 7, the reference numeral 45 denotes a solar cell which generates electricity in response to light, 70 is an electrical double-layer capacitor which stores electrical energy, 10 is a first stepping motor, 150 is a watch circuit which operates by the electrical power which is stored in the electrical double-layer capacitor 70, 101 is an oscillator circuit which generates the reference clock required for circuit operation, 102 is a frequency divider circuit which divides the frequency of the reference clock generated by the oscillator circuit 101, 103 is a first normal pulse generation circuit which generates the normal pulses Ps1 through Ps8 for the purpose of normal drive of the first stepping motor 10 and a compensation drive pulse Psh for the purpose of performing compensating drive, 108 is a first normal pulse selection circuit which selects one moral pulse Ps from the normal pulses Ps1 through Ps8 which are generated by the first normal pulse generation circuit, 133 is a clock control circuit which performs timekeeping based on a signal from the frequency dividing circuit 102, 120 is a first drive circuit for the purpose of driving the first stepping motor 10, 115 is a second hand control circuit which is controlled by the clock control circuit 122, and which supplies the normal pulse signal Ps which is selected by the first normal pulse selection circuit 108 to the first drive circuit 120 each one second, 119 is a first detection circuit which detects the rotation and non-rotation of the first stepping motor, and 114 is a first load compensation control circuit which performs control of the first normal pulse selection circuit 108 based on the results of the judgment made by the first detection circuit 119.

Next, circuit operation will be described.

The electrical energy generated by the solar cell 45 is stored in the electrical double-layer capacitor 70. The watch circuit 150 uses the electrical double-layer capacitor 70 as its power supply, and is driven by the power supply voltage Vc.

The first normal pulse generation circuit 103 generates the normal pulses Ps1 through Ps8 and the compensation pulse Psh, based on a signal from the frequency divider circuit 102. The first normal pulse selection circuit 108 is controlled by the first load compensation control circuit 114, selects one normal pulse Ps from the normal pulses Ps1 through Ps8, according to a method to be described later, supplying this to the second hand control circuit 115 and transfers the magnitude of the currently selected normal pulse Ps to the first load compensation control circuit 114 by means of the signal S.

The second hand control circuit 115 supplies the normal pulse Ps to the first drive circuit 120 each one second, in accordance with the time that is kept by the watch control circuit 133. The first drive circuit 120 drives the first stepping motor 10 by means of the normal pulse Ps. The first load compensation control circuit 114 controls the first normal pulse selection circuit 108 by means of the results of the judgment of the first detection circuit 119, and in the case in which rotation as detected, outputs the same normal pulse Ps next time, but in the case in which non-rotation is detected, outputs the compensation drive pulse Psh and switches the next normal pulse Ps to the next larger normal pulse Ps.

Next, the pulse shapes will be described, FIGS. 8 (*a*) through (*c*) shows the waveforms of the normal pulses Ps1, Ps4, and Ps8 of the normal pulses Ps1 through Ps8 which are available. The normal pulses Ps1 through Ps8 have a pulse width of 4 ms, but each have a pulse resting period that differs by 0.05 ms each. The normal pulse Ps1, as shown in FIG. 8 (*a*), has a pulse resting period Ks1 of 0.35 ms every 1 ms, the normal pulse Ps4 has a pulse resting period Ks4 of 0.2 ms every 1 ms, and the normal pulse Ps8 has no pulse resting period.

Although it is not shown in the drawing, the normal pulses Ps2, Ps3, Ps5, Ps6, and Ps7 have pulse resting periods of 0.3 ms, 0.25 ms, 0.15 ms, 0.1 ms and 0.05 ms, respective, every 1 ms. FIG. 8 (*d*) shows the compensation drive pulse Psh which is output when the judgment is made that drive was not possible by the normal pulse Ps.

The compensation drive pulse Psh is output 32 ms after the normal pulse Ps, has a pulse width of 12 ms and has 0.5-ms pulse resting periods every 1 ms in the latter 6 ms of this 12 ms.

TABLE 1

Normal Pulse Ps Pulse Resting Periods and Minimum Drive Voltages

| Normal Pulse | Pulse Resting Period | Minimum Drive Voltage |
|---|---|---|
| Ps1 | 0.35 ms | 2.6 |
| VPs2 | 0.3 ms | 2.3 |
| VPs3 | 0.25 ms | 2.0 |
| VPs4 | 0.2 ms | 1.8 |
| VPs5 | 0.15 ms | 1.6 |
| VPs6 | 0.1 ms | 1.4 |
| VPs7 | 0.05 ms | 1.2 |
| VPs9 | (None) | 1.0 V |

As described above, because the normal pulses Ps1 through Ps8 have mutually differing pulse resting periods, the associated minimum voltage, that is, the minimum drive voltage is different for each. Table 1 shows the pulse resting periods and minimum drive voltages for each of the normal pulses Ps.

Because the normal pulse Ps8 has no resting period, it has the largest driving capacity, so that drive is possible even if Vc is only 1.0 V. The normal pulse Ps 1 has a long resting period of 0.35 ms, and thus has the smallest driving capacity. Thus, at a low voltage at which drive is not possible, drive is only possible at a power supply voltage Vc of 2.6 V or greater.

However, at a high power supply voltage Vc, the normal pulse Ps8 has more drive capacity than is necessary, so that the power consumption becomes large. In contrast to this, the normal pulse Ps1 enables drive at a power supply voltage Vc of 2.6 V or greater with a power consumption that is lower than any of the normal pulses Ps2 through Ps8. The normal pulses Ps2 through Ps7 each have the minimum drive voltages corresponding to their respective pulse resting periods. The solar watch is driven by the most optimal normal pulse Ps that has a low power consumption with respect to the power supply voltage of the electrical double-layer capacitor 70.

Next, the method of selecting an optimal normal pulse Ps will be described. In the load compensation control method practiced in the past, a given normal pulse Ps(n) is output, and if drive was not possible the next output normal pulse is selected as the next larger normal pulse Ps(n+1). If rotation occurred, however, the next pulse is the same normal pulse Ps(n), this being output a prescribed number of times, for example 100 times continuously, after which the next pulse was the next smaller normal pulse Ps(n−1).

By performing the above-noted operation, it is possible to select the optimum normal pulse. Take, for example, the case in which the power supply voltage Vc of 1.7 V, and in which the normal pulse Ps3 is output. From Table 1, it can be seen that, with a power supply voltage Vc of 1.7, the smallest normal pulse usable for drive is the normal pulse Ps5, with which drive is possible with a minimum voltage of 1.6 V, making the normal pulse Ps5 the optimum pulse when the power supply voltage Vc is 1.7 V.

Since the minimum drive voltage with the normal pulse Ps3 pulse is 2.0 V, drive is not possible with a power supply voltage Vc of 1.7 V. Thus, the first stepping motor 10 cannot be rotated, and the first detection circuit 119 makes the judgment that rotation was not possible. In accordance with the results of this judgment, the first load compensation control circuit 114 controls the first normal pulse selection circuit 108 so as to output a compensation drive pulse Psh, and also makes a switch to the next larger normal pulse Ps4 starting at the next time.

Thus, the first stepping motor 10 drive is compensated reliably by the compensation drive pulse Psh, and the next larger normal pulse Ps1 is output the next time. Note, however, that from Table 1 it can be seen that because the minimum drive voltage with the normal pulse Ps4 is 1.8 V, it still is not possible to perform drive with the power supply voltage Vc of 1.7 V. Therefore, it is not possible for the first stepping motor 10 to rotate, and the first detection circuit 119 makes the judgment that rotation was not possible.

In accordance with the results of this judgment, the first load compensation control circuit 114 controls the first normal pulse selection circuit so as to output a compensation pulse Psh and also makes a switch to the next larger normal pulse Ps5 starting the next time. Thus, the drive of the first stepping motor 10 is reliably compensated once again, and the next larger normal pulse Ps5 is output the next time. With the normal pulse Ps5 the minimum drive voltage is 1.6, so drive is possible with the power supply voltage Vc of 1.7 V.

Therefore, the first detection circuit 119 makes the judgment that rotation was possible. In accordance with the results of this judgment, the first load compensation control circuit 114 controls the first normal pulse selection circuit 108 so that a compensation drive pulse Psh is not output, and outputs the same normal pulse Ps5 the next time as well. Thus, the normal pulse Ps5 is output the next time as the normal pulse Ps. Furthermore, if the power supply voltage Vc continues to be 1.7 V, when the normal pulse Ps5 is output continuously for 100 times, the first load compensation control circuit 114 controls the first normal pulse selection circuit 108 so as to output the next smaller normal pulse Ps4 as the next normal pulse Ps.

However, because with the normal pulse Ps4 drive is not possible with the power supply voltage Vc of 1.7 V, the compensation pulse Psh is output to perform compensation drive, the normal pulse being returned to the next larger normal pulse Ps5 the next time output is made. In the above-described manner, with a power supply voltage Vc of 1.7 only one time out of 100 times is the normal pulse Ps4 output and drive not possible, so that the compensation pulse Psh is output to perform drive compensation, and at the other times drive continues with the optimum normal pulse Ps5. Although the current consumption of the compensation pulse Psh is larger than with a normal pulse Ps, this occurs only one time in 100, so that the effect extremely small and not enough to cause a problem.

Next, the case in which the power supply voltage Vc increases from 1.7 V to 2.1 V will be described. From Table 1, with a power supply voltage of 2.1 V, the optimum normal pulse Ps is the normal pulse Ps3, which has a minimum drive voltage of 2.0 V, the drive capacity with the normal pulse Ps5 being excessively large, so that the current consumption becomes larger than necessary. Note that, as described above, out of each 100 outputs of the normal pulse Ps5, the normal pulse Ps4 is output one time.

The minimum drive voltage with the normal pulse Ps4 is 1.8 V and while drive was not possible with a power supply voltage Vc of 1.7 V, drive is possible at a power supply voltage Vc of 2.1 V. Thus, when the normal pulse Ps4 is output, if the power supply voltage Vc is 2.1 V, the first stepping motor 10 is driven by this normal pulse Ps4, and the first detection circuit 119 makes the judgment that rotation was possible.

In accordance with the results of this judgment, the first load compensation control circuit 114 controls the first normal pulse selection circuit 108 so that a compensation pulse Psh is not output, and so that the same normal pulse Ps4 is selected for output next time as well. Then, the next time as well, the normal pulse Ps4 is output as the normal pulse Ps.

In addition, when the normal pulse Ps4 is output 100 times, the first load compensation circuit 114 controls the first normal pulse selection circuit 108 so that the next smaller normal pulse Ps3 is selected for output the next time. Because the minimum drive voltage with the normal pulse Ps3 is 2.0 V, so that drive is possible with a power supply voltage Vc of 2.1 V as well, the next time the same normal pulse Ps3 is output the next time as well.

By performing the above-noted operation, the normal pulse Ps3, which is the optimum normal pulse when the power supply voltage Vc is 2.1 V, is selected and output. Furthermore, after the normal pulse Ps3 is output 100 times, the next smaller normal pulse Ps2 is output, but drive is not possible at a power supply voltage Vc of 2.1 with this normal pulse Ps2, so that after the compensation pulse Psh performs compensation drive, the output normal pulse Ps is returned once again to the normal pulse Ps3. By doing this, it is possible to select and output the normal pulse which is optimum for a varying power supply voltage Vc.

This operation operates not only with respect to the power supply voltage variations, but with respect to the drive load of the calendar and the like, enabling the selection of the output of the optimum normal pulse at all times. The above-noted operation will be referred to hereinafter as multistage load compensation operation.

In recent years there has arisen demands from electronic watches for not only the normal time display, but for various additional functions such as an alarm function and a chronograph function. Specially, in the case of an analog-indicating electronic watch, there is a desire to be able to do such things as switch from the normal time display to the alarm time display, and to perform operations such as fast-forward and fast-reverse with the chronograph display, which require drive capability by means of a non-normal pulse, and these desires have occurred with solar watches as well.

However, it is known that with a solar watch the power supply voltage varies widely, making it impossible to obtain sufficient motor drive energy with a fixed pulse width when performing non-normal pulse drive such as high-speed pulse drive and reverse pulse drive at low voltages, another associated problem being that at high voltages rotor overrun occurs, preventing proper drive, and thereby limiting the voltage range over which drive is possible. Accommodation of the above-noted functions in solar watches, in which the power supply voltage varies widely, is therefore not possible.

An effective drive means when the voltage is varying is the above-described multistage load compensation operation, and it can be envisioned that this method can be used to perform high-speed rotation and reverse rotation. However, with multistage load compensation, because of the time period for detection an the time period of output of a compensation drive pulse, the amount of time until the output of the next pulse becomes long, this posing the problem of preventing high-speed drive. For example, even if the pulse width of the normal pulse is as short as 4 ms, there is an addition detection time period of approximately 20 ms, and if rotation was not possible a compensation drive pulse having a width of 12 ms is output from the 32 ms point.

Therefore, during the amount of time until the drive is completed with a compensation drive pulse, that is, during the 50-ms period of time which is the total of the 32 ms before output of the compensation drive pulse, the 12-ms pulse width of the compensation drive pulse, and the stabilization time of approximately 8 ms, it is not possible to output the next normal pulse.

Therefore, with multistage load compensation, it is not possible to perform drive with a pulse interval of smaller than 50 ms. That is, drive at a frequency of higher than 20 Hz is not possible. Thus, in solar watches in the past it was difficult to perform high-speed rotation or reverse rotation. One method of solving the above-described problem is to detect the power supply voltage, and to output high-speed pulse or reverse pulse having a width responsive to the voltage at that time. An example of detecting the voltage and changing the width of a reversing pulse was proposed as an electronic watch stepping motor in the Japanese Unexamined Patent Application S55-59375.

However when performing high-speed rotation or reverse rotation in a solar watch, in which the voltage varies over a wide ranges such as from approximately 1 V to 3 V, it is necessary to perform a plurality of voltage detections corresponding to the drive voltage ranges for these pulses. For example, if a high-speed pulse or reversing pulse is to be output to correspond to each of the dour divided voltage ranges of 1 to 1.3 V, 1.3 to 1.7 V, 1.7 to 2.3 V, and 2.3 to 3 V, it is necessary to perform voltage detection at the five voltages of 1 V, 1.3 V, 1.7 V, 2.3 V, and 3 V.

Furthermore, if the variations between components being used and environmental conditions such as the operating temperature are considered, reliable operation requires that the voltage detection be performed with considerable accuracy. It is extremely difficult to perform high-accuracy voltage detection within such as small system as an electronic watch.

SUMMARY OF THE INVENTION

An object of the present invention is to provide an electronic watch which offers an improvement with respect to the above-noted drawback in the prior art, this electronic watch either comprising a drive motor which is driven by a normal hand-drive pulse and a drive motor which is driven by a non-normal hand-drive pulse, or comprising a single drive motor which is driven by normal hand-drive pulse and a non-normal hand-drive pulse, and being capable not only of maintaining accuracy timekeeping display or functional display including chronograph display, but also of achieving low power consumption.

More specifically, the first object of the present invention is to provide an electronic watch in which, when an external operating element is operated, at a voltage lower than a prescribed voltage the reverse-rotation derive of the above-noted drive motor is disabled and also in which the above-noted drive motor is driven in the forward direction by a pulse of a low drive frequency over a wide frequency range.

The second object of the present invention is to provide an electronic watch in which there exist at least two drive motors adjacent to one another, and which has a function that prevents erroneous detection in the load compensation operation of one drive motor caused by magnetic interference thereto from the other drive motor.

A third object of the present invention is to provide an electronic watch in the case in which a power supply having a varying output voltage is used, this electronic watch having finctions including an alarm function or a chronograph function which enables high-speed rotation or reverse rotation of the drive motor by a non-normal hand-drive pulse which is either a high-speed pulse or a reverse-drive pulse, even when the output voltage of the power supply varies, without detecting the voltage of the power supply.

To achieve the above-noted objects, the present invention makes use of the basic technical constitution which is described below. Specifically, it is an electronic watch which comprises a power supply, an oscillator circuit, a drive pulse generating means, a drive motor which minimally drives one hand of the hour/minute, second, and finctional hands including chronograph hands in response to a drive pulse which is output by the above-noted drive pulse generating means, a drive circuit means which controls the drive of the above-noted drive motor, a drive circuit control means which controls the above-noted drive circuit means, and a control condition detection means which is connected to the above-noted drive circuit control means and which detects the control detection means being provided with a non-proper condition detection means which senses the occurrence of a condition in which it is not possible to properly drive the above-noted drive motor under a prescribed condition in a prescribed control mode currently being executed, and a control mode change-instructing means which, in response to a detection signal of the above-noted non-proper condition detection means, issues an instruction to the drive circuit control means to change the control mode currently being executed.

That is, in an electronic watch according to the present invention in supplying a prescribed drive pulse to an appropriate drive motor via the drive circuit control means so as to cause the execution by the above-noted drive motor of a prescribed display operation, in addition to monitoring the control mode which is currently being executed by the drive circuit control means, in the case in which, in this control mode, because of a change in the drive voltage of the power supply or a change in another condition, a condition occurs in which the reliability with regard to a prescribed display operation of the drive motor decreases, the control mode is changed either by causing the above-noted drive circuit control means to stop the currently executing control mode, or causing it to execute a different control mode, or by performing processing, for example, to change the output condition of the drive pulse, so that regardless of the manner in which the drive environment changes, it is not only possible to maintain a proper drive condition in the above-noted drive motor, but also to drive the above-noted drive motor at all times with an optimum low power consumption, thereby enabling the achievement of operation with low power consumption.

DETAILED DESCRIPTION OF THE INVENTION

Examples of an electronic watch according to the present invention will be described in detail below, with reference being made to the appropriate accompanying drawings.

Figure 9:
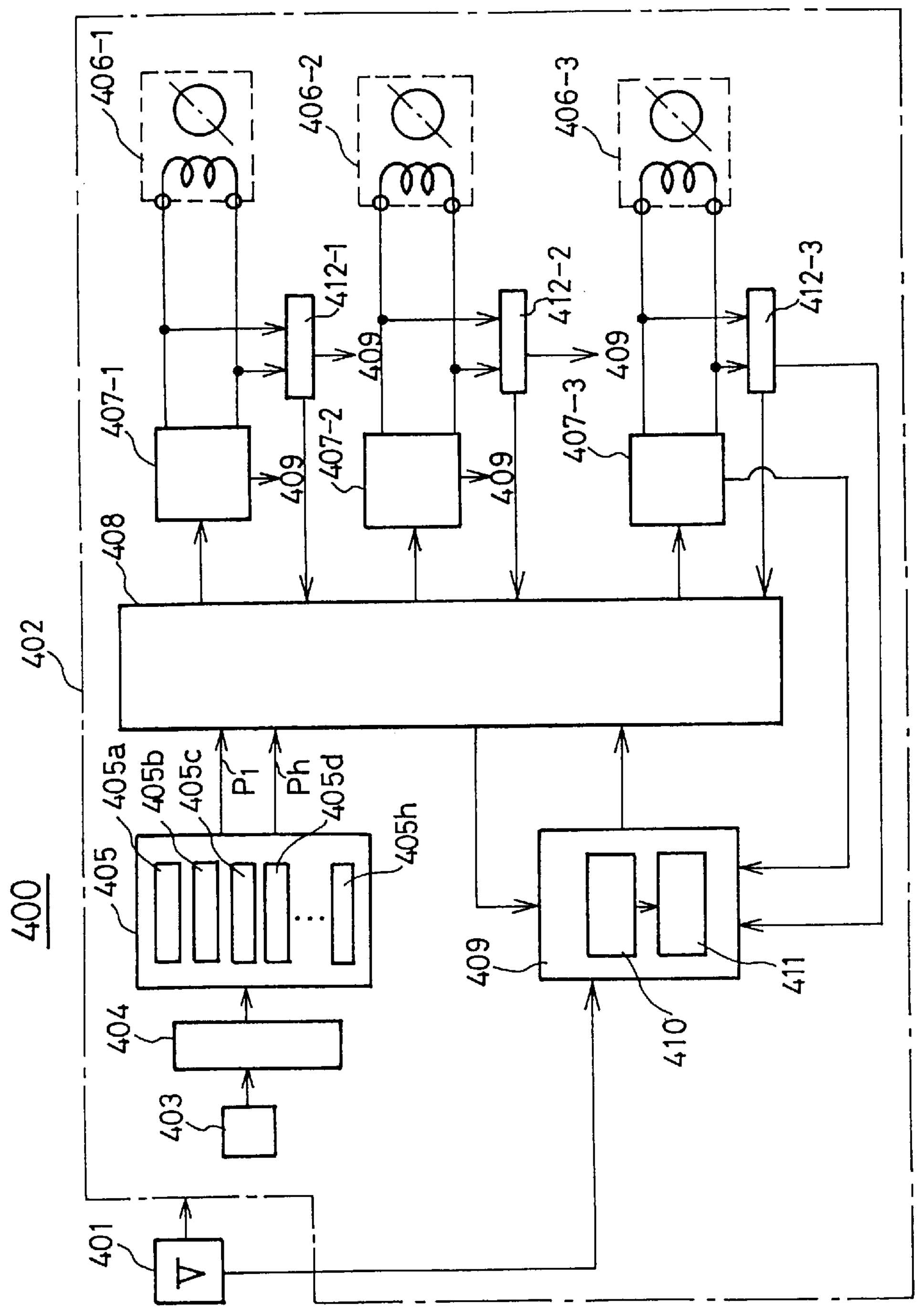
FIG. 9 is a block diagram which shows the basic configuration of an electronic watch according to the present invention.

FIG. 9 is a block diagram which shows in simplified form an example of the configuration of an electronic watch 400 according to the present invention. In this drawing, the electronic watch comprises a power supply 401 and a watch circuit 402. The watch circuit 402 comprises an oscillator circuit 403, a frequency divider circuit 404, a drive pulse generation means 405, a drive motor 406 which, in response to a drive pulse P1 that is output by the above-noted drive pulse generation means 405, drives at least one of the hour/minute, second, and functional hands including chronograph hands, a drive circuit means 407 which controls the drive of the drive motor 406, a drive circuit control means 408 which controls the above-noted drive circuit means 407, and a control condition detection means 409 which is connected to the above-noted drive circuit control means 408 and which detects the control condition in the drive circuit control means 408, the control condition detection means 409 being provided with a non-proper condition detection means 410 which senses the occurrence of a condition in which it is not possible to property drive the above-noted drive motor 406 under a prescribed condition in a prescribed control mode currently being executed, and a control mode change-instructing means 411 which, in response to a detection signal of the above-noted non-proper condition detection means 410, issues an instruction to the drive circuit control means 408 to change the control mode currently being executed.

In the electronic watch 400 according to the present invention, there an be one above-noted drive motor 406, in which case it is possible to make both timekeeping display and for example, chronograph display using a single drive motor 406, and it is also possible to make the timekeeping display and the chronograph display using separate drive motors, by minimally have the two drive motor 406-1 and 406-3. Additionally, it is possible to have two drive motors 406-1 and 406-2 for the timekeeping display, and to have a single drive motor 406-3 for the chronograph display.

Thus, in the case of using a plurality of motors, it is desirable to have a number of drive circuit means 407 which corresponds to the number of drive motors.

While no specific limitation is imposed with regard to the power supply used in the electronic watch 400 according to the present invention, it is particularly effective in the case of a power supply having a configuration which exhibits variation in voltage during timekeeping display operation or a power supply such as titanium-lithium batteries, solar batteries, i.e., secondary batteries and condensers having large capacitance rechargeable batteries and the like, which have a configuration which exhibits up and down fluctuations of voltage during timekeeping display operation.

Additionally there is no particular limitation imposed with regard to the constitution of the oscillation means 404 and frequency dividing means 405 used in the present invention, it being possible to use a known oscillation means and a know frequency dividing means of the past.

In addition, it is desirable that the drive pulse generation means 405 used in the electronic watch 400 according to the present invention, in addition to including a normal hand-drive pulse generation circuit 405-*a* which generates drive pulse for normal hand drive from a pulse having a prescribed frequency, via the frequency divider circuit 404, from the oscillation of the oscillator circuit 403, also includes at least one pulse generation circuit selected from, for example, a compensation drive pulse generation circuit 405-*b*, a drive motor rotation detection signal pulse generation circuit 405-*c*, a low-voltage hand-drive pulse generation circuit 405-*d*, a fast-forward (high-speed) pulse generation circuit 405-*e*, a low-voltage fast-forward pulse generation circuit 405-*f*, a reverse-rotation pulse generation circuit 405-*g*, and a functional hand drive pulse generatint circuit for example, a chronograph hand-drive high-speed rotation pulse generation circuit 405-*h*.

Furthermore, of the above-noted pulse generation circuits used in the above-noted electronic watch 400 of the present invention it is possible to have a configuration in which one drive pulse is output from at least one pulse generation circuit selected from the normal hand-drive pulse generation circuit 405-*a*, the fast-forward (high-speed) pulse generation circuit 405-*e*, the reverse-rotation pulse generation circuit 405-*g*, and the functional hand drive pulse generating circuit, for example, the chronograph hand-drive high-speed rotation pulse generation circuit 405-*h*, and it is also further more desirable to have a configuration which a plurality of drive pulses having mutually differing drive capacities are output.

In addition, the compensation drive pulse generation circuit 405-*b* used in the electronic watch 400 according to the present invention is a circuit which generates a compensation drive pulse Ph that it used in the case, as described earlier, load compensation is to be performed, and while this compensation drive pulse generation circuit 405-*b* can be configured, similar to the other above-noted group of pulse generation circuits, as an independent circuit as shown in FIG. 9, it is also possible to have this compensation drive pulse generation circuit 405-*b* provided within a single pulse generation circuit selected from the above-noted the normal hand-drive pulse generation circuit 405-*a*, the fast-forward (high-speed) pulse generation circuit 405-*e*, the reverse-rotation pulse generation circuit 405-*g*, and the chronograph hand-drive high-speed rotation pulse generation circuit 405-*h*.

Furthermore, the drive circuit control means 408 which is used in the electronic watch 400 according to the present invention includes a load compensation control system 412 which detects whether or not the above-noted drive motor 406 rotated in response to the prescribed drive pulse P1 which as supplied by the above-noted drive circuit means 407 and, in the case in which the judgment is made that the drive motor 406 did not rotate, supplies a prescribed compensation drive pulse Ph to the drive circuit means 407.

The control condition detection means 409 used in the electronic watch 400 according to the present invention is connected to the drive circuit control means 408, and it is desirable that this control condition detection means 409 further has an non-proper condition detection means 410 comprising preferably at least one means selected from the means for detecting the voltage level of the power supply or means for detection the drive condition of the driver motor other than the drive motor which is executing the prescribed drive control, and means for detecting the predicted voltage level of the power supply which is sensed by the above-noted load compensation control system 412.

The control mode change-instructing means 411 which is used in the control condition detection means of the present invention is configured so as to have at least one method of instruction a change in response to a detection signal from the above-noted non-proper condition detection means 410, this being either output to the above-noted drive circuit control means of an instruction to stop the control mode current being executed, output to the drive circuit control means of an instruction to change form the currently executed control mode to a different control mode, or output to the drive circuit control means of an instruction to change from the prescribed drive pulse being used in the control mode currently being executed to a different drive pulse.

The configuration of the electronic watch 400 according to the present invention will be described in detail below, making reference to the accompanying drawings with regard to the aspects thereof.

Figure 10:
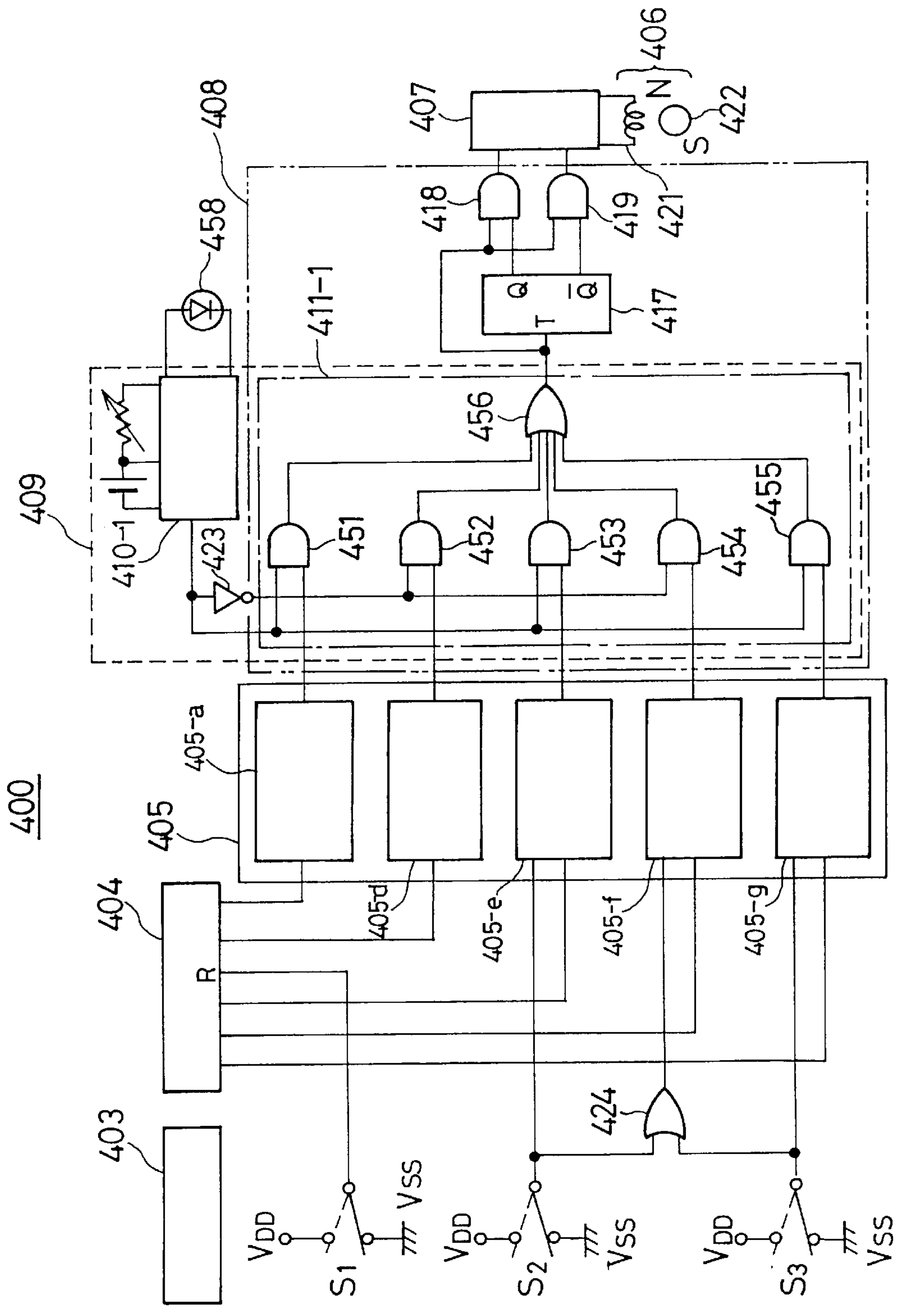
FIG. 10 is a circuit block diagram which shows the first aspect of an embodiment of an electronic watch according to the present invention.

FIG. 10 is a block diagram which shows a specific example of the configuration of the first aspect of the electronic watch 400 according to the present invention, this electronic watch 400 comprising the power supply 401 and the watch circuit 402. The watch circuit 402 comprises an oscillator circuit 403, a frequency divider circuit 404, a drive pulse generation means 405, a drive motor 406 which, in response to a drive pulse P1 that is output by the above-noted drive pulse generation means 405, drives at least one of the hour/minute, second, and chronograph hands, a drive circuit means 407 which controls the drive of the drive motor 406, a drive circuit control means 408 which controls the above-noted drive circuit means 407, and a control condition detection means 409 which is connected to the above-noted drive circuit control means 408 and which detects the control condition in the drive circuit control means 408, the above-noted drive pulse generation means 408 including at least a normal hand-drive pulse generation circuit 405-*a,* a fast-forward (high-speed) pulse generation circuit 405-*e* which generates a fast-forward pulse in response to an operation of an external operating element, and a reverse-rotation pulse generation circuit 405-*g* which generates a reverse-rotation pulse in response to an operation of an external operating element, and additionally the above-noted control condition detection means 409 is provided with a non-proper condition detection means 410 comprising a voltage level discrimination means 410-*a* which detects the voltage level of the power supply 410, and a control mode-changing instruction circuit 411 comprising a selection means 411-1 which, in response to an output signal from the above-noted non-proper condition detection means 410, selectively causes the drive output signals of each of the pulse generation circuit 405 to pass, wherein in the case in which the power supply voltage is outside a prescribed voltage range, in response to a discrimination signal output from the non-proper condition detection means 410, the control mode-changing instruction circuit 411 prohibits the drive circuit control means 408 from passing a reverse-rotation pulse.

Additionally, as another specific example of the electronic watch according to the present invention, in the above-noted configuration the drive pulse generation means is provided with a low-voltage fast-forward pulse generation circuit which generates a fast-forward pulse for use at a low voltage, this being a drive pulse having a width that is wider than the fast-forward pulse, the configuration being such that in the case in which the power supply voltage has gone outside of a prescribed voltage range, in response to a discrimination signal output from the above-noted non-proper condition detection means, the control mode-changing instruction circuit permits the drive circuit control means to pass the low-voltage fast-forward pulse.

The electronic watch 400 in the above-noted first aspect of the present invention will next be described in further detail.

Specifically, the electronic watch 400 of the above-noted first aspect of the present invention, which has a hand-drive pulse generation circuit 405-*a* that generates a normal hand-drive pulse, a fast-forward pulse generation circuit 405-*e* that generates a fast-forward pulse in response to an operation of an external operating element, a reverse-rotation pulse generation circuit 405-*e* that generates a reverse-rotation pulse in response to an operation of an external operating element, and a stepping motor which performs each of the operations of normal rotation, fast-forward rotation, and reverse rotation, in response to the above-noted pulses, is provided with a voltage level discrimination circuit 410-1 that discriminates the level of the power supply voltage, and with a control circuit 411-1 which is controlled by an output signal of the voltage level discrimination circuit 410-1 and which causes selective passage of an output signal from the above-noted pulse generation circuits, wherein if the power supply voltage falls below the prescribed voltage range so that a low-voltage discrimination signal is generated from the above-noted voltage level discrimination circuit 410-1, the passage of the above-noted control circuit 411-1 prohibits the passage of the reverse-rotation pulse.

Next, an embodiment of the present invention will be described in relation to FIG. 10 in terms of the stepping motor fast-forward operation and reverse-rotation operation when correcting the time setting in a solar cell watch advancing a second hand every second.

In FIG. 10, the reference numeral 403 denotes an oscillator circuit and 404 denotes a frequency divider circuit, whereby the output of the oscillator circuit 403 is frequency divided by the frequency divider circuit 404 to obtain the signals required for the operation of the watch.

Figures 11A, 11B, 11C, 11D, 11E:
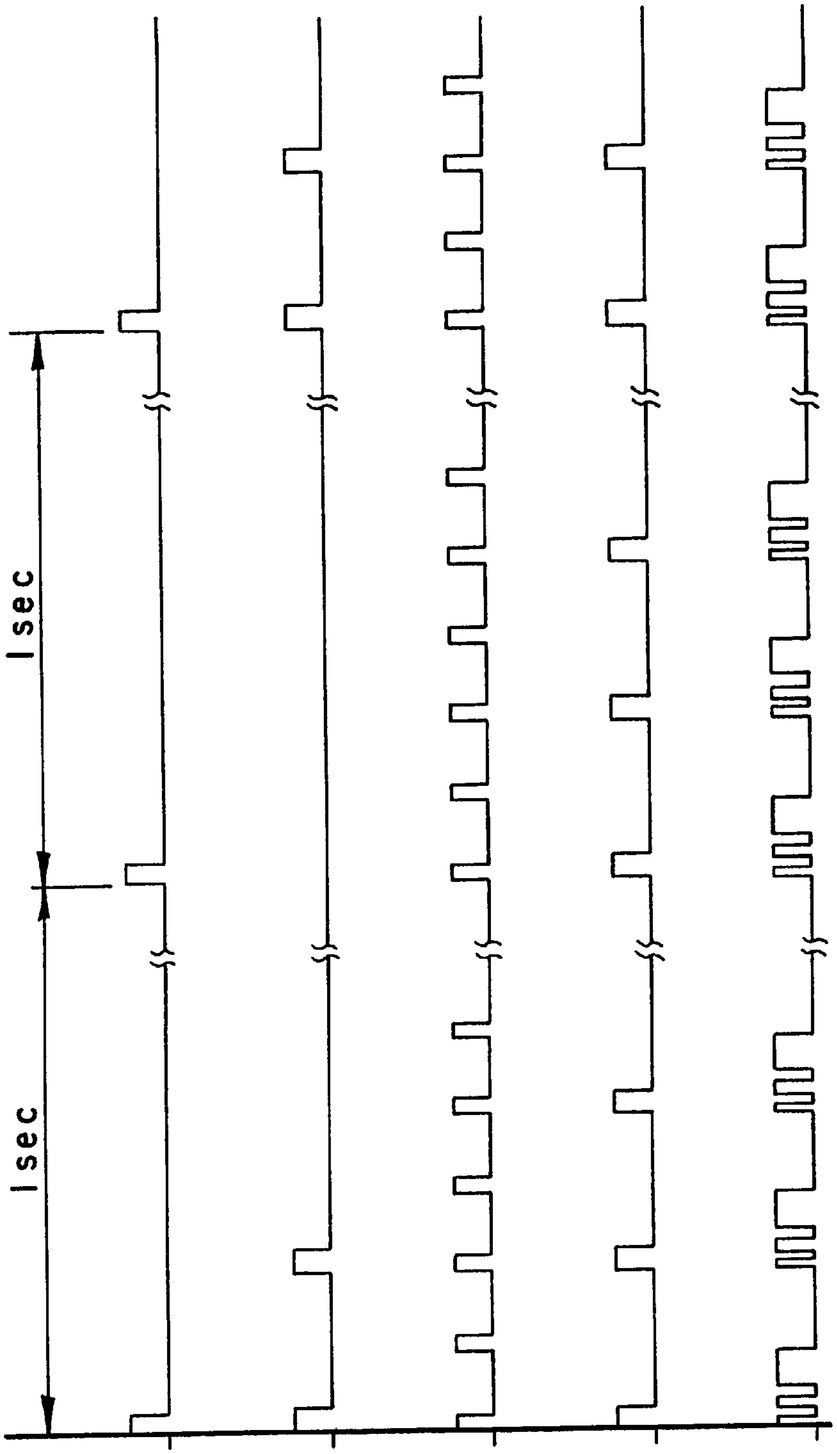
FIGS. 11A–11E are output waveform diagrams which show the waveforms of the main part of the circuit block diagram shown in FIG. 10.

In this drawing, 405-*a* is a hand-drive pulse generation circuit generates a pulse for normal hand drive, this outputting a hand-drive pulse having a width of 5 ms every 1 second, as shown in FIG. 11 (*a*), during normal hand drive. The reference numeral 405-*d* denotes a low-voltage hand-drive pulse generation circuit, which outputs a hand-drive pulse comprising two pulses having a width of 6 ms every 2 seconds, as shown in FIG. 11 (*b*). Furthermore, although it is commonplace technology at present, if detection is performed of rotation and non-rotation of the rotor 422 after being driven by a hand-drive pules and a compensation drive pulse having a wide pulse width is output from the hand-drive pulse generation circuit 405-*a* when non-rotation is detected, this low-voltage hand-drive pulse generation circuit 405-*d* is not absolutely necessary. The reference numeral 405-*e* denotes a fast-forward pulse generation circuit, and if the external operating element 34 shown in FIG. 12 and to be described later is continuously pressed, fast-forward pulses having a pulse width of 4 ms are output at a rate of 64 per second, as shown in FIG. 11 (*c*).

The reason the pulse width is made narrower than the normal hand-drive pulse is to increase the drive frequency. However, because the pulse width is narrow, it is difficult to drive the stepping motor with a low voltage. The reference numeral 405-5 denotes a low-voltage fast-forward pulse generation circuit, which outputs fast-forward pulses having a pulse width of 6 ms at a rate of 32 each one second, as shown in FIG. 11 (*d*), when the external operating element 34, shown in FIG. 12 and to be described later, is continuously pressed. The drive frequency is proportionally one half of the output of the fast-forward pulse generation circuit 405-*e,* and the pulse width thereof is wide. Therefore, even at a low voltage at which drive by the output signal of the fast-forward pulse generation circuit 405-*e* is not possible, it is possible to normally drive the stepping motor. The reference numeral 405-*g* denotes a reverse-rotation pulse generation circuit, which outputs groups of three pulses, these being output at a rate of 32 groups in a period of one second, as shown in FIG. 11 (*e*), when the external operating element 35, shown in FIG. 12 and to be described later, is continuously pressed.

The reference numeral 458 denotes a solar cell which converts light energy to electrical energy, with a capacitor or secondary cell used as the power supply. The reference numeral 410-1 denotes a voltage level discrimination circuit which outputs a high signal when the power supply voltage is, for example, 1.2 V or greater, and which outputs a low signal when the power supply voltage is below, for example, 1.2 V.

This power supply voltage discrimination circuit 410-1 forces current to flow when the power supply voltage is 1.8 V or greater, and is configured so as to prevent the power supply voltage from reaching or exceeding 1.8 V.

The reference numeral 408 denotes a control circuit which comprises a control mode-changing instruction means 411-1 formed by the AND gates 451 through 455 and the OR gate 456 which, in response to an output signal of a voltage level discriminating circuit 410-1, which is a non-proper condition detection means 410 to be described later, switch the output drive pulse, and which further comprises the toggle-type flip-flop 417, and the AND gates 418 and 419.

The AND gate 451 has the output signal from the hand-drive pulse generation circuit 405-*a* applied to it, the AND gate 452 has applied to it the output signal form the low-voltage hand-drive pulse generation circuit 405-*d* applied to it, the AND gate 453 has the output signal from the fast-forward pulse generation circuit 405-*e* applied to it, the AND gate 454 has applied to it the output signal from the low-voltage fast-forward pulse generation circuit 405-*f* applied to it, and the AND gate 455 has applied to it the output signal from the reverse-rotation pulse generation circuit 405-*g* applied to it. The AND gate 451, AND gate 453, and the AND gate 455 are controlled directly by the output signal of the voltage level discrimination circuit 410-1, and the AND gates 452 and 454 are controlled by the output signal of the voltage level discrimination circuit 410-1 via an inverter 423, the output signals of the AND gates 451, 452, 453, 454, and 455 being applied to the inputs of an OR gate 456, the output of which is applied to the T input of the toggle flip-flop 417 and to the AND gates 418 and 419.

The reference numeral 417 denotes a toggle flip-flop, the Q and Q-bar outputs of which invert at the rising edge of the output of the OR gate 456, the Q output signal controlling the AND gate 418, an the Q-bar output controlling the AND gate 419 The reference numeral 407 denotes a drive circuit, which comprises a known configuration of two p-channel MOS transistors and two an-channel MOS transistors.

Figure 12:
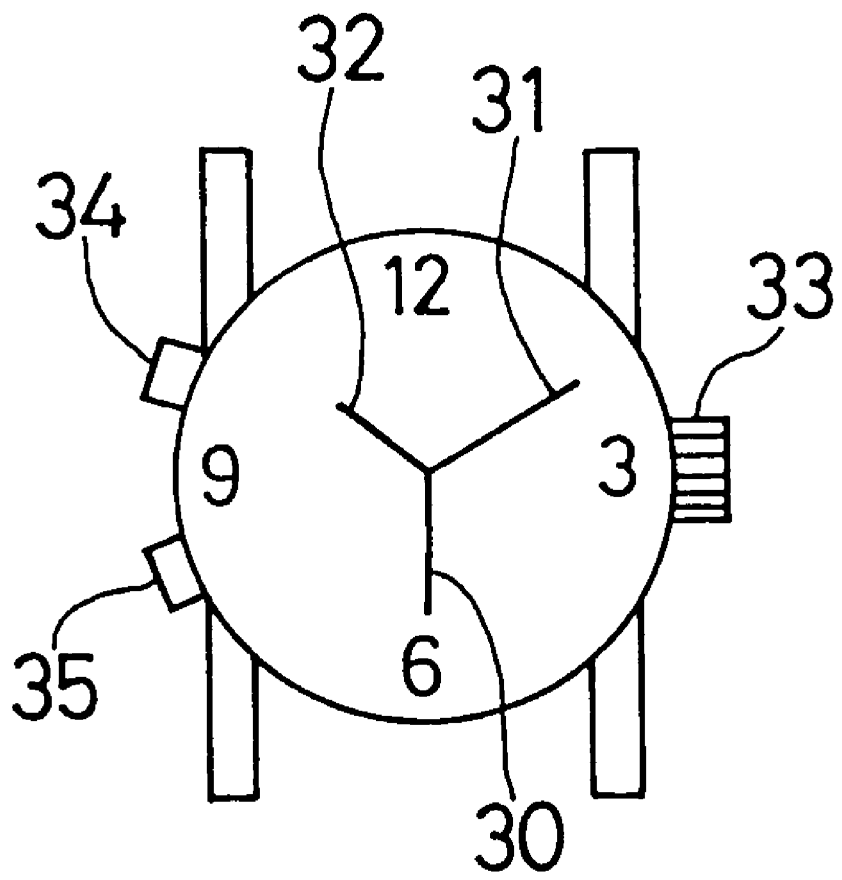
FIG. 12 is an outer view of an electronic watch which shows an embodiment of the present invention.

The reference numeral 421 denotes a coil of the stepping motor 406, which is connected to the output terminal of the drive circuit 407, and 422 is the rotor of the stepping motor, the rotation of this rotor 422 being transmitted via a watch gear train (not shown in the drawing) the second hand 30, minute hand 31, and hour hand 32 which are shown in FIG. 12.

The reference numerals S1, S2 and S3 each denote a switch, each being connected to the power supply VSS during normal hand drive.

That is, in this example, a means for detecting the power supply voltage is used as the non-proper condition detection means 410, and a selective switching circuit 450 which selects the drive pulses is used as the control mode-changing instruction means 411.

With regard to the above-noted configuration, first the normal hand-drive operation when the power supply voltage is 1.2 V or greater will be described. During normal hand drive, signals are output from the hand-drive pulse generating circuit 405-*a* and the low-voltage hand-drive pulse generation circuit 405-*d.* However, because the power supply voltage is 1.2 V or greater the AND gate 451 is in the on condition, and the AND gate 452 is in the off condition. Therefore, the hand-drive pulse which is the output signal from the hand-drive pulse generation circuit 405-*a* passes through the OR gate 456 and is applied to the toggle flip-flop 417, and to the AND gate 418 and the AND gate 419. If on the first hand-drive pulse the Q output of the toggle flip-flop 417 is high, the AND gate 418 is turned on, so that the hand-drive pulse is applied via the AND gate 418 to the drive circuit 407. For this reason, current flow in the coil 421, and the rotor 422 rotates one step in the forward direction. On the next hand-drive pulse, because the toggle flip-flop 417 Q-bar output is high, the AND gate 419 is turned on, so that the hand-drive pulse is applied via the AND gate 419 to the drive circuit 407.

For this reason, current flows in the coil 421 in the reverse direction, and the rotor 422 rotates another step in the forward direction. In this manner, the stepping motor rotates one step at a time in the forward direction, so that the second hand 30, minute 31, and hour hand 32 shown in FIG. 12 are driven to display the time.

Next, the operation of correcting hand position with a power supply voltage of 1.2 V or greater will be described. Before that, however, the operation of rotating the stepping motor forward to correct the hand position will be described.

First, by pulling the stem 33 shown in FIG. 12, which is the external operating element, out to the first step, the switch S1 which is shown in FIG. 10 is connected to the power supply VDD, the last stage of the frequency divider circuit 404 being reset, and the generation of the output signals form the hand-drive pulse generation circuit 405-*a* and the low-voltage hand-drive pulse generation circuit 405-*d* being stopped. Next, when the pushbutton 34 which is the external operating element shown in FIG. 12 is pushed in, the switch S2 is connected to VDD, and a high signal is applied, via the fast-forward pulse generation circuit 405-*e* and the OR gate 424, to the low-voltage fast-forward pulse generation circuit 405-*f.* If this switch is pressed continuously for longer than 1 second, the output signals from the fast-forward pulse generation circuit 405-*e* and the low-voltage fast-forward pulse generation circuit 305-*f* are generated continuously and applied to the AND gate 453 and the AND gate 454, respectively. However, because the power supply voltage is 1.2 V or greater, the AND gate 453 is in the on condition, and the AND gate 454 is in the off condition, so that the output of the fast-forward pulse generation circuit 405-*e* is applied to the drive circuit 407 via the OR gate 456 and the AND gate 418. For this reason, the rotor is fast-forwarded in the forward direction so as to correct the hand position. When the depressed condition of the pushbutton 34 is released, the force of a spring (not shown in the drawing) once again connects the switch S2 to the power supply VSS, so that operation of correction of the hand position is no longer performed.

If the pushbutton 34 is released before it is held depressed for 1 second, only one pulse is generated. Thereafter, if the stem 33 is pushed in the switch S1 is again connected to VSS, the reset condition of the frequency divider circuit 404 being released, so that return is made to the normal hand drive condition. If the stem 33 is pulled out to the second step, it is possible via the rear gear train, in the same manner as with a general watch, to correct the position of the minute hand 31 and the hour hand 32 only. When the stem 33 is pulled out to the second step, by the action of levers (not shown in the drawing) it is no longer possible to push in the pushbuttons 34 and 35.

Next, the cast in which hand position correction is performed by reverse rotation of the stepping motor will be described.

After pulling out the stem 33 shown in FIG. 12, which the first external operating element, when the pushbutton 35 shown in FIG. 12 which is the third external operating element is pressed, the switch S3 is connected to VDD, so that a high signal is applied to the low-voltage fast-forward pulse generating circuit 405-*f*, via the reverse-rotation pulse generation circuit 405-*g* and the OR gate 424. If this is pressed continuously for longer than 1 second, the output signals from the reverse-rotation pulse generation circuit 405-*g* and the low-voltage fast-forward pulse generation circuit 405-*f* will be output continuously and applied to the AND gate 454 and the AND gate 455, respectively. However, because the power supply voltage is 1.2 V or greater, the AND gate 454 is in the on condition and the AND gate 455 is in the on condition, so that only the output signal form the reverse-rotation pulse generation circuit 405-*g* is applied to the drive circuit 407, via the OR gate 456 and the AND gate 418.

For this reason, the rotor 422 is fast-reversed so as to correct the hand position. If the depressed condition of the pushbutton 35 is released, the force of a spring (not shown in the drawing) acts to connect the switch S3 to VSS once again, so that the operation of hand position correction is no longer performed.

If the pushbutton 35 depressed condition is released after a period of time shorter than 1 minute, only one group of reverse-rotation pulses is generated. Thereafter, if the stem is pushed in, the switch S1 is again connected to VSS, the reset condition of the frequency divider circuit 404 is released, and normal hand drive is performed.

Next, the operation of normal hand drive at a power supply voltage of less than 1.2 V will be described.

When the power supply voltage falls below 1.2 V, a low signal from the voltage level discrimination circuit 410-1, that is, a low-voltage discrimination signal is generated, and because the AND gate 451 of the control circuit 450 is turned off and the AND gate 452 of the control circuit 450 is turned on, in this condition a hand-drive pulse, which is the output signal from the low-voltage hand-drive pulse generation circuit 405-*d*, is applied to the drive circuit 407 via the OR gate 456.

As a result, reverse current flow alternately in the coil 421, this causing the rotor 422 to rotate in the forward direction, although non-regularly every 2 seconds, rather than the normal rotation. By means of this rotation, the second hand 30, the minute hand 31, and the hour hand 32 as shown in FIG. 12, are driven. The non-regular hand drive every 2 seconds indicates to the user that the power supply voltage has dropped.

Next, the operation of correction of the hand position when the power supply voltage is less lower than 1.2 V will be described, first for the case in which the pushbutton 34 is pressed to correct the hand position.

When the stem 33 shown in FIG. 12 is pulled out to the first step, as described earlier, the generation of output signals by the hand-drive pulse generation circuit 405-*a* and the low-voltage hand-drive pulse generation circuit 405-*d* is stopped. Next, if the pushbutton 34 shown in FIG. 12 is pressed continuously, as described earlier the output signals from the fast-forward pulse generation circuit 405-*c* and the low-voltage fast-forward pulse generation circuit 405-*f* are generated continuously, these being applied to the AND gate 453 and the AND gate 454, respectively.

However, because the power supply voltage is less than 1.2 V, the AND gate 453 is now in the off condition and the AND gate 454 is in the on condition, so that the low-voltage fast-forward pulse generation circuit 405-*f* is applied, via the OR gate 456, to the drive circuit 407. As a result, the rotor 422 is rotates at high speed (fast forward) in the forward direction so as to correct the hand position. Under this condition, the pulse width is wider than the pulse width is at 1.2 V or higher power supply voltage, and the drive frequency is low, so that normal operation of the stepping motor is possible down to approximately 0.8 V. If the depressed condition of the pushbutton 34 is released, the switch 82 is once again connected to VSS, and the hand position correction operation is stopped.

Thereafter, if the stem 33 is pushed in, the switch S1 is once again connected to VSS, thereby releasing the reset condition of the frequency divider circuit 404, resulting in the non-regular hand movement every 2 seconds.

Next, the case of pressing the pushbutton 35 to correct the hand position when the power supply voltage is less than 1.2 V will be described.

If after pulling out the stem 33 which is shown in FIG. 12 the pushbutton 35 is pressed continuously, as described earlier the output signals of the low-voltage fast-forward pulse generation circuit 405-*f* and the reverse-rotation pulse generation circuit 405-*g* are generated continuously and applied to the AND gate 454 and the AND gate 455, respectively. However, because the power supply voltage is less than 1.2 V, the AND gate 454 is on and the AND gate 455 is off, so that only the output signal from the low-voltage fast-forward pulse generation circuit 405-*f* is applied, via the OR gate 456, to the drive circuit 407. For this reason, the rotor 422 rotates at high speed in the forward direction to correct the hand position.

That is, even if the pushbutton 35 is pressed, at a power supply voltage of less than 1.2 V, reverse-rotation operation is not performed. If the depressed condition of the pushbutton 35 is released, the switch S3 is once again connected to VSS, and the correction of hand position is stopped. Thereafter, if the stem 33 is pushed in, the switch S1 is again connected to VSS, resulting in release of the reset condition of the frequency divider circuit 404, so that non-regular hand movement every 2 seconds occurs.

In the above-described embodiment, while the description of fast-forward operation and reverse-rotation operation was for the case of correcting the hand position for the display of the time, the present invention does not necessarily impose such a limitation, and variations are possible wit the scope of the essence of the present invention. For example, the essence of the present invention includes application to position correction of alarm time display hands, and initial position reset of the stopwatch hand of an electronic watch which has a stopwatch function.

In the above-noted aspect of the present invention, when the power supply voltage falls below a prescribed voltage, reverse-rotation operation of a stepping motor, which is difficult at a low voltage, is prohibited, the width of the forward drive pulse is increased and, because the drive speed is made low, the stepping motor is operated with good stability even at a low voltage, the resulting effect being large.

Next, a specific example of the second aspect of the electronic watch 400 according to the present invention will be described, with reference being made to FIG. 13 and FIG. 14.

Figure 13:
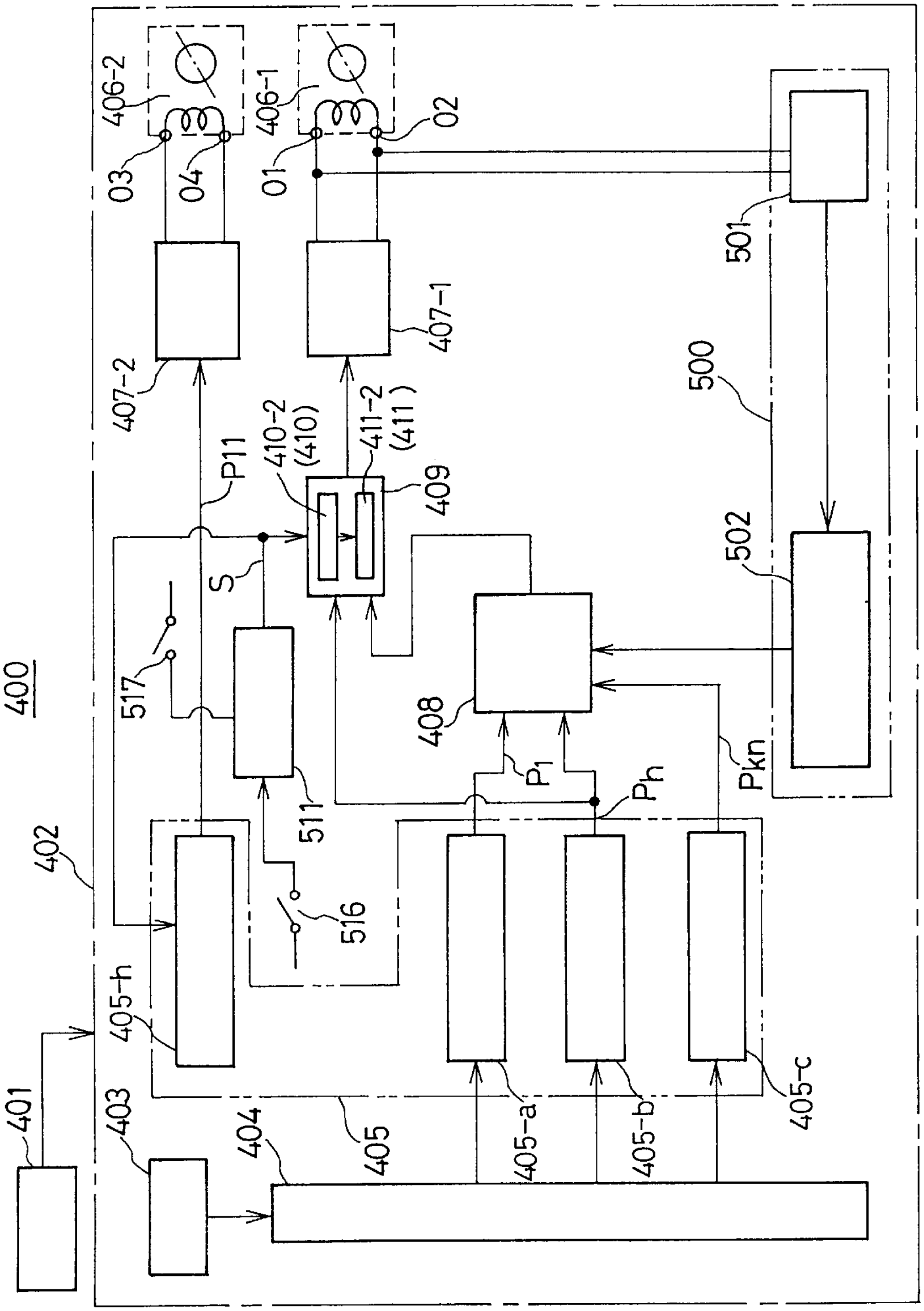
FIG. 13 is a block diagram which shows the second aspect of an embodiment of an electronic watch according to the present invention.
Figure 14A:
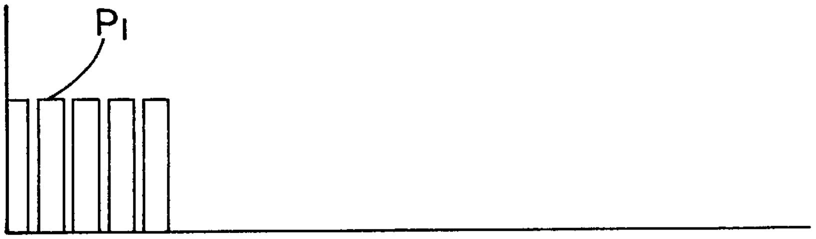
FIGS. 14A–14D are waveform diagrams which show the output pulse waveforms in the second aspect of an embodiment of an electronic watch according to the present invention.
Figure 14B:
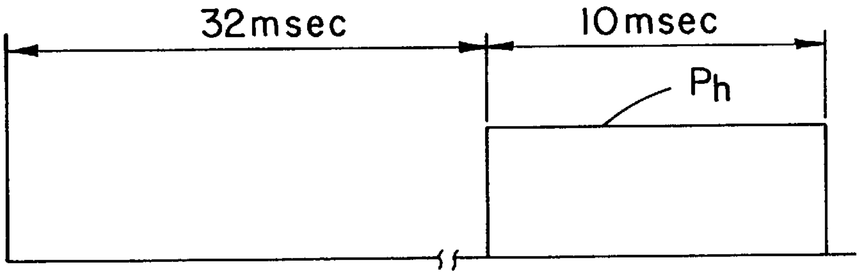
Figure 14C:
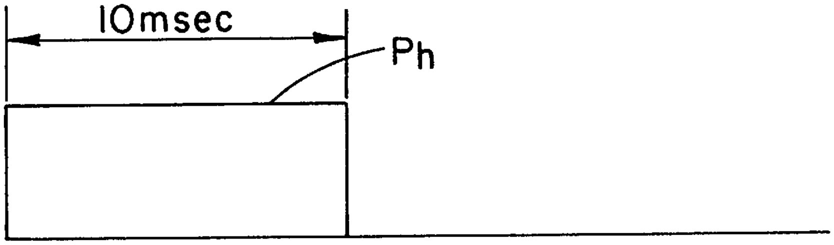
Figure 14D:

Specifically, FIG. 13 is a general block diagram of an example of the second aspect of the electronic watch 400 according to the present invention, this comprising the power supply 401 and the watch circuit 402.

In this electronic watch, the watch circuit 402 comprises an oscillator circuit 403, a frequency divider circuit 404, a drive pulse generation means 405, a drive motor 406 which, in response to the drive pulse P1 which is output by the above-noted drive pulse generation means 405, drives at least one of an hour/minute, second, and chronograph hand, a drive circuit means 407 which controls the drive of the above-noted drive motor 406, a drive circuit control means 408 which controls the above-noted drive circuit means 407, and a control condition detection means 409 which is connected to the above-noted drive circuit control means 408 and which detects a control condition in the above-noted drove circuit control means 408. In this electronic watch, the above-noted drive pulse generation means 405 minimally comprises a normal hand-drive pulse generation circuit 405-*a,* a compensation drive pulse generation circuit 405-*b,* and a chronograph display fast-forward (high-speed) pulse generation circuit 405-*h,* the above-noted drive motor 406 and drive circuit means 407 therefor comprising a first drive motor 406-1 which is driven by the above-noted normal hand-drive pulse, a first drive circuit means 407-1, a second drive motor 406-2 which is driven by a high-speed pulse which is higher in speed than the above-noted normal hand-drive pulse, and a second drive circuit means 407-2.

Furthermore, in this electronic watch the above-noted control condition detection means 409 detects whether or not the above-noted first drive motor 406-1 rotated in response to a prescribed drive pulse supplied by the above-noted first drive circuit means 407-1 and includes a load compensation control system 500 which, if a judgment is made that the first drive motor 406-1 did not rotate, supplies a prescribed compensation drive pulse Ph to the circuit means 407-1 to thereby compensate the first drive motor 406-1, and further the drive circuit control means 408 of this electronic watch 400 being provided with a non-proper condition detection means 410 which comprises a monitor circuit 410-2 that monitors the rotation condition of the above-noted second drive motor 406-2, whereby, in response to the output from the above-noted non-proper condition detection means 410 of a detection signal which indicates a non-proper rotation condition of the above-noted second drive motor 406-2 is output, and means 411-2 for stopping the execution of the load compensation control system 500 with respect to the above-noted first drive motor 406-1, this being provide as a control mode changing instruction means 411.

In another example of this aspect of the electronic watch 400, in the above-noted configuration, when the control mode change-instructing means 411 stops the execution of the load compensation control system 500 by means of the detection signal from the above-noted non-proper condition detection means 410, the above-noted compensation drive pulse Ph is supplied to the first drive motor 406-1.

That is, in this example in particular, the monitor circuit 410-2 which monitors the drive condition of a drive motor to prevent the intrusion of magnetic noise interference from a neighboring drive motor therein is used as a non-proper condition detection means 410 of the control condition detection means 409, and a means for stopping the execution of the load compensation control system 500 is used as the above-noted control mode change-instructing means 411.

The above-noted example is describe in detail below.

Specifically, the electronic watch 400 in this example has a motor drive circuit 405 which generates a normal drive pulse and a compensation drive pulse, a first motor 406-1 which is controlled by detection of non-rotation by the detection circuit 501 and which is compensated by the load compensation circuit 502, and a second drive motor 406-2 which is driven at high speed by a high-speed pulse having a frequency of 1 Hz or higher, and further has as a control mode change-instructing means 411 a load compensation disabling means 411-2 whereby, when the above-noted second drive motor 406-2 is driven at high speed, the load compensation operation with respect to the first drive motor 406-1 is prohibited. Furthermore, the above-noted motor drive circuit 407-1 supplies a compensation drive pulse Ph to the above-noted first drive motor 406-1 by means of the above-noted load compensation disabling means 411-2.

Next an embodiment of the present invention will be described in detail, with reference made to accompanying drawings. FIG. 13 is a block diagram of this specific example of the electronic watch 400, and FIG. 14 is a waveform drawing of the waveforms that are output by the electronic watch which is shown in FIG. 13. The module configuration of this embodiment is basically the same as in examples in the past.

In FIG. 13, the reference numeral 406-1 is a first stepping motor for the purpose of displaying the time, 406-2 is a second stepping motor for the purpose of displaying a chronograph, 407-1 is a first motor drive circuit for the purpose of driving the above-noted first stepping motor 406-1, and 407-2 is a second motor drive circuit for the purpose of driving the above-noted second stepping motor 406-2. In the same drawing, the reference numeral 403 is an oscillator circuit, 404 is a frequency divider circuit, 405-*a* is a normal drive pulse generation circuit which generates a normal drive pulse P1, 405-*b* is a compensation drive pulse generation circuit which generates a compensation drive pulse Ph, 405-*c* is a rotation detection signal generating circuit which generates the coil switching pulses Pk1 through Pk8 which cause the induction of voltages for the detection of rotation, 501 is a detection circuit which detects an induced voltage of the first stepping motor 406-1, 502 is a load compensation control circuit which makes a judgment of rotation and non-rotation by means of a signal of the detection circuit 501, a load compensation control system 500 being formed by the detection circuit 501 and the load compensation control circuit 502, and 408 is a first motor control circuit which outputs a compensation drive pulse Ph for the non-rotation condition according to the signal for the load compensation control circuit 502. Additionally, 405-1 is a chronograph pulse generating circuit which generates a chronograph pulse, 511 is a chronograph control circuit which supplies to the second motor drive circuit 407-2 a chronograph pulse P11 which is generated by the chronograph pulse generation circuit **405-*h* and which is controlled by the S switch 516 and or the R switch 517, 409 is a control condition detection means which comprises the non-proper condition detection means 410-2 that recognizes the operation condition of the second drive motor 406-2 from the existence or non-existence of a signal from the chronograph control circuit 517, and the control mode change-instruction circuit 411-2 which supplies the compensation drive pulse Ph that is generated by the compensation drive pulse generating circuit 105 to the first drive motor 406-1**.

Next the operating of the above-noted circuit will be described. The oscillator circuit 403 outputs a signal having a frequency of 32768 Hz, based on a quartz crystal, and the frequency divider circuit 404 frequency divides this signal. The normal drive pulse generation circuit **405-*a* generates a normal drive pulse P1 as shown in FIG. 14** (*a*) every 1 second, based on a signal of the frequency divider circuit 404.

The normal drive pulse P1, as describe with regard to an example of the past, is a pulse having a width of 5 ms and a pulse resting period of 1.4 ms each 1 ms. The compensation drive pulse generation circuit **405-*b* generates a compensation drive pulse Ph as shown in FIG. 14** (*b*), based on a signal from the frequency divider circuit 404. The compensation drive pulse Ph is a 10-ms pulse that is delayed 32 ms with respect to the normal drive pulse P1. Additionally, the compensation drive pulse generation circuit **405-*b* generates a compensation drive pulse Ph as shown in FIG. 14** (*c*), based on a signal from the frequency divider circuit 404, this pulse being output every 1 second.

Figure 4:
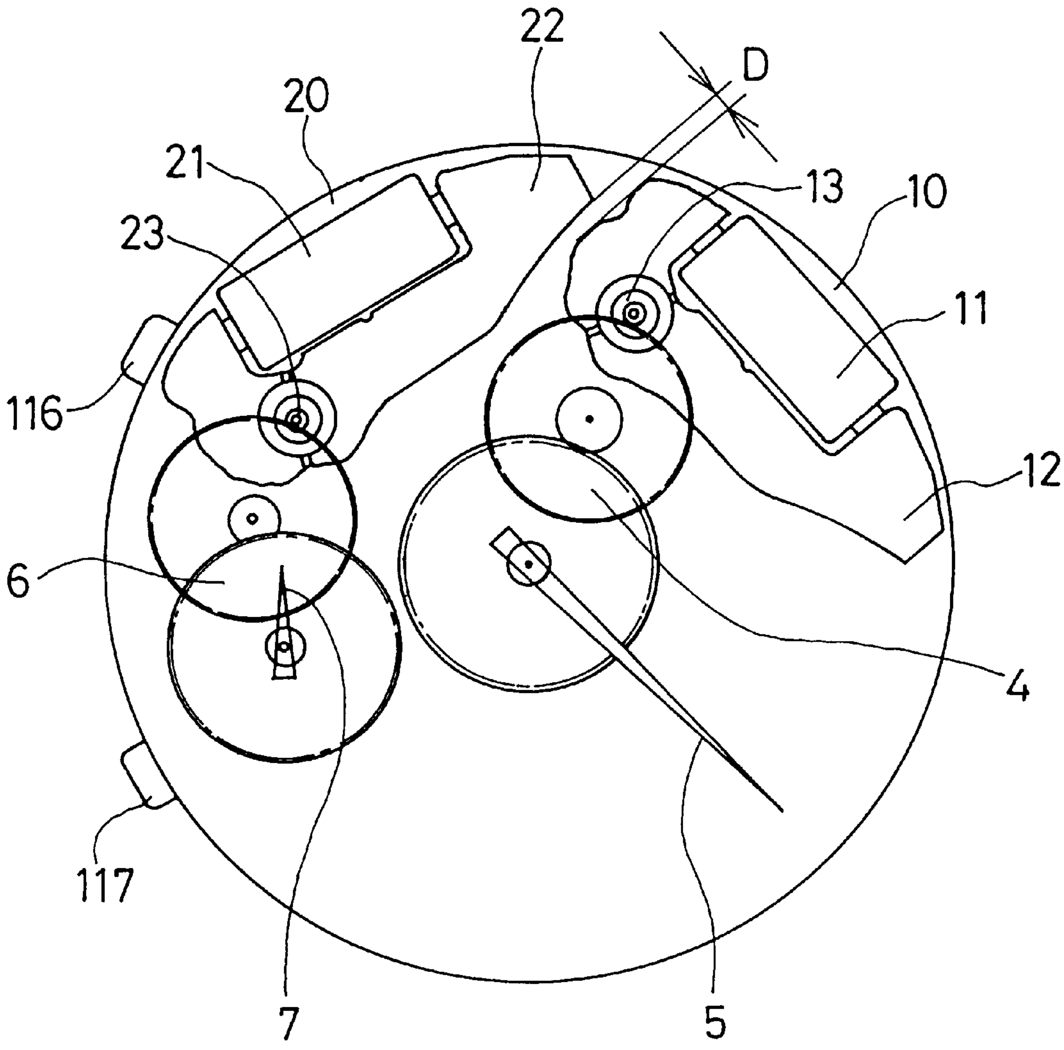
FIG. 4 is a plan view of an electronic watch module of the past.

During normal operation, that is, when the chronograph is not operating, the chronograph 7 is stopped at the 0 position, as shown in FIG. 4. In this condition, the chronograph control circuit 511 outputs a low-level signal as an S control signal. The non-proper condition detection means 410-2, which is a selector gate, receives the low-level control signal S, in response selects a pulse which is output from the first motor control circuit 408, and supplies this to the first motor drive circuit 407-1.

Figure 1:
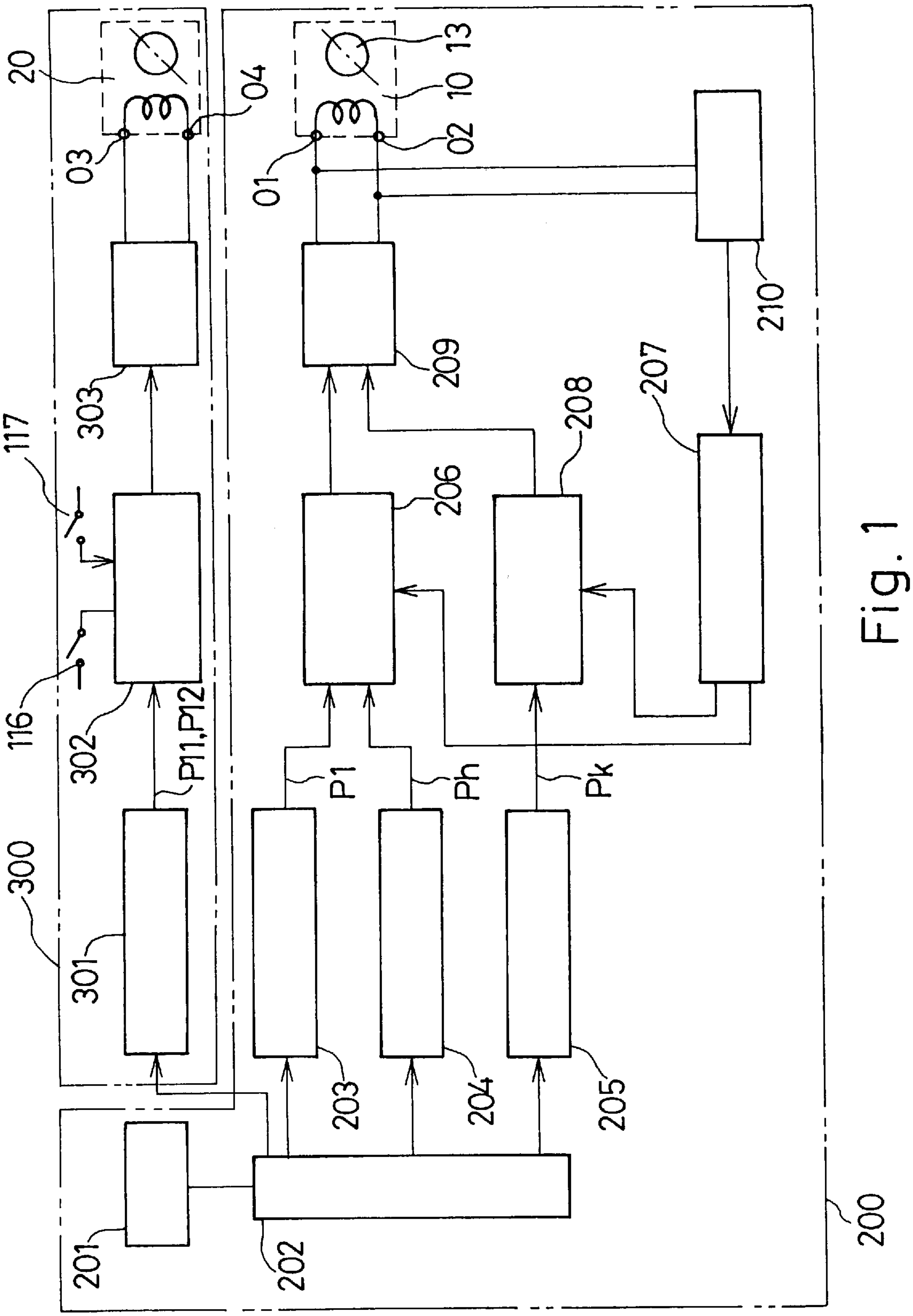
FIG. 1 is a block diagram of an embodiment of an electronic watch in the past.
Figures 2A, 2B, 2C, 2D:
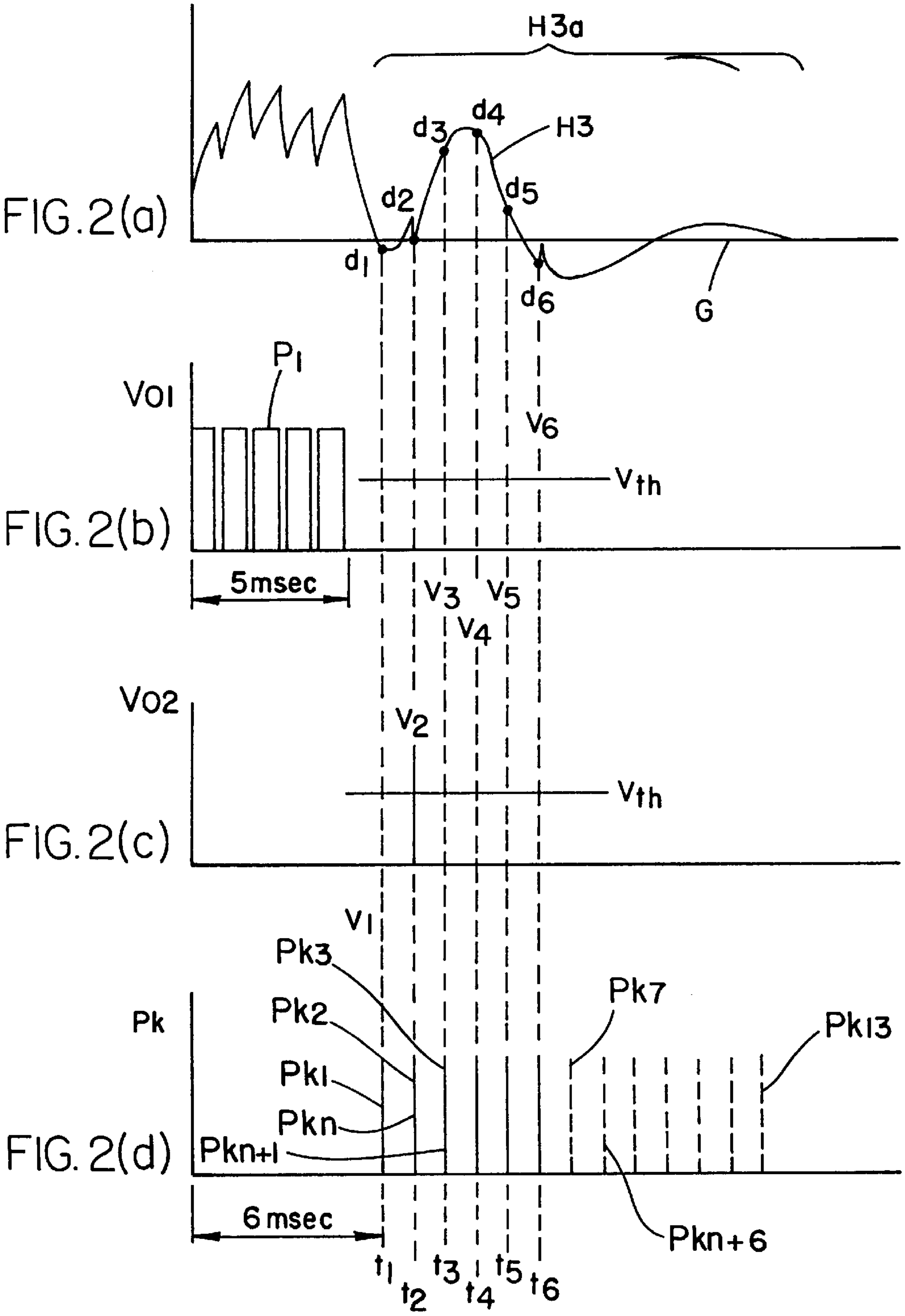
FIGS. 2A–2D are waveform diagrams which show the operation of rotation detection for load compensation in the past.
Figures 3A, 3B, 3C, 3D:
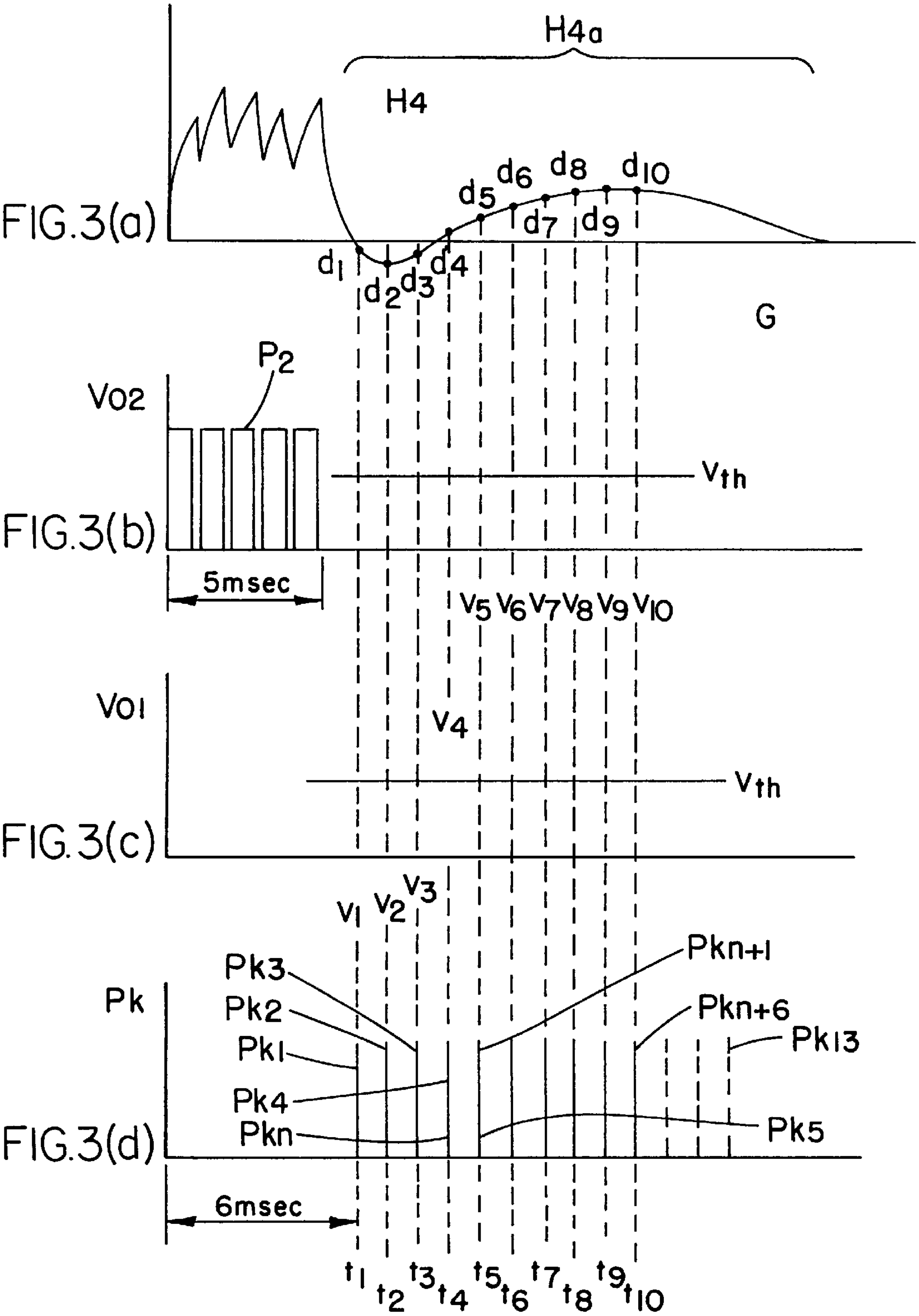
FIGS. 3A–3D are form diagrams which show the operation of non-rotation detection for load compensation in the past.

The first motor drive circuit 407-1 has supplied to it with a 1-second timing, via the control condition detection means 409 which includes the non-proper condition detection means 410-2, the normal drive pulse P1, resulting in normal drive of the first stepping motor 406-1. Additionally, the coil switching pulses Pk1 through Pk8, which are output by the rotation detection signal generation circuit **406-*c* are supplied to the first motor drive circuit 407-1, via the first motor control circuit 408 and the control condition detection means 409, and whether or not the induced voltage at that time exceeds a threshold voltage Vth is detected by the detection circuit 501. The results of this detection are transmitted to the load compensation control circuit 502, thereby making a judgment of rotation and non-rotation, the method of making this judgment being exactly the same as described with regard to the example of the past illustrated by FIG. 2 and FIG. 3. Then, if the load compensation control circuit 502 makes the judgment that rotation occurred, it controls the first motor control circuit 408 so that a compensation drive pulse Ph is not output. If, however, the judgment is made that rotation did not occur, it performs control of the first motor control circuit 408** so that a compensation drive pulse Ph is output.

Thus, if it is not possible with the normal drive pulse P1 to drive the first stepping motor 406-1, the compensation drive pulse Ph drives the motor once again so that the watch does not lag.

Next, when the S switch 516 is turned on, the chronograph is started, placing the chronograph in the operating condition. At this time, the chronograph control circuit 511 outputs a high-level control signal S.

In response to this high-level control signal S, the chronograph pulse generation circuit **405-*h* outputs to the second motor drive circuit 407-2 a chronograph pulse P11 as shown in FIG. 14** (*d*) each 10 ms. Then the second stepping motor 406-2 rotates forward at a high speed of 10 Hz, chronograph hand 7 being move at a high speed as the chronograph operates. The control condition detection means 409 receives the high-level control signal S from the chronograph control circuit 511, and in response switches from the condition of selection of the above-noted first motor control circuit 408 to the condition of selection of the compensation pulse generation circuit **405-*b*, thereby supplying a compensation pulse Ph to the first motor drive circuit 407-1. By doing this, the compensation pulse Ph is supplied to the first stepping motor 406-1 every 1 second. Furthermore, to assure reliable rotation the compensation pulse Ph has a width of 10 ms, which is larger than the normal drive pulse P1**.

During the period in which the chronograph is in the operation condition, that is, during the period in which the second stepping motor 406-2 is rotating at high speed, load compensation operation with respect to the first stepping motor 406-1 is prohibited, and drive is done with the compensation pulse Ph. That is, in this embodiment the above-noted control condition detection means 409 includes a load compensation disabling means 411-2, that is, the control mode change-instructing means 411-2 which, while the second stepping motor 406-2 is rotating at high speed, prohibits load compensation operation with respect to the first stepping motor 406-1.

In addition, when the S switch is turned on, the stop operation is performed, the control signal S of the chronograph control circuit 511 being reset to the low level. The chronograph pulse generation circuit **405-*h* output of the chronograph pulse P1 is stopped by means of this low-level control signal S, this causing the stoppage of the rotation of the second stepping motor 406-2. Simultaneous with this, the control condition detection means 409 receives the control signal S, resulting in selection once again of the pulse which is output by the first motor control circuit 408**, this causing restarting of the load compensation operation.

Next, when the R switch 517 is set to on, the reset operation is performed, this causing the chronograph hand 7 to be reset to the 0 position at high speed. AT this time as well, the operation performed is similar to the above-described case of chronograph operation, That is, by means of the reset operation, the chronograph control circuit 511 goes into the condition in which it outputs a high level control signal S. The chronograph pulse generation circuit **405-*h*, in response to thigh high-level control signal S, outputs a chronograph pulse P11 to the second motor drive circuit 407-2. The second stepping motor 406-2, in response to this chronograph pulse P11, performs high-speed rotation at 100 Hz, thereby moving the chronograph hand 7 to the 0 position. The control condition detection means 409, in response to receiving the high-level control signal S fro the chronograph control circuit 511, switches from the condition of selection of the above-noted first stepping motor control circuit 408 to the condition of selection of the compensation pulse generation circuit 405**-*b,* this causing supply of the compensation pulse Ph to the first motor drive circuit 407-1. The result is that the first stepping motor 406-1 and the chronograph hand 7 are driven by the compensation pulse Ph every 1 second until return is made to 0.

When the return of the chronograph hand 7 to 0 is completed, the chronograph control circuit 511 returns to the condition in which it outputs a low-level control signal S. Then, in response to this low-level control signal S, the chronograph pulse generation circuit 405-*h* stops output of the chronograph pulse P11. Simultaneous with this, the control condition detection means 409, in response to this low-level control signal S, once again returns to the condition of selection of the first motor drive circuit 408, this causing restarting of the load compensation.

In the above-noted embodiment, while the description is for the case in which one type of the normal drive pulse P1 is made available, in the past there has been a know a method in which a plurality of types of normal drive pulse provided, the drive pulse being selected therefrom as the smallest drive pulse capable of providing drive. The present invention provides the same type of effect with regard to this method as well. As is clear from the above description, according to the present invention the current consumption of the first stepping motor 406-1 is normally limited by load compensation operation, and when chronograph operation or the like is performed, the load compensation operation, in which there is a risk of erroneous detection, is stopped thereby preventing misoperation. Additionally, in this case by driving with a compensation pulse which is larger than the normal drive pulse, reliable drive is ensured. The effect of suing the above-noted system is that it is possible to have a design in which the first stepping motor 406-1 and second stepping motor 406-2 are located in proximity on the same plane.

The present invention solves the above-noted problem and enables the provision of an electronic watch which, by preventing misoperation of the load compensation operation caused by externally introduced magnetic interference from a neighboring stepping motor, keeps tie without disturbance therefrom.

Figure 18:
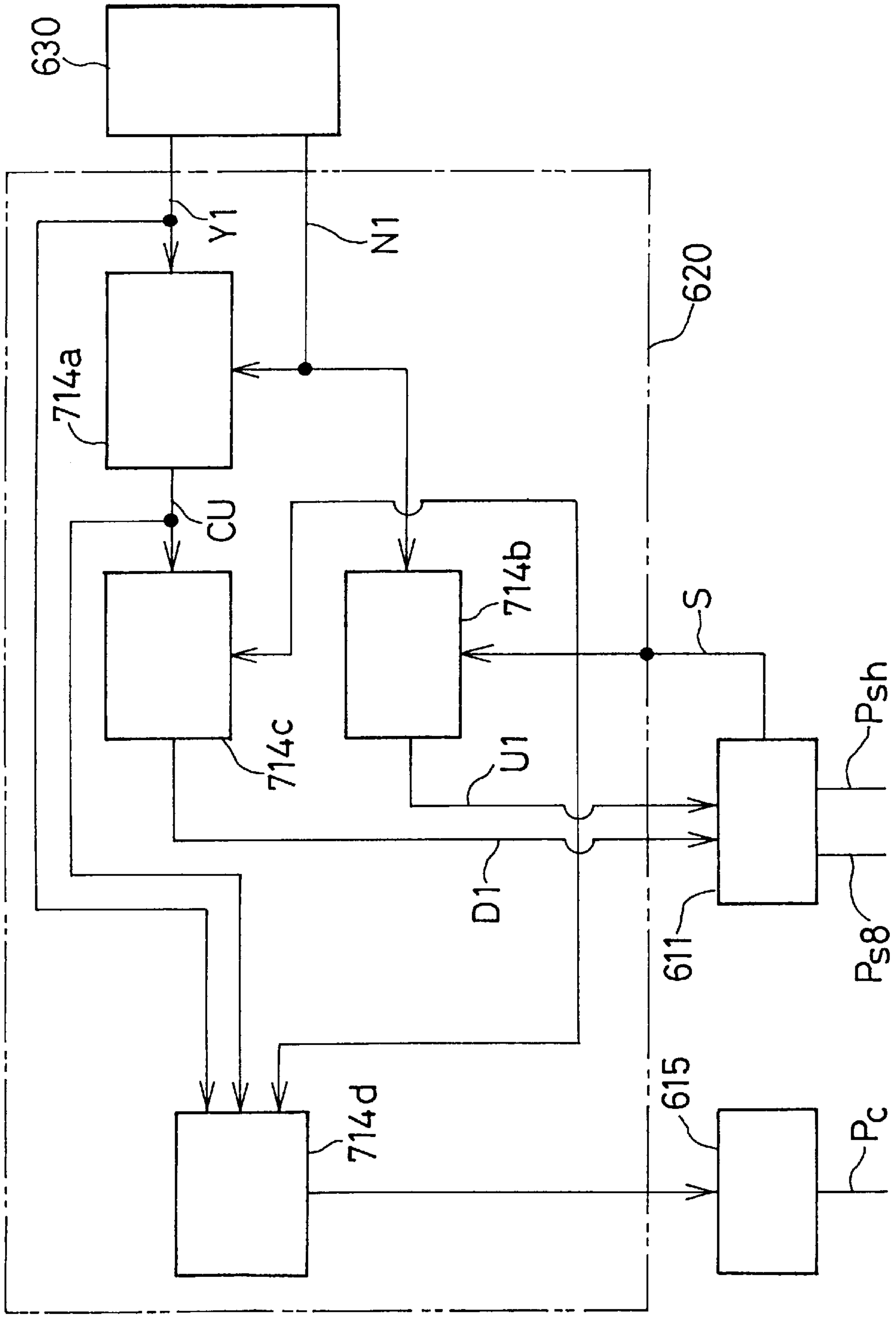
FIG. 18 is a block diagram which shows the area surrounding the first load compensation circuit of an aspect of embodiment of the present invention.

Next, a specific example of the third aspect of the electronic watch 400 according to the present invention will be described, with reference being made to FIG. 15 through and FIG. 18.

Figure 15:
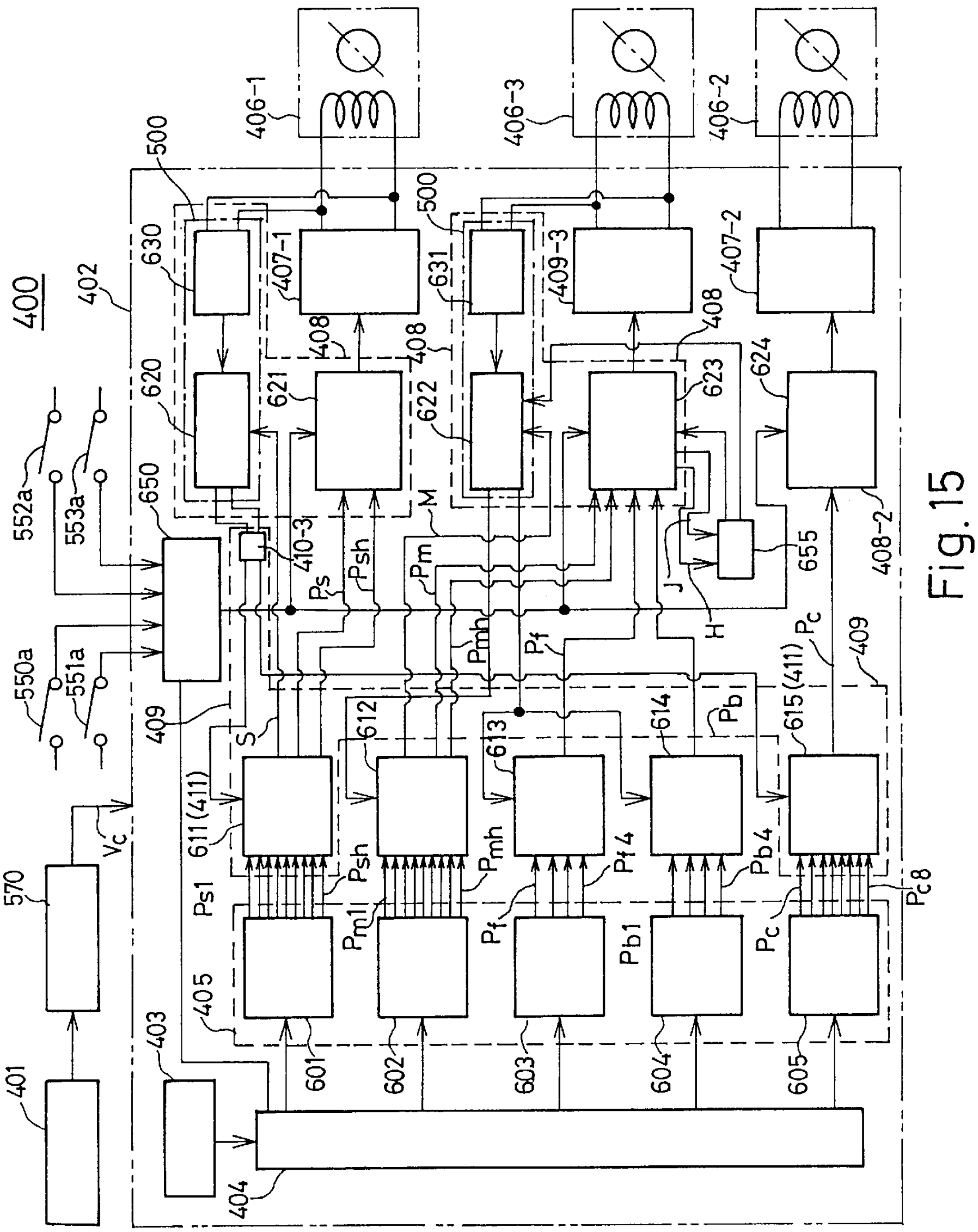
FIG. 15 is a block diagram which shows the third aspect of an embodiment of an electronic watch according to the present invention.

Specifically, FIG. 15 is a general block diagram of an example of the third aspect of the electronic watch 400 according to the present invention, this comprising the power supply 401 and the watch circuit 402. In this electronic watch, the watch circuit 402 comprises an oscillator circuit 403, a frequency divider circuit 404, a drive pulse generation means 405, a drive motor 406 which, in response to the drive pulse P1 which is output by the above-noted drive pulse generation means 405, drives at least one of an hour/minute, second, and chronograph hand, a drive circuit means 407 which controls the drive of the above-noted drive motor 406, a drive circuit control means 408 which controls the above-noted drive circuit means 407, and a control condition detection means 409 which is connected to the above-noted drive circuit control means 408 and which detects a control condition in the above-noted drive circuit control means 408.

In this electronic watch, the above-noted drive pulse generation means 405 minimally comprises a normal hand-drive pulse generation circuit 601, and a non-normal hand-drive pulse generation circuit 605 which generates a non-normal drive pulse that differs from the normal hand-drive pulse, the configuration further comprising a first drive motor 406-1 and a first drive circuit means 407-1 which are driven by the above-noted normal hand-drive pulse, a second drive motor 406-2 and a second drive circuit means 407-2 which are driven by the above-noted non-normal hand-drive pulse, the configuration additionally being such that, from the above-noted normal hand-drive pulse generation circuit 601 and above-noted non-normal hand-drive pulse generation circuit 605, a plurality of normal hand-drive pulses Ps and a compensation pulses Psh, these having mutually differing drive capacities, and a plurality of non-normal hand-drive pulses Pc and compensation pulses Pc1, these also having mutually differing drive capacities, the above-noted drive circuit control means 408-1 including a load compensation control system 500 which detects the rotation and non-rotation of the first drive motor 406-1 in response to a prescribed drive pulse which is supplied to the first drive circuit means 407-1 and, in the case in which it is judged that the first drive motor 406-1 did not rotate, supplies a prescribed compensation drive pulse Psh to the above-noted first drive circuit means 407-1 so as to compensation the rotation of the first drive motor 406-1.

In addition the above-noted control condition detection means 409 of this electronic watch is provided with a non-proper condition detection means 410 which comprises an output means 410-3 that outputs predicted voltage information of the power supply from the output voltage in the load compensation control system, and a control mode change-instructing means 411 which comprises a selection circuit 611 and/or 615 that selects, based on the information of the above-noted non-proper condition detection means 410, at least one drive pulse from at least one pulse gruop of the plurality of normal hand-drive pulse groups and non-normal hand-drive pulse groups which are output, respectively, from the above-noted normal hand-drive pulse generation circuit 601 and the above-noted non-normal hand-drive pulse generation circuit 605.

The above-noted non-normal hand-drive pulse generation circuit 605 in this example includes at least one of a high-speed pulse generation circuit and a reverse-rotation pulse generation circuit.

That is, in this example, a predicted voltage information output means 410-3 which outputs predicted voltage information of the power supply voltage from the output voltage in the load compensation control system is used a the non-proper condition detection means 410 of the control condition detection means 409, and a selection circuit 611 and or that selects, based on the information of the above-noted non-proper condition detection means 410, at least one drive pulse form at least one pulse gruop of the plurality of normal hand-drive pulse groups and non-normal hand-drive pulse groups which are output, respectively, from the above-noted normal hand-drive pulse generation circuit 601 and the above-noted non-normal hand-drive pulse generation circuit 605 is used as the control mode change-instruction means 411.

The above-noted example is described in detail below.

Specifically, the electronic watch 400 in the above-noted example comprises an electrical power supplying means 401, a first stepping motor 406-1, a normal pulse generating means 601 which generates a plurality of normal pulses having mutually differing drive capacities for the purpose of driving the above-noted first stepping motor 406-1, a normal pulse selection means 611 which selectively outputs one normal pulse from the above-noted plurality of pulses, a detection means 630 which detects rotation and non-rotation of the above-noted first stepping motor 406-1, and a load compensation control circuit 620 which establishes the selection condition for the above-noted normal pulse selection means 611, in accordance with a detection signal of the above-noted detection means 630, a second stepping motor 406-2, a non-normal pulse generation means 605 which generates a plurality of non-normal pulses having mutually differing drive capacities for the purpose of driving the above-noted second stepping motor 406-2, and a non-normal pulse selection circuit 615 which selectively outputs one of the above-noted plurality of non-normal pulses being further provided, the selection condition of the pulse selection circuit 615 being established by means of the power supply voltage prediction means 410-3 which is connected to the above-noted load compensation control circuit 620.

That is, in this example, the power supply voltage prediction means 410-3 corresponds to the non-proper condition detection means 410, and the pulse selection circuits 611 and 615 correspond to the control mode change-instructing means 411.

Furthermore, in this example the electrical power supplying means 401 is a rechargeable electrical power supplying means, which includes a solar battery.

Figure 16:
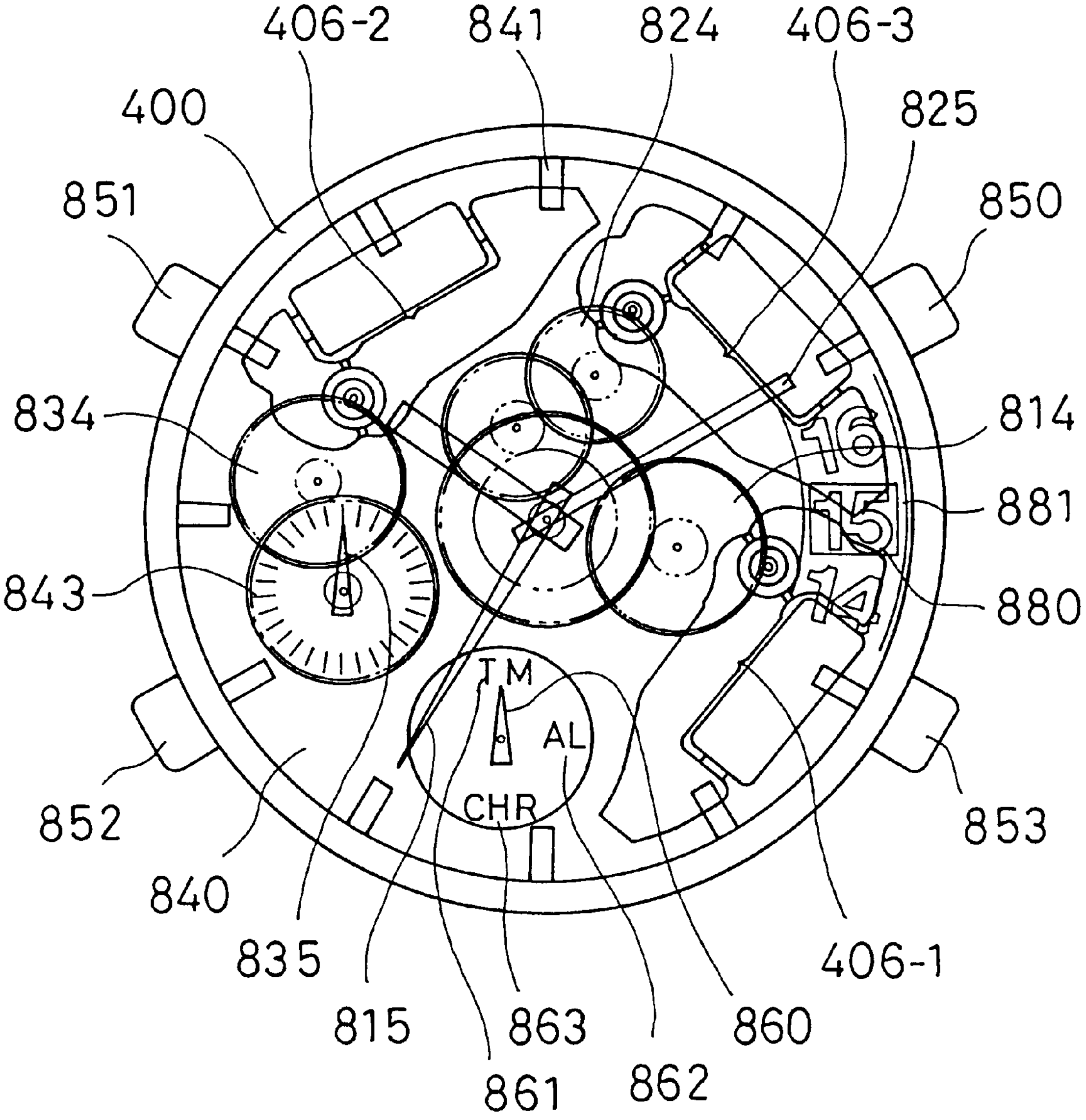
FIG. 16 is a plan view of the construction of an electronic watch of the above-noted embodiment of the present invention.

Next, the above-noted aspect of the embodiment of the present invention will be described in detail, with reference made to the appropriate accompanying drawings. FIG. 16 is a plan view of an electronic watch of this aspect of an embodiment of the present invention, in which the reference numeral 400 denotes the electronic watch, 406-1 is the first stepping motor, 814 is a second gear train, and 815 is a second hand. The first stepping motor 406-1 drives the second hand 815 via the second gear train 814. In this same drawing, 406-3 is a second stepping motor, 824 is an hour/minute gear train, 825 is a minute hand, and 826 is an hour hand. The second stepping motor 406-3 drives the minute hand 825 and the hour hand 826 via the hour/minute gear train 824. The reference numeral 406-2 denotes a third stepping motor, 834 is a chronograph gear train, and 835 is a chronograph hand.

The third stepping motor 406-3 dives the chronograph hand 835 via the chronograph gear train 834. The reference numeral 840 denotes a watch face which comprises a solar cell, onto which hour markings 841, a chronograph scale 843, a time mode mark 861, an alarm mode mark 862, and a chronograph mode mark 863 are printed. The reference numeral 853 denotes a an M button which switches between the time mode, the alarm mode, and the chronograph mode, 851 is an S button which starts and stops the chronograph, 852 is an R button which resets the chronograph, and 850 is a correction button for correcting the time. The reference numeral 860 is a mode hand which is mechanically driven by the M button 860, this pointing to one of the time mode mark 861, the alarm mode mark 862, the chronograph mark 863 to indicate the mode. The reference numeral 880 is a calendar display part which indicates the date by being driven by the hour hand 826, via a gear train.

First, the functions and operation method of the electronic watch 400 configured as noted above will be described, The electronic watch 400, in addition to having a normal time mode, has an alarm mode and a chronograph mode function. Each time the M button 853 is pressed, sequential switching is performed of the mode hand 860 between the time mode mark 861, the alarm mode mark 862, and the chronograph mode mark 863 to indicate the selected mode, the electronic watch 400 functioning in the mode indicated thereby.

The electronic watch 400 shown in FIG. 16 is shown in the normal time mode, the mode hand 860 pointing at the time mode mark 861, in which condition the second hand 815, the minute hand 825, and the hour hand 826 are indicating the time 10:10:35, and the date plate 881 of the calendar display part 880 is indicating the date of the 15th. In the normal time mode, the mode hand 860 points to the time mode mark 861, the second hand 15 performing a normal second display by being advanced every 1 second by the first stepping motor 406-1, the minute hand 825, hour hand 826, and date plate 881 being driven every 20 -seconds by the second stepping motor 406-3 to indicate the minute, the hour, and the date. Furthermore, when the time reaches 0:00, gears mesh and the date plate 881 is advanced by one day in short period of time, at which time the drive load is larger than usual, making it difficult for the second stepping motor 406-3 to rotate. The pulse control when this load variation occurs is described below.

When the M button 853 is pressed in the normal time mode, the mode hand 860 moves from the time mode mark 861 so as to point to the alarm mode mark 862, and a switch is made to the alarm mode. The second stepping motor 406-3 is rotated at high speed at 64 Hz, the minute hand 825 and hour hand 826 being driven in the clockwise direction so as to indicate the set alarm time. If the correction button 850 is pressed continuously when in this alarm mode, the second stepping motor 406-3 is rotated at a high speed of 64 Hz, so that the minute hand 825 and the hour hand 826 are driven clockwise to correct the alarm time. If the correction button is released, the second stepping motor 406-3 stops, the time pointed to by the minute hand 825 and the hour hand 826 at that point being set as the alarm time. The above operations can be used to correct the alarm time. Furthermore, the second hand 815 continues to indicate the second in the alarm mode as well, this being driven every 1 second by the first stepping motor 406-1.

If at the point the M button 853 is pressed once again, the mode hand 860 moves from the alarm mode mark 862 so as to point to the chronograph mode mark 863, and a change is made to the chronograph mode. The second stepping motor 406-3 is driven in reverse at 32 Hz, the minute hand 825 and the hour hand 826 being drive counterclockwise so as to change from the alarm time to the normal time display. The chronograph hand 835, as shown in FIG. 16, is stopped at the 12-o'clock position. If the S button 851 is pressed when in the chronograph mode, the chronograph hand 835 starts to move in chronograph operation.

Then if the S button 851 is pressed once again, the stop operation is performed, the third stepping motor 406-2 stopping and the chronograph hand 835 indicating the stopping position. Then if the R button 852 is pressed, a reset is performed, the third stepping motor 406-2 being driven at a high forward speed of 100 Hz, and the chronograph hand 835 moving to and stopping at the 12-o'clock position. Furthermore, in the chronograph mode, the second hand 815 continues to indicate the second of the normal time, this hand being advanced every 1 second by the first stepping motor 406-1.

Next, the circuit operation related to the above will be described. FIG. 15 is a block diagram which shows the system of the electronic watch 400 shown in FIG. 16. In FIG. 15, the reference numeral 401 denotes a solar cell which generates electrical energy by means of light, 570 is an electrical double-layer capacitor that stores electrical energy, and 402 is a watch circuit which is operated by the electrical energy that is stored in the electrical double-layer capacitor 570.

In the same FIG. 15, 403 is an oscillator circuit which generates the reference clock necessary for circuit operation, 404 is a frequency divider circuit which frequency divides the reference clock generated by the oscillator circuit 403, 601 is a first normal pulse generation circuit that generates normal pulses Ps1 to Ps8 for the purpose of normal drive of the first stepping motor 406-1 and a compensation pulse Ph for the purpose of compensation drive, 602 is a second normal pulse generation circuit that generates normal pulses Pm1 to Pm8 for the purpose of normal drive of the second stepping motor 406-3 and a compensation pulse Pmb for the purpose of compensation drive, 603 is a second high-speed pulse generation circuit that generates high-speed pulses Pf1 to Pf4 for the purpose of driving the second stepping motor 406-3 at a high speed of 64 Hz, 604 is a second reverse-rotation pulse generation circuit that generates reverse-rotation pulses Pb1 to Pb4 for the purpose of rotating the second stepping motor 406-3 in reverse at 32 Hz, 605 is a third high-speed pulse generation circuit that generates high-speed pulses Pc1 to Pc8 for the purpose of driving the second stepping motor 406-3 at a high speed of 100 Hz, 611 is a first normal pulse selection circuit which selects one normal pulse Ps form the normal pulses Ps1 to Ps8 which are generated by the first normal pulse generation circuit 601, 612 is a second normal pulse selection circuit which selects one normal pulse Pm of the normal pulses Pm1 to Pm8 that are generated by the second normal pulse generation circuit 602, 613 is a second high-speed pulse selection circuit which selects one high-speed pulse Pf from the high-speed pulses Pf1 to Pf4 that are generated by the second high-speed pulse generation circuit 603, 614 is a second reverse-rotation pulse selection circuit which selects one reverse-rotation pulse Pb from the reverse-rotation pulses Pb1 to Pb4 that are generated by the second reverse-rotation pulse generation circuit 604, 615 is a third high-speed pulse selection circuit which selects one high speed pulse Pc from the high-speed pulses Pc1 to Pc8 that are generated by the third high-speed pulse generation circuit 605, 650 is a timekeeping control circuit which performs control of the timekeeping, alarm, and chronograph functions, based on a signal from the frequency divider circuit 404, 407-1 is a first drive circuit for the purpose of driving the first stepping motor 406-1, 621 is a second-hand drive circuit control means which is controlled by the timekeeping control circuit 650 and which supplies a normal pulse Ps, which is output by the first normal pulse selection circuit 611, to the first drive circuit 407-1, 630 is a first detection circuit which detects rotation and non-rotation of the first stepping motor 406-1, 620 is a first load compensation control circuit which, based on the results of the first detection circuit 630, controls the first normal pulse selection circuit 611 and the third high-speed pulse selection circuit, 407-3 is a second drive circuit for the purpose of driving the second stepping motor 406-3, 623 is a minute-hand drive circuit control means which is controlled by the timekeeping control circuit 650 and which selectively outputs and supplies to the second drive circuit 407-3 a required pulse from the normal pulse Ps which is output by the second normal pulse selection circuit 612, the normal pulse Pf which is output by the second high-speed pulse selection circuit 613, and the reverse-rotation pulse Pb which is output by the second reverse-rotation pulse selection circuit 614, 631 is a second detection circuit which detects rotation and non-rotation of the second stepping motor 406-3, 622 is a second load compensation control circuit which, based on the judgment results of the second detection circuit 631, controls the second high-speed pulse selection circuit 613 an the second reverse-rotation pulse selection circuit 614, 407-2 is a third drive circuit for the purpose of driving the third stepping motor 406-2, 624 is a chronograph hand control circuit which is controlled by the timekeeping control circuit 650, and which supplies a high-speed pulse Pc that is output from the third high-speed pulse selection circuit 615 to the third drive circuit 407-2 in response to the start of the chronograph, 655 is a misoperation prevention circuit which prevents misoperation caused by an improper high-speed pulse Pf or reverse-rotation pulse Pb, and 505*a*, 551*a*, 552*a*, and 553*a* are a correction switch, an S switch, an R switch, and an M switch that are operated by the correction button 550, the S button 551, the R button 552, and the M button 553, respectively.

Although in this example a separate second-hand drive motor 406-1 and minute-hand drive motor 406-3 are used, the present invention allows a single motor to serve as both motor 406-1 and motor 406-3.

TABLE 3

Pulse Resting Periods of Normal pulse Pm and Minimum Drive Voltage

| | | Minimum Drive Voltage | |
|---|---|---|---|
| Normal Pulse | Pulse Resting Period | without load | with load |
| Pm1 | 0.35 ms | 2.5 V | 2.6 V |
| Pm2 | 0.3 ms | 2.2 V | 2.3 V |
| Pm3 | 0.25 ms | 1.9 V | 2.0 V |
| Pm4 | 0.2 ms | 1.7 V | 1.8 V |
| Pm5 | 0.15 ms | 1.5 V | 1.6 V |
| Pm6 | 0.1 ms | 1.3 V | 1.4 V |
| Pm7 | 0.05 ms | 1.1 V | 1.2 V |
| Pm8 | none | 0.9 V | 1.0 V |

The configuration of the normal pulse Pm and minimum drive voltage for driving the second stepping motor 406-3 are explained hereunder.

The normal pulses Pm1~Pm8 have entirely the same pulse configurations as those of the normal pulses Pa1~Pa8.

Table 3 shows the pulse resting period of the normal pulses Pm1~Pm8 generated from the second normal pulse generating circuit 602 and the minimum drive voltage in a case where a load consisting a date plate 881 is provided or in a case when no load is provided.

In the case when the load of the date plate 881 is provided, the minimum drive voltage is increased by about 0.1V comparing with the case when no load is provided.

For example, the minimum drive voltage of the normal pulse Pm3 is 1.9V when no load is provided, while it becomes 2.0V when a load is provided.

On the other hand, the compensation drive pulse Pmh which is generated when the determination was made that the motor could not be driven, is also has the same pulse configuration as those of the compensation drive pulse Psh generated from the above-noted first normal pulse generation circuit 601.

The compensation drive pulse Pmh is generated after 32 ms when the normal pulse Pm had been generated and it has a pulse width of 2 ms and in the last 6 ms, a series of 0.5 ms pulse resting periods in every 1 ms.

TABLE 4

| Pulse width of high speed pulse Pf and Voltage range capable of driving the motor | | | |
|---|---|---|---|
| | | Voltage range capable of driving the motor | |
| High speed pulse | Pulse width | without load | with load |
| Pf1 | 3.2 ms | 1.8~3.8 V | 1.9~3.9 V |
| Pf2 | 3.6 ms | 1.4~2.8 V | 1.5~2.9 V |
| Pf3 | 4.0 ms | 1.0~2.2 V | 1.1~2.3 V |
| Pf4 | 4.4 ms | 0.8~1.6 V | 0.9~1.7 V |

TABLE 5

| Pulse width of reverse rotation pulse Pb and Voltage range capable of driving the motor | | | | | |
|---|---|---|---|---|---|
| reverse rotation | | | | Voltage range capable of driving motor | |
| pulse Pb | Pg1 | Pg2 | Pg3 | without load | with load |
| Pb1 | 1.25 ms | 3.25 ms | 4.0 ms | 1.8~3.8 V | 1.9~3.9 V |
| Pb2 | 1.5 ms | 3.0 ms | 5.0 ms | 1.4~2.8 V | 1.5~2.9 V |
| Pb3 | 2.5 ms | 3.0 ms | 6.0 ms | 1.0~2.2 V | 1.1~2.3 V |
| Pb4 | 2.75 ms | 2.75 ms | 7.0 ms | 0.8~1.6 V | 0.9~1.7 V |

Next, the configuration of the high speed pulse Pf and the reverse rotation pulse Pb and the voltage range capable of driving the motor are explained hereunder.

The table 4 shows a chart indicating the pulse width of the high speed pulse Pf1~Pf4 generated from the second high speed pulse generating circuit 603 and the voltage range capable of driving the motor in a case when a load consisting a date plate 881 is provided or in a case when no load is provided.

On the other hand, the table 5 shows a chart indicating the pulse width of the high speed pulse Pb1~Pb4 generated from the second reverse rotation pulse generating circuit 604 and the voltage range capable of driving the motor in a case when a load consisting a date plate 881 is provided or in a case when no load is provided.

Figure 17:
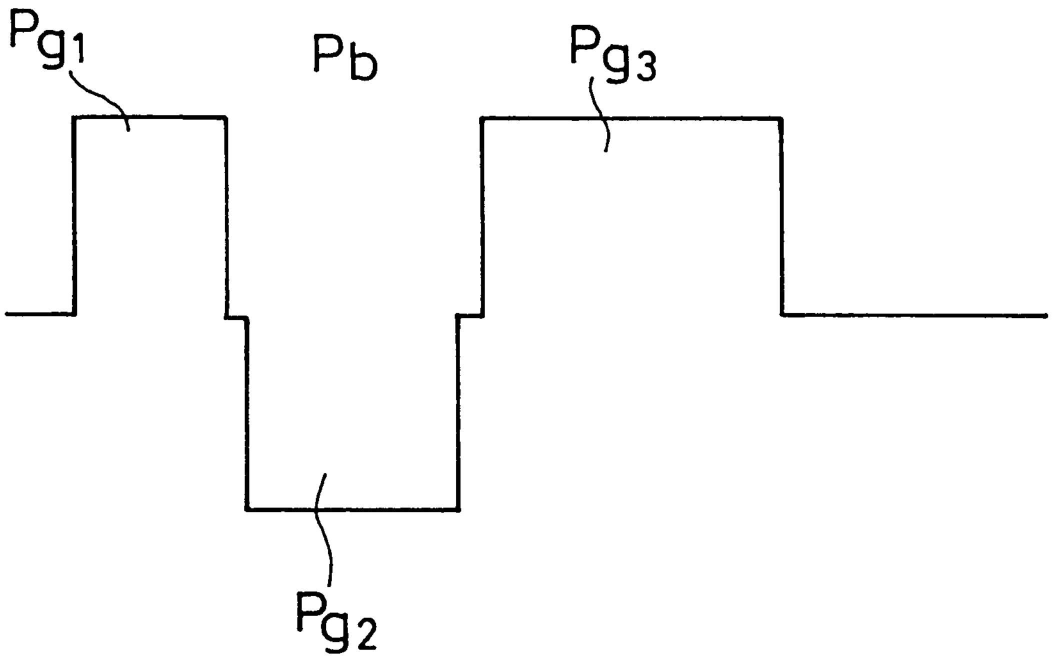
FIG. 17 is a waveform diagram of the reverse pulse Pb of an embodiment of the present invention.

Note that FIG. 17 shows a waveform of the reverse rotation pulse Pb used in this embodiment.

As shown in FIG. 17, the reverse rotation pulse Pb comprises a combination of three pulses such as a positive phase Pg1, a reverse phase Pg2 and a positive phase Pg3.

In the table 5, a pulse width of each one of the positive phase Pg1, the reverse phase Pg2 and the positive phase Pg3 is shown.

The high speed pulse Pf1~Pf4 have the voltage range capable of driving the motor as shown in the table 4, respectively, and when one of the high speed pulse Pf1~Pf4 is fallen into the outside of the respective voltage range, the second stepping motor 406-3 cannot be driven with high speed.

For example, as indicated by the table 4, the high speed pulse Pf2 has the pulse width of 3.6 ms, while its voltage range capable of driving the motor shows 1.4V~2.8V when the load comprising, for example, a date plate, is not provided.

Therefore, when the second stepping motor 406-3 should be rotated with high speed with the high speed pulse Pf2 without being provided with such load of the date plate, the power source voltage Vc should be 1.4~2.8V.

That is to say, when the second stepping motor 406-3 is driven, it is necessary to select the power source voltage Vc and the high speed pulse Pf which is corresponding to the load consisting the date plate 881.

As the same way, the reverse rotation pulses Pb1~Pb4 have the voltage range capable of driving the motor as shown in the table 5, respectively, and then one of the reverse rotation pulses Pb1~Pb4 is fallen into the outside of the respective voltage range, the second stepping motor 406-3 cannot be driven in the reverse direction with such pulse.

Note that when the second stepping motor 406-3 is reversely driven, it is necessary to select the power source voltage Vc and the reverse rotation pulse Pb which is corresponding to the load consisting the date plate 881.

Further note that in comparing with the fact that the high speed pulse Pc which drives to rotate the third stepping motor 406-2 with high speed is driven with 100 Hz, the high speed pulse Pf which drives to rotate the second stepping motor 406-3 with high speed is driven with 64 Hz.

For the same of it, even though both high speed pulses Pc and Pf have the same pulse width to each other, the voltage range capable of driving the motor obtained by the high speed pulse Pf is wider than that obtained by the high speed pulse Pc.

Therefore, although in a case in which the high speed pulse Pc is used, eight different kinds of high speed pulses Pc1~Pc8 are driven to commonly share the voltage range of 1~3 V with which the electronic watch 400 can be driven, in the case in which the high speed pulse Pf is used, four different kinds of four speed pulses Pf1~Pf4 are driven to commonly share the voltage range of 1–3 V with which the electronic watch 400 can be driven.

And further, as shown in Table 4, the voltage range capable of driving the motor obtained by the high speed pulse Pf1, in the case of no load being provided, is set at from 1.8V to 3.8V so that the motor can be driven from a condition in which the minimum drive voltage of the normal pulse Pm2 is set at 2.2V to a condition in which the upper most of the power source voltage Vc such as 3.0V.

As the same manner, the voltage range capable of driving the motor obtained by the high speed pulse Pf2 is set at from 1.4V to 2.8V so that the motor can be driven from a condition in which the minimum drive voltage of the normal pulse Pm4 is set at 1.7V to a condition in which the upper most of the voltage selectively generated for the normal pulse Pm3, such as 2.3V which is a minimum operation voltage of the normal pulse Pm2.

While, the voltage range capable of driving the motor of the high speed pulse Pf3 is set at between 1.0~2.2V so that the stepping motor can be driven from 1.3V which is the minimum drive voltage of the normal pulse Pf6 to the upper limit voltage of the normal pulse Pm5 to be selectively output which corresponds to 1.7V that is a minimum operation level of voltage for the normal pulse Pm4.

On the other hand, the voltage range capable of driving the motor of the high speed pulse Pf1 is set at between 0.8~1.7V so that the electric watch 400 can be driven from 1.0V which is the minimum drive voltage thereof to the upper limit voltage of the normal pulse Pm7 to be selectively output which corresponds to 1.3V that is a mimimum operation level of voltage for the normal pulse Pm6.

In the same way, these conditions can be applied to the reverse rotation pulse Pb and thus the voltage range capable of driving the motor of the reverse rotation pulse Pb1~Pb4 are set at the same range set for the high speed pulses Pf1~Pf4.

Next, an operation of the circuit with respect to a selection way of the high speed pulse Pf will be explained hereunder.

The second stepping motor 406-3 is driven in every 20 second in a normal time display mode to drive the minute hand 825, hour hand 826, respectively so as to display hour and minute in normal time and further drive a date plate 881.

That is to say, second stepping motor 406-3 is driven by a normal pulse Pm so that multi-load compensation control circuit is carried out.

However, at every time, the driving condition usually includes not only variation in power source voltage Vc but also variation in load caused by driving the date plate 881.

Namely, the second load compensation control circuit 622 controls the second normal pulse selection circuit 612 so that a minimum voltage level of the normal pulse Pm which can drive the second stepping motor 406-3 with respect to voltage and load, is selected and accordingly, the current total driving condition caused by the power source voltage Vc and the load of the date plate 881, can be acknowledged by the pulse width of the normal pulse Pm which is output at that time-being.

And thus, it would be prefer to select the high speed pulse Pf having the voltage range capable of driving the motor under which the motor can be driven by even the normal pulse Pm having the minimum drive voltage level.

On the other hand, due to the load caused by the date plate 881, the minimum drive voltage of the normal pulse Pm is increased by about 0.1V, as well as the same voltage of the high speed pulse Pf is increased by about 0.1V.

Therefore, there must be no problem even when the selection of the high speed pulse Pf is carried out in the same manner as used in a case in which no load caused by the date plate 881 is provided, regardless the existence of the load caused by the date plate 881.

For example, with reference to the Table 3, the range of minimum drive voltage of the normal pulse Pm8 is 0.9V in a case of the load being provided and the range of minimum drive voltage of the normal pulse Pm6 is 1.3V in a case of no load being provided.

Therefore, it can be acknowledged that when the normal pulses Pm8 or Pm7 is output, the power voltage shows 0.9V~1.3V.

Further, from the Table 4, it can also be acknowledged that when the normal pulses Pm8 or Pm7 is output, the range of drive voltage of the high speed pulse Pf4 in a case of no load being provided, is 0.8V~1.6V.

Accordingly, when the second stepping motor 406-3 is driven by the normal pulse Pm8 or the normal pulse Pm7, the second stepping motor 406-3 can sufficiently be driven in high speed with the high speed pulse Pf4 even taking variation in mechanical elements into account.

In a case in which the load is provided, seeing from the Table 3, the minimum drive voltage range of the normal pulse Pm8 is 1.0V and the minimum drive voltage range of the normal pulse Pm6 is 1.4V.

Accordingly, when the normal pulse Pm8 or Pm7 is output, it is acknowledged that the power source voltage Vc shows 1.0v~1.4V.

Also from the Table 4, since the voltage range capable of driving the motor of the high speed pulse Pf4 in a case of the load being provided, is 0.9~1.7V, the motor may also be driven by the high speed pulse Pf4.

As explained above, since both of the normal pulse Pm and the high speed pulse Pf are the pulses which can drive the identical second stepping motor 406-3, when a load is provided, the drive voltage of both pulses, the normal pulse Pm and the high speed pulse Pf, are increased in the same way.

Since a relative relationship in the voltage between the normal pulse Pm and the high speed pulse Pf is not changed, the high speed pulse Pf can be selected with respect to the normal pulse Pm under the same condition as used in a case in which no load is provided regardless of existence of the load.

Next, the operation of the above-noted circuits will be described.

Figure 5A:
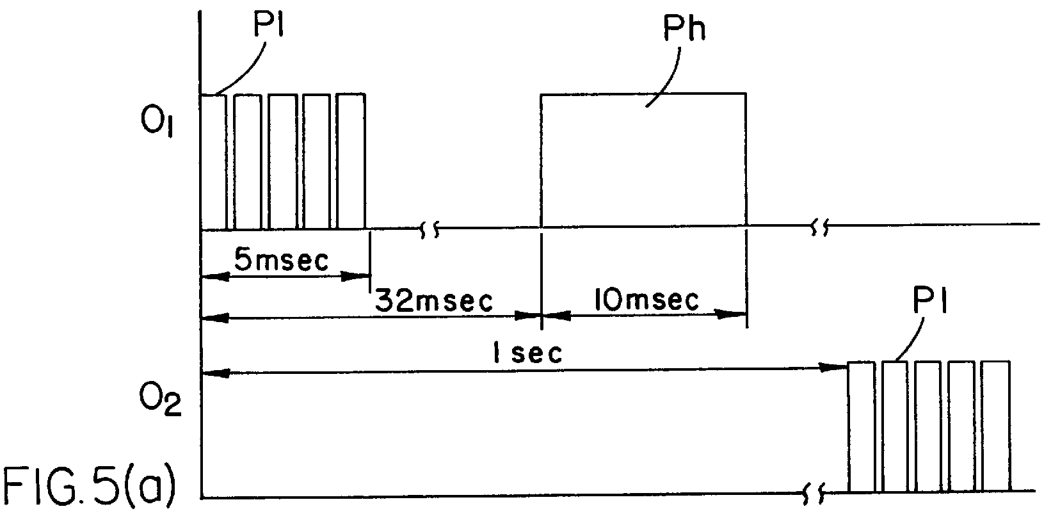
FIGS. 5A and 5B are diagrams which show the pulse waveforms output in an electronic watch of the past.
Figure 5B:
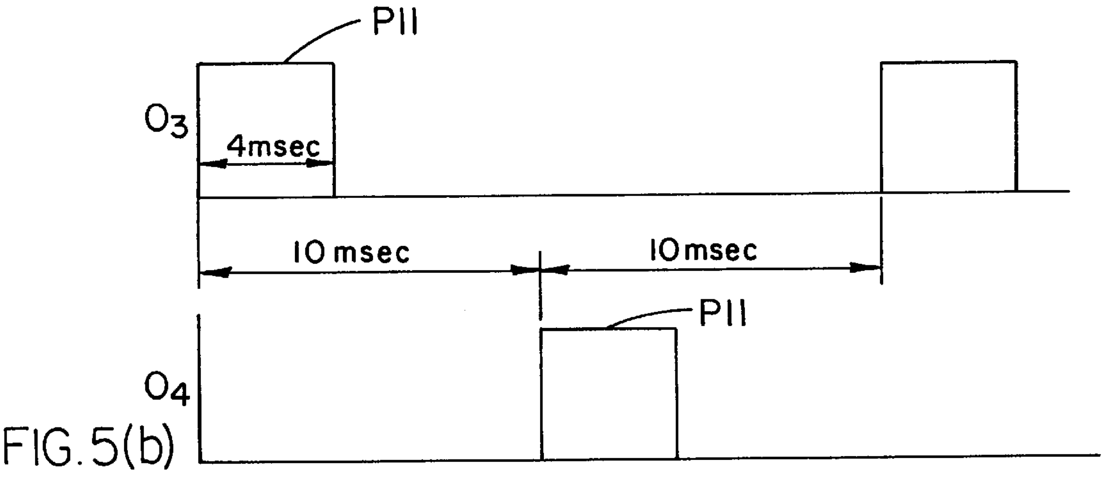
Figures 6A, 6B, 6C, 6D, 6E:
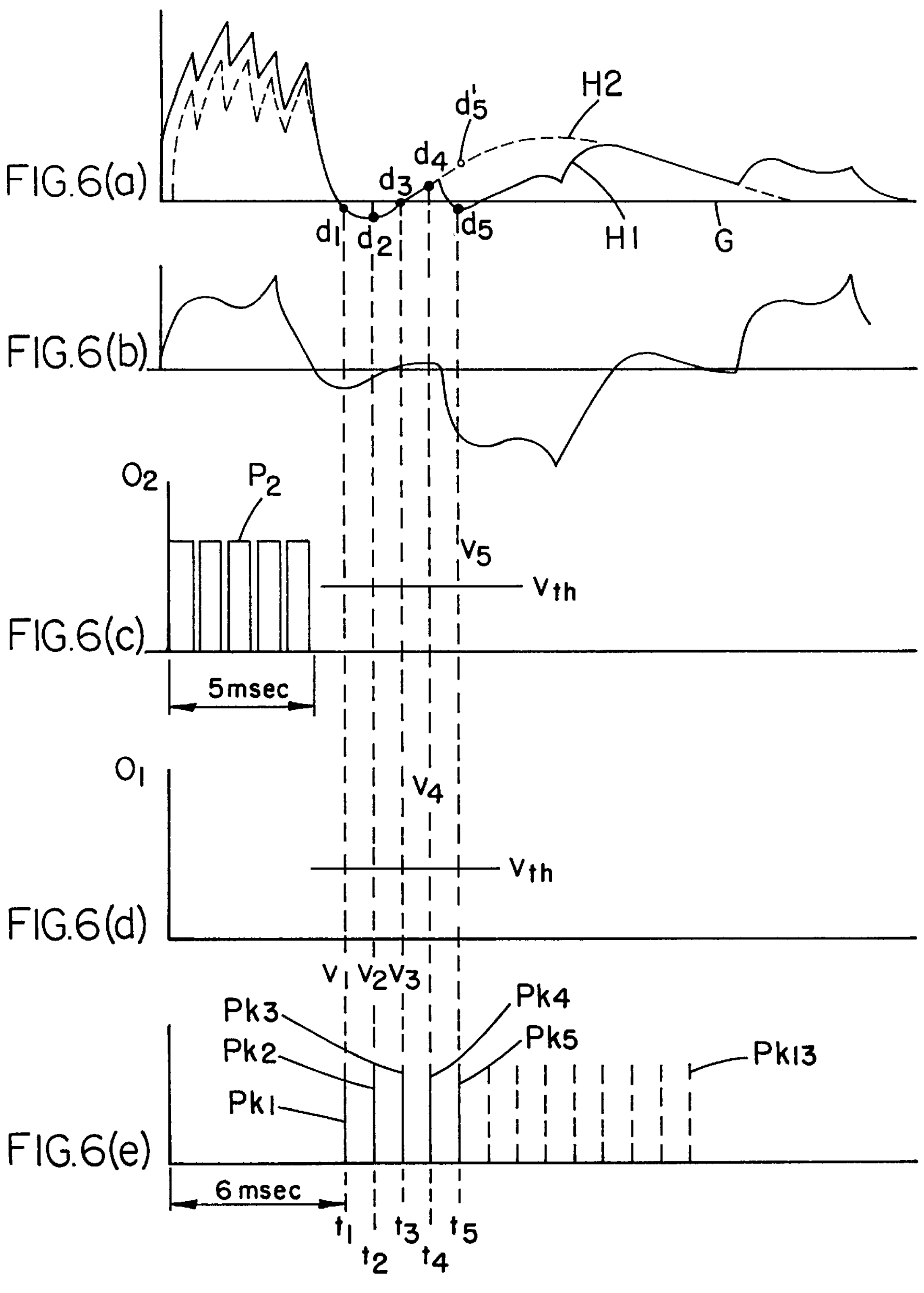
FIGS. 6A–6E are waveform diagrams which show the rotation detection operation for load compensation in the past.
Figure 7:
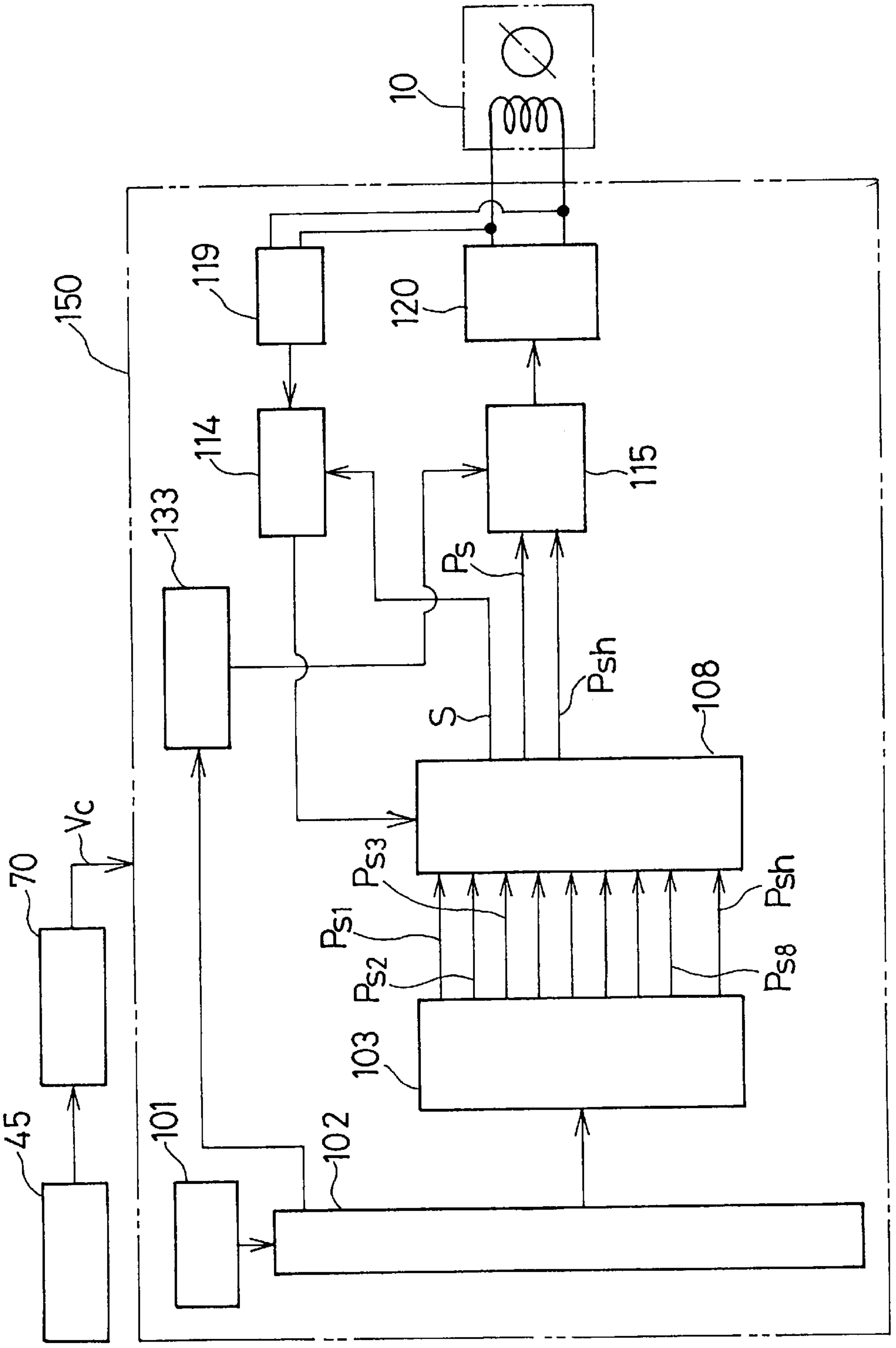
FIG. 7 is a block diagram which shows an example of the configuration of a solar watch in the past.
Figures 8A, 8B, 8C, 8D:
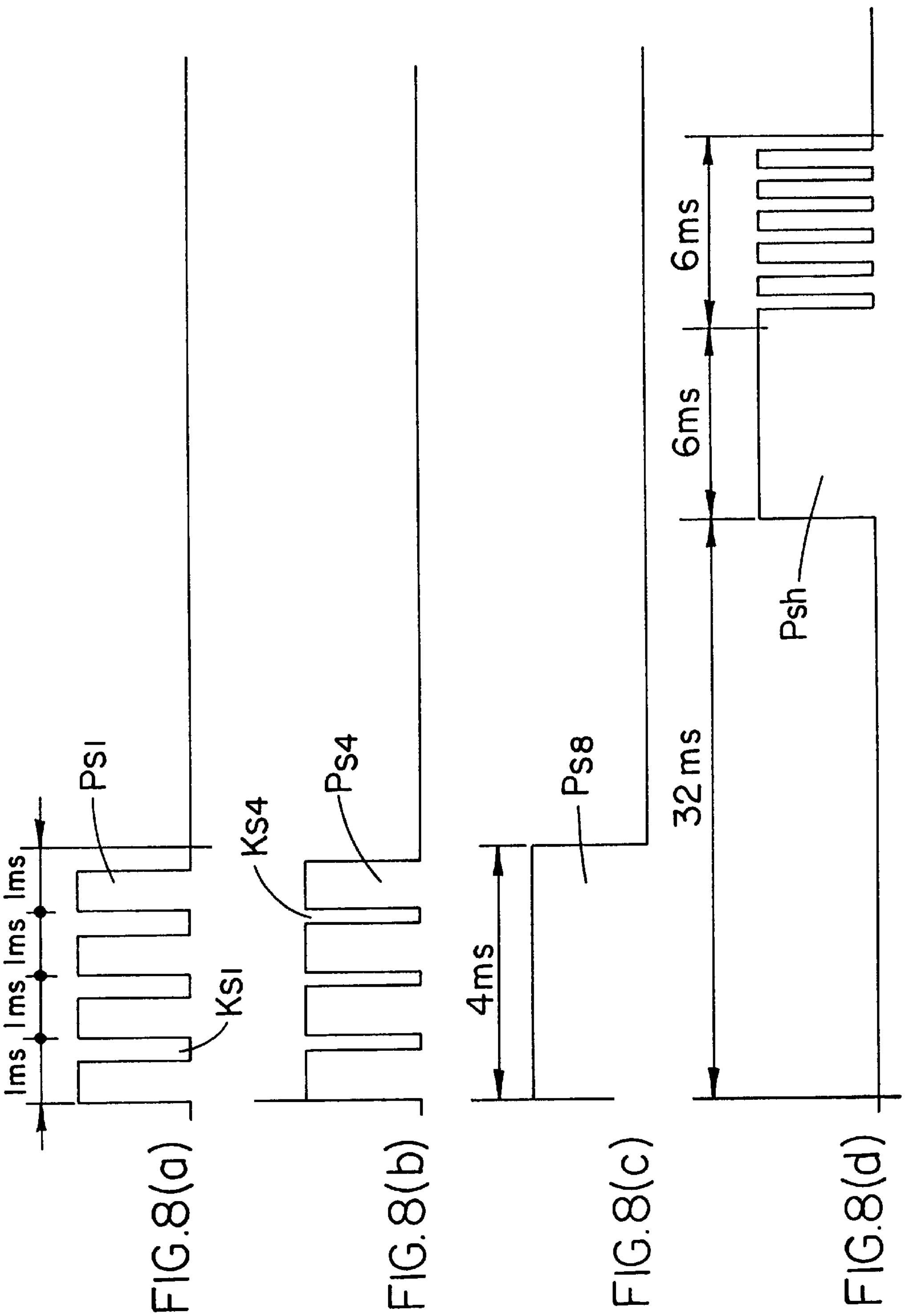
FIGS. 8A–8D are waveform diagrams which show the normal pulses Ps1 through Ps8 in the past.

The operation of the first stepping motor 406-1 which drives the second hand 515, the first normal pulse generating circuit for the purpose of supplying a normal pulse Ps to the first stepping motor 406-1, the first normal pulse selection circuit 611, the fist load compensation control circuit 620 the second-hand drive control circuit 621, and the first drive circuit 407-1 is the same as described from the prior art, with reference to FIG. 5, and will therefore not be described again.

The electric energy generated by the solar cell 401 is stored in the electrical double-layer capacitor 570. The watch circuit 402 takes its power from this electrical double-layer capacitor 570, and is driven by the power supply voltage Vc. When the withstand voltage of 3.0 V of the electrical double-layer capacitor 570 is reached, a discharge circuit (not shown in the drawing) operates so that the voltage does not exceed 3.0 V.

When the voltage of the electrical double-layer capacitor 570 falls below 1.0 V, the judgment is made that the charging is insufficient, and timekeeping is stopped as a notification that the charging is insufficient. The first stepping motor 406-1, the second stepping motor 406-3, and the third stepping motor 406-2 are driven when the power supply voltage Vc is in the range 1 V to 3 V.

First, the circuit operation related to the drive of the third stepping motor 406-2, which drives the chronograph hand 835, will be described. The third high-speed pulse generation circuit 605 generates the high-speed pulses Pc1 to Pc8, to be described later, based on a signal of the frequency divider circuit 404, and supplies these to the third high-speed pulse selection circuit 615.

The third high-speed pulse selection circuit 615 is controlled by the first load compensation control circuit 620, and selects one of the high-speed pulses, according to a method to be described later, and supplies this pulse to the chronograph hand drive control circuit 614. The chronograph hand control circuit 624 supplies the high-speed pulse Pc to the third drive circuit 407-2, in accordance with chronograph information for timekeeping from the timekeeping control circuit 650.

The third drive circuit 407-2 drives the third stepping motor 407-2 by means of this high-speed pulse Pc.

The shape of the high-speed pulse Pc and the method of selection are described in detail below.

TABLE 2

High-Speed Pulse Pc Pulse Width and Drivable Voltage Ranges

| High-speed Pulse | Pulse Width | Driving Voltage Range |
|---|---|---|
| Pc1 | 3.0 ms | 2.0 to 3.8 V |
| Pc2 | 3.2 ms | 1.8 to 3.3 V |

TABLE 2-continued

High-Speed Pulse Pc Pulse Width and Drivable Voltage Ranges

| High-speed Pulse | Pulse Width | Driving Voltage Range |
|---|---|---|
| Pc3 | 3.4 ms | 1.6 to 2.8 V |
| Pc4 | 3.6 ms | 1.4 to 2.5 V |
| Pc5 | 3.8 ms | 1.2 to 2.2 V |
| Pc6 | 4.0 ms | 1.0 to 1.9 V |
| Pc7 | 4.2 ms | 0.9 to 1.6 V |
| Pc8 | 4.4 ms | 0.8 to 1.4 V |

Table 2 shows the widths of the pulses generated by the third high-speed pulse generation circuit 605 and the range of voltages for each pulse width over which normal drive is possible. The high-speed pulses Pc1 to Pc8 each have the driving voltage range as shown in Table 2, so that if the power supply voltage Vc goes outside the range, it is not possible to drive the third stepping motor 407-2.

For example, the range of driving voltage for the high-speed pulse Pc4, which has a width of 3.6 ms, is 1.4 V to 2.5 V. Therefore if the power supply voltage Vc is within this range of 1.4 V to 2.5 V, it is possible to drive the third stepping motor 406-2 with the high-speed pulse Pc4. If, however, the power supply voltage Vc is less than 1.4V, because the voltage is excessively low, it is not possible to drive the third stepping motor 406-2 with the high-speed pulse Pc4, and the kept time will be disturbed. On the other hand, if the power supply voltage Vc exceeds 2.5V, the third stepping motor 406-2 will overrun, so that it is not possible to drive the third stepping motor 406-2 with the high-speed pulse Pc4, resulting again in disturbance of the kept time. Thus, for the purpose of driving the third stepping motor 406-2, it is necessary to select a proper high-speed pulse Pc.

Furthermore, it is normal to have set the high-speed pulse Pc(n) so that it appropriately corresponds to the normal pulse Ps(n), the setting being made so that a voltage value that is at the approximate center of the driving voltage range of the high-speed pulse Pc(n) is the minimum driving voltage of the normal pulse Ps(n). For example, the minimum driving voltage range of the high-speed pulse Pc6 is 1.0 to 1.9 V, which has a center value that is close to the minimum diving voltage, 1.4 V of the normal pulse Ps6.

The fist stepping motor 406-1 is provided for the purpose of driving the second hand 815 and, as described earlier, drives the second hand normally in any of the modes. That is, it is driven one time each 1 second by a normal pulse Ps, and is subject to multistage load compensation operation. Therefore, the first load compensation control section 620 controls the first normal pulse selection circuit 611 so that it selects the smallest normal pulse Ps that can drive the first stepping motor 406-1. By doing this, it is possible to know, by means of the type of normal pulse Ps output at a given time, the approximate power supply voltage Vc. It is then sufficient to select a high-speed pulse Pc having a driving voltage range, the minimum driving voltage of which is drivable by the minimum driving voltage of that normal pulse Ps.

For example, from Table 1 the minimum driving voltage of the normal pulse Ps8 is 1.0 V, and the minimum driving voltage of the normal pulse Ps7 is 1.2 V. Thus, when the normal pulse Ps8 is output, it is possible to know that the power supply voltage Vc is in the range 1.0 V to 1.2 V. From Table 2 the driving voltage range of the high-speed pulse Pc8 is 0.8 to 1.4 V. Thus, when the first stepping motor 406-1 is being driven by the normal pulse Ps8, if the third stepping motor 406-2 is driven by the high-speed pulse Pc8, sufficient drive is possible, even considering variation between components. From Table 1 the minimum driving voltage of the normal pulse Ps7 is 1.2 V and the minimum driving voltage of the normal pulse Ps6 is 1.4 V.

Thus, when the normal pulse Ps7 is being output, it is possible to know that the power supply voltage Vc is in the range 1.2 V to 1.4 V. Therefore, the third stepping motor 406-2 can be driven by the high-speed pulse Pc7, which has a driving voltage range of 0.9 to 1.6 V. In a similar manner, for the normal pulses Ps6 to Ps1, drive of the third stepping motor 406-2 can be done by the corresponding high-speed pulses Pc6 to Pc1.

The information with regard to which normal pulse of the normal pulses Ps1 to Ps8 is currently being output by the first normal pulse selection circuit 611 is output in the form of the signal S. Therefore, the first load compensation control circuit 620 can recognize that the first normal pulse selection circuit 611 is currently outputting the normal pulse Ps(n). Then it is sufficient for the first load compensation control circuit 620 to control the third high-speed pulse selection circuit 615 so that ti selects the high-speed pulse Pc(n) that corresponds to this normal pulse Ps(n). For example, if the first normal pulse selection circuit 611 is selectively outputting the normal pulse Ps2, control would be performed so that the third high-speed pulse selection circuit 615 selects the high-speed pulse Pc2.

Next, the switching of the high-speed pulse Ps(n) will be described. When the power supply voltage Vc drops so that drive of the first stepping motor 406-1 is not possible with the normal pulse Ps(n), the judgment is made by the first detection circuit 630 that rotation was not possible, and by means of this judgment result the first load compensation circuit 620 controls the first normal pulse selection circuit 611 so as to output a compensation pulse Psh and also so as to switch the next normal pulse Ps to the next larger normal pulse Ps(n+1).

In addition, when the first load compensation control circuit 620 receives the judgment results from the first detection circuit 630 that rotation was not possible, it controls the third high-speed pulse selection circuit 615 so as to switch from the high-speed pulse Pc(n) to the next larger high-speed pulse Pc(n+1). When the normal pulse Ps(n) is output 100 times, the first load compensation control circuit 620 controls the first normal pulse selection circuit 611 so as to output the next smaller normal pulse, Ps(n−1).

However, the drive capacity of the next smaller normal pulse Ps(n−1) is small so that there are cases in which drive of the first stepping motor 406-1 is not possible. In such a case, it is possible that drive of the third stepping motor 406-2 is not possible even if a switch is made from the high-speed pulse Pc(n) to the high-speed pulse Pc(n−1). In consideration of this possibility, the switching of the high-speed pulse Pc(n) being output by the third high-speed pulse selection circuit 615 to the next smaller high-speed pulse Pc(n−1) is made after succeeding to drive the first stepping motor 406-1 with the next smaller normal pulse Ps(n−1).

The above operation will be described in further detail, making reference to a drawing. FIG. 18 is a block diagram of the first load compensation control circuit 620 and the surrounding area. In FIG. 18, the reference numeral 714*a* denotes a 100-base counter, 714*b* is a first rank-up circuit, 714*c* is a first rank-down circuit, and 714*d* is a third rank-down control circuit. The first detection circuit 630 makes a judgment as to whether or not the normal pulse Ps was able to drive the first stepping motor 406-1 and, outputting to the first load compensation control circuit 620 the signal Y1 if drive was possible and the signal N1 if drive was not possible.

The signal Y1 is input to the 100-base counter 714*a* within the first load compensation control circuit 620. The 100-base counter 714*a* is a counter which counts whether or not drive was possible 100 times with the same normal pulse Power supply, this counter outputting the signal CU to the first rank-down circuit 714*c* when the signal Y1 is input 100 times continuously.

The first rank-down counter 714*c* also has input to it the signal S, which indicates the size of the normal pulse Power supply being output from the fist normal pulse selection circuit 611. When the CU signal is input, the first rank-down counter 714*c* outputs the signal D1 to control the first normal pulse selection circuit 611 so as to switch the normal pulse Ps to the next smaller pulse Ps. Note that if the signal N1 is input to the R terminal of the 100-base counter 714*a* before the 100th Y signal, the 100 -base counter 714*a* will be reset, this causing the counting of the Y1 signal to start anew. The signal N1 is also input to the first rank-up counter 714*b*. The first rank-up counter 714*b* has input to it the S signal which indicates the size of the normal pulse Ps which is being output from the first normal pulse selection circuit 611. When the N1 signal is input, the first rank-up counter 714*b* outputs the U1 signal to control the first normal pulse selection circuit 611 so as to switch selection from the normal pulse Ps to the next larger normal pulse P.

When the CU signal is not being input to the third rank-down control circuit 714*d*, the third rank-down control circuit 714*d* controls the third high-speed pulse selection circuit 615 so as to select the high-speed pulse Pc which corresponds to the size of normal pulse Ps as indicated by the signal S which is output from the first normal pulse selection circuit 611. In this case, the high-speed pulse Pc(n) which corresponds to the normal pulse Ps(n) which is currently selected is selected. For example, in the case in which the first stepping motor 406-1 is being driven by the normal pulse Ps(n), the first detection circuit 630 outputs the signal Y1. By means of this signal Y1, as describe above, the first normal pulse selection circuit 611 selects the normal pulse Ps(n).

Additionally, although this signal Y1 is given to the third rank-down control circuit 714*d*, unless this is the 100th time the CU signal is not output from the 100-base counter 714*a*. In this condition, the third rank-down control circuit 714*d* controls the third high-speed pulse selection circuit 615 so as to select the high-speed pulse Pc(n) which corresponds to the signal S, which indicates the size of the normal pulse Ps(n) being output from the first normal pulse selection circuit 611. Therefore, the normal pulse Ps(n) and high-speed pulse Pc(n) are selected as a corresponding pair. In the case in which it was not possible to drive the first stepping motor 406-1 with the normal pulse Ps(n), the first detection circuit 630 outputs the signal N1. The signal N1 causes the first normal pulse selection circuit 611 to select the next larger normal pulse Ps(n+1). Additionally, the fact that a switch has been made by the first normal pulse selection circuit 611 to the next larger normal pulse Ps(n+1) is indicated to the third rank-down control circuit 714*d* by the signal S. When this is done, the third rank-down control circuit 714*d* controls the third high-speed pulse selection circuit 615 so as to select the high-speed pulse Pc(n+1) which corresponds to the S signal that indicates the size of the normal pulse Ps(n+1) being output from the first normal pulse selection circuit 611. Therefore, the normal pulse Ps(n+1) and high-speed pulse Pc(n+1) are selected as a corresponding pair.

When the CU signal is output from the 100-base counter 714*a*, the third rank-down control circuit 714*d* controls the third high-speed pulse selection circuit 615 so as to select the same high-speed pulse Pc as last time, it ignoring the signal S which indicates the size of the normal pulse Ps being output from the first normal pulse Pc. For example, in the case in which the first normal pulse selection circuit 611 is selecting the normal pulse Ps(n), by the output of the S signal by the first normal pulse selection circuit 611, the normal pulse signal being output is indicated. By means of this signal S, the third rank-down control circuit 714*d* selected the high-speed pulse Pc(n). Then if it is possible to drive the first stepping motor 406-1 100 times with the normal pulse Ps(n), the signal Y1 is output from the first detection circuit 630, and the CU signal is output from the 100-base counter 714*a*. By means of this CU signal, the first rank-down counter 714*c* outputs the signal D1 to control the first normal pulse selection circuit 611 so as to select the normal pulse Ps(n−1). The fact that the first normal pulse selection circuit 611 is selecting the normal pulse Ps(n−1) is indicated by the output of the S signal.

Although this S signal is also given to the third rank-down control circuit, the CU signal is being output from the 100-base counter 714*a*, so that regardless of the S signal the third rank-down control circuit 714*d* controls the third high-speed pulse selection circuit 615 so as to select the same high-speed pulse Pc(n) as last time. Therefore, after the same normal pulse Ps(n) is output 100 times, even if a switch is made to the next smaller normal pulse Ps(n−1), the third high-speed pulse selection circuit 615 still selects the some high-speed pulse Pc(n). Then, the next time the first stepping motor 406-1 is driven by the normal pulse Ps(n−1), and if drive is possible with the normal pulse Ps(n−1), the Y1 signal is output from the first detection circuit 630. When this Y1 is input to the third rank-down control circuit 714*d*, it controls the third high-speed pulse selection circuit 615 so as to switch selection of the high-speed pulse Pc to the high-speed pulse Pc(n−1) which corresponds to the S signal output at that time. In the case in which drive was not possible with the normal pulse Ps(n−1), the N1 signal from the first detection circuit 630 is input to the first rank-up circuit 714*b*. The first rank-up circuit 714*b* controls the first normal pulse selection circuit 611 so as to select the normal pulse Ps(n) which is one larger than the normal pulse Ps(n−1). The fact that the normal pulse Ps(n) is selected is indicated by the S signal. Note that, because the Y1 signal had been input to the third rank-down control circuit 714*d*, the third high-speed pulse selection circuit 615 is controlled to maintain selection of the high-speed pulse Pc(n). At the next time operation is performed by means of the S signal so as to select the high-speed pulse Pc. By means of the above-described operation, even if the same normal pulse Ps is selected 100 times and then a switch is made to the next smaller normal pulse Ps, it is possible to select an appropriate high-speed pulse Pc.

An example will used next to explain circuit operation. In the power supply voltage Vc is 1.7 V, as shown in Table 1, the first normal pulse selection circuit 611 selects the normal pulse Ps5, which has a minimum drive voltage of 1.5 V. The first load compensation control circuit 620 causes the third high-speed pulse selection circuit 615 to select the high-speed pulse Pc5. Therefore, if the chronograph is started at this point the third stepping motor 406-2 is driven at high speed by the high-speed pulse Pc5. From Table 2 the drive voltage range for the high-speed pulse Pc5 is 1.2 to 2.2 V, indicating that a power supply voltage Vc of 1.7 V can drive the third stepping motor 406-2 sufficiently. When the normal pulse Ps5 is input 100 times, the first load compensation control circuit 620 controls the first normal pulse selection circuit 611 so as to select and output the next smaller normal pulse Ps4.

Because with the normal pulse Ps4 it is not possible to drive the first stepping motor 406-2 when the power supply voltage is 1.7 V, the normal pulse Ps5 will be output the next time. However, the switching of the high-speed pulse Pc by the third high-speed pulse selection circuit 615 is done only when drive was possible with the normal pulse Ps5. For th is reason, even if as described above a switch is made from the normal pulse Ps5 to the normal pulse Ps4, because drive is not possible with the normal pulse Ps4, the third high-speed pulse selection circuit 615 continues to select the high-speed pulse Ps5. Thus, if the chronograph is started when the power supply voltage is 1.7 V, the third stepping motor 406-2 will be driven at high speed by the appropriate high-speed pulse Ps5 at all times.

Next, the case of variation in the power supply voltage Vc will be described. First, the case in which the power supply voltage drops from 1.7 V will be described. The first stepping motor 406-1 is driven, as noted above, by the normal pulse Ps5 at a voltage of 1.7 V. If the power supply voltage gradually decreases from this point, the drive capacity of the normal pulse Ps5 becomes weak. Then, when the power supply voltage falls below the minimum driving voltage, 1.6 V, of the normal pulse Ps5, it is no longer possible to drive the first stepping motor 406-1 with the normal pulse Ps5, and the first detection circuit 630 judges that rotation was not possible.

In response to this judgment result, the first load compensation control circuit 620 controls the first normal pulse selection circuit 611 so as to output the compensation pulse Psh, this performing compensation drive of the first stepping motor 406-1, and causing the normal pulse Ps6 to be selected the next time. Simultaneously with this, the first load compensation control circuit 620 controls the third high-speed pulse selection circuit 615 so as to switch selection of the high-speed pulse Pc from the high-speed pulse Pc5 to the high-speed pulse Pc6. Therefore, if the chronograph is started at this point the third stepping motor 406-2 is causes to be driven at high speed by the high-speed pulse Pc6. From Table 2 the driving voltage range for the high-speed pulse Pc6 is 1.0 to 1.9 V, indicating that sufficient drive is possible of the third stepping motor 406-2 at a power supply voltage Vc of 1.7 V. The drop of the power supply voltage Vc is occurs gradually and is caused by consumption of the electrical energy which is stored in the electrical double-layer capacitor, and because a rapid drop in voltage does not occur the operation described above provides sufficient accommodation for this voltage drop.

Next, the case of the power supply voltage increasing from 1.7 V will be described. The first stepping motor 406-1 is driven by the normal pulse Ps5 at the voltage of 1.7 V. If the power supply voltage Vc gradually increases from this value, the drive capacity with the normal pulse Ps5 becomes accordingly large. The first load compensation control circuit 620 controls the first normal pulse selection circuit 611 so as to select and output the next smaller normal pulse Ps4 one time each time the normal pulse Ps5 is output 100 times.

If the power supply voltage Vc increases so as to exceed the minimum drive voltage of the normal pulse Ps4, which is 1.8 V, if the normal pulse Ps4 is selected at that point, the first stepping motor 406-1 is driven by the normal pulse Ps4. The first detection circuit 630 judges that rotation was possible and, based on this judgment result, the first load compensation control circuit 620 causes the third high-speed pulse selection circuit 615 to switch the high-speed pulse Pc from the high-speed pulse Pc5 to the high-speed pulse Pc4. Therefore, if the chronograph is started at this point, the third stepping motor 406-2 is driven at high speed by the high-speed pulse Pc4.

From Table 2 the driving voltage range for the high-speed pulse Pc4 is 1.4 to 2.5 V, indicating that sufficient drive of the third stepping motor 406-2 is possible at a power supply voltage Vc of 1.8 V. Even if the power supply voltage Vc reaches a voltage at which drive is possible with the normal pulse Ps4, a switch is not made from the high-speed pulse Pc5 to the high-speed pulse Pc4 without waiting for at least 100 seconds (100 of the normal pulses Ps).

However, the upper limit voltage of the voltage range in which drive is possible with the high-speed pulse Pc(n) for each pulse is set to a value that is higher than the minimum driving voltage of the next smaller normal pulse Ps(n−1), and in the case of the high-speed pulse Pc5, drive is possible up to 2.2 V, which is higher than the minimum driving voltage for the normal pulse Ps4, which is 1.8 V. Additionally, because the charging of the electrical double-layer capacitor 570 is done with a solar cell 401 that does not have a very large electric energy generating capacity, a problem related to not being able to switch the high-speed pulse Pc immediately does not occur. In the above-described manner, it is possible to select the high-speed pulse Pc for proper drive of the third stepping motor 406-2.

Next, the circuit operation related to the drive of the second stepping motor 406-3 which advances the minute hand 826 will be described. The second normal pulse generation circuit 612 generates the normal pulses Pm1 to Pm8 and the compensation pulse Pmh, to be described later, based on a signal from the frequency divider circuit 404, and supplies these to the second normal pulse selection circuit 612. The second normal pulse selection circuit 612 is controlled by the second load compensation control circuit 622 so as to select on normal pulse Pm from the normal pulses Pm1 to Pm8, and supply this normal pulse to the minute-hand drive control circuit 623.

The second high-speed pulse generation circuit 603 generates the high-speed pulses Pf1 to Pf4, to be described later, based on a signal from the frequency divider circuit 404, and supplies these to second high-speed pulse selection circuit 613. The second high-speed pulse selection circuit 613 is controlled by the second load compensation control circuit 622 so as to select one high-speed pulse Pf from the high-speed pulses Pf1 to Pf4 and to supply this high-speed pulse to the minute-hand drive control circuit 623. The second reverse-rotation pulse generation circuit 604 generates reverse-rotation pulses Pb1 to Pb4, to be described later, based on a signal from the frequency divider circuit 404, and supplies these reverse-rotation pulses to the second reverse-rotation pulse selection circuit 614.

The second reverse-rotation pulse selection circuit 6514 is controlled by the second load compensation control circuit 622 so as to select one reverse-rotation pulse Pb from the reverse-rotation pulse Pb1 to Pb4 and to supply this reverse-rotation pulse to the minute-hand drive control circuit 623. The minute-hand drive control circuit 623 selects, as necessary, the normal pulse Pm or high-speed pulse Pf or reverse-rotation pulse Pb, in accordance with the time which is kept by the timekeeping control circuit 650, the alarm and the chronograph information, and supplies this to the second drive circuit 407-3, the second drive circuit 407-3 drives the second stepping motor 407-3 by means of the normal pulse Pm, the high-speed pulse Pf or the reverse-rotation Pb which is supplied by the minute-hand drive control circuit 624.

The second detection circuit 631 makes a judgment as to whether or not drive of the second stepping motor 406-3 was possible by the normal pulse Pm. Based on the results of the judgment by the second detection circuit 631, the second load compensation control circuit 622 controls the second normal pulse selection circuit 612.

In the case in which rotation occurred, it causes the same normal pulse Pms to be output the next time. If rotation did not occur, however, it causes output of the compensation pulse Pmh and causes output of the next larger normal pulse the next time.

In addition, the second load compensation control circuit 622 controls the second high-speed pulse selection circuit 613 and the second reverse-rotation pulse selection circuit 614 so as to select one appropriate high-speed pulse Pf and reverse-rotation pulse Pb, respectively, from the high-speed pulses Pf1 to Pf4 and reverse-rotation pulses Pb1 to Pb4.

TABLE 6

| Normal pulse, High speed pulse Pf and Reverse rotation pulse Pb to be selected | | |
|---|---|---|
| Normal pulse | High speed pulse | Reverse rotation pulse |
| Pm1 | Pf1 | Pb1 |
| Pm2 | | |
| Pm3 | Pf2 | Pb2 |
| Pm4 | | |
| Pm5 | Pf3 | Pb3 |
| Pm6 | | |
| Pm7 | Pf4 | Pb4 |
| Pm8 | | |

Table 6 shows a relationship between the normal pulses Pm1~Pm8 and the high speed pulses Pf and reverse rotation pulses Pb to be selected at the selection time.

Next, a method for selecting the normal pulse Pm and the high speed pulse Pf to be selected will be explained hereunder.

The second normal pulse selection circuit 612 outputs to the second load compensation control circuit 622 a signal M which indicates that to which one of the pulse among the normal pulses Pm1~Pm8, the normal pulse Pm now being output corresponds.

Therefore, the second load compensation control circuit 622 discriminates the normal pulse Pm which the second normal pulse selection circuit 612 now outputs. And accordingly, the second load compensation control circuit 622 may control the second high speed pulse selection circuit 613 to have a high speed pulse Pf corresponding to a normal pulse Pm selected.

In this selection, as shown in the Table 6, when the normal pulse Pm1 or Pm2 is mentioned, the high speed pulse Pf1 should be selected to be output to the second high speed pulse selection circuit 613, and as the same manner, when the normal pulse Pm3 or Pm4 is mentioned, the high speed pulse Pf2 should be selected, when the normal pulse Pm5 or Pm6 is mentioned, the high speed pulse Pf3 should be selected and when the normal pulse Pm7 or Pm8 is mentioned, the high speed pulse Pf4 should be selected.

Next, when the power source voltage is reduced, and thus the first stepping motor 406-1 cannot be driven by the normal pulse Pm(n), the second detection circuit 631 determines that the motor did not rotate and base upon this determination, the second load compensation control circuit 622 controls the second normal pulse selection circuit 612 to output a compensation drive pulse Pmh and simultaneouslyy change the normal pulse Pm to the normal pulse Pm (n+1) having large voltage level one level up compared with that of the normal pulse Pm, for the next operation.

When the normal pulse is one of the normal pulses of Pm1, Pm3, Pm5 and Pm7, the second lad compensation control circuit 622 controls the second high speed pulse selection circuit 613 to select the same high speed pulse Pf as selected the pervious time even when the second load compensation control circuit 622 receives the determination that the motor did not rotate from the second detection circuit 631.

On the other hand, when the normal pulse is one of the normal pulses of Pm2, Pm4, and Pm6, the second load compensation control circuit 622 controls the second high speed pulse selection circuit 613 to change the high speed pulse Pf to the high speed pulse Pf having large voltage level one level up compared with that of the normal pulse Pf, previously output, simultaneously with the reception of the determination that the motor did not rotate from the second detection circuit 631.

Namely, when the no rotation of the motor is detected at any one of the normal pulses of Pm1, Pm3, Pm5 and Pm7, the high speed pulse Pf1, Pf2, Pf3 and Pf4 are maintained but when the no rotation of the motor is detected an any one of the normal pulses of Pm2, Pm4, and Pm6, the high speed pulse Pf will be selectively changed to the next one such as the high speed pulse Pf1 should be changed to Pf2, the high speed pulse Pf2 should be changed to Pf3, and the high speed pulse Pf3 should be changed to Pf4, respectively.

When the normal pulse Pm(n) are continuously output in successive 100 times, the second load compensation control circuit 622 controls the second normal pulse selection circuit 612 to switch a normal pulse Pm to a normal pulse Pm(n−1) having small voltage level one level down compared with that of the normal pulse Pm, previously output.

When the normal pulse Pm(n) is any one of Pm3, Pm5 and Pm7, it has been changed to one of a normal pulse Pm2, Pm4, and Pm6, having small voltage level, however, when the motor could be driven by any one of the normal pulse Pm(n−1), such as Pm2, Pm4, and Pm6, the high speed pulse Pf2, Pf3, and Pf4 is changed to Pf1, Pf2 and Pf3, respectively.

But when the motor could not rotate with the normal pulse Pm2, Pm4, and Pm6, having one level down small voltage level, the high speed pulse Pf2, Pf3 and Pf4 should be maintained.

The explanation will be made with reference to an example.

When the data panel 881 is not provided, when the power source voltage Vo is 1.6V, the most suitable normal pulse Pm is the normal pulse Pm5 having the minimum drive voltage 1.5, referring to the Table 3.

And in the normal timekeeping mode, the second load compensation control circuit 622 controls the second normal pulse selection circuit 612 to output the normal pulse Pm5, and further, as shown in Table 6, controls the second high speed pulse selection circuit 613 to output a high speed pulse Pf3.

Therefore, at this stage, when the normal timekeeping mode is changed to an alarm mode, the second stepping motor 406-3 is driven with the high speed pulse Pf3.

As seen from the Table 4, the voltage range capable of driving the motor of the high speed pulse Pf5 is 1.0~2.2V and thus the power source voltage of 1.6V can sufficiently drive the second stepping motor 406-3.

On the other hand, in the normal timekeeping mode, when the normal pulse Pm5 is continuously output in successive 100 times, the second load compensation control circuit 622 controls the second normal pulse selection circuit 612 to output a normal pulse Pm4 having a voltage the level of which is one level down compared with that of the pulse previously output.

Seeing from the Table 3, the minimum drive voltage of the normal pulse Pm4 is 1.7V and thus the power source voltage of 1.6V cannot drive the second stepping motor 406-3. And thus the second load compensation control circuit 622 controls the second normal pulse selection circuit 612 again to selectively output the normal pulse Pm5 from the next operation period.

However, the change of the high speed pulse Pf of the second high pulse selection circuit 613 can be carried out only when the second stepping motor 406-3 can be driven by the normal pulse Pm4, and thus when the second stepping motor 406-3 can not be driven by the normal pulse Pm4, the second high pulse selection circuit 613 is still selecting the high speed pulse Pf3.

Therefore, when the normal timekeeping mode is changed to the alarm mode with the power source voltage of 1.6V, the second stepping motor 406-3 can always be driven by a suitable high speed pulse Pf3, with high speed.

Next, the case in which the power source voltage Vc is varied will be explained hereunder.

First, the case in when the power source voltage Vc is reduced from 1.6V will be explained.

Under the power source voltage Vc of 1.6V, the second stepping motor 406-3 is driven by the normal pulse Pm5 in the normal timekeeping mode and the second load compensation control circuit 622 controls the second high pulse selection circuit 613 to select the high speed pulse Pf3.

From this point, when the power source voltage Vc is reduced gradually, the driving power of the normal pulse Pm5 becomes weak and when the power source voltage Vc reduces below the minimum drive voltage of 1.5V of the normal pulse Pm5, the second stepping motor 406-3 cannot be driven by the normal pulse Pm5, Therefore, the second detection circuit 631 determines that the motor did not rotate. And then the second load compensation control circuit 622 controls the second normal pulse selection circuit 612 in responce to this determination, to output the compensation drive pulse Pmh so as to compensate to drive the second stepping motor 406-3 and to selectively output a normal pulse Pm6, from the next operation.

In this case, although, the normal pulse Pm5 is changed to the normal pulse Pm6, the second load compensation control circuit 622 does not control the second normal pulse selection circuit 612 to change the high speed pulse Pf and still to maintain the high speed pulse Pf3.

Therefore, at this stage, when the normal timekeeping mode is changed to the alarm mode, the second stepping motor 406-3 is driven by the high speed pulse Pf3 with high rotational speed.

Referring to the Table 4, the voltage range capable of driving the motor of the high speed pulse Pf5 is 1.0~2.2V and thus the power source voltage Vc of 1.5V can sufficiently drive the second stepping motor 406-3.

Further, when the power source voltage Vc reduces below the minimum drive voltage of 1.3V of the normal pulse Pm6, the second stepping motor 406-3 cannot be driven by the normal pulse Pm6, and thus the second detection circuit 631 determines that the motor did not rotate.

In responce to this determination, the second load compensation control circuit 622 control the second normal pulse selection circuit 612 to output the compasation drive pulse Pmh so as to compensate the drive of the second stepping motor 406-3, and thereafter to output the normal pulse Pm7 from the next operation period.

At the same time, the second load compensation control circuit 622 control the second high speed pulse selection circuit 613 to selectively change the high speed pulse Pf3 to the high speed pulse Pf4.

Accordingly, in this stage, when the normal timekeeping mode is changed to the alarm mode, the second stepping motore 406-3 can be driven by the high speed pulse Pf4 with high rotational speed.

As seen from the Table 4, the voltage range capable of driving the motor of the high speed pulse Pf4 is 0.9~1.7V and thus the power source voltage Vc of 1.3V can sufficiently drive the second stepping motors 406-3.

Next, the case when the power source voltage Vc is increased from 1.6V, will be explained hereunder.

The second stepping motore 406-3 is driven by the normal pulse Pm5 under the power source voltage Vo of 1.6V, when the normal timekeeping mode is used. And the second load compensation control circuit 622 controls the second high speed pulse selection circuit 613 to select the normal pulse Pm3.

From this point, when the power source voltage Vc is increased gradually, the driving power of the normal pulse Pm5 becomes large.

On the other hand, the second load compensation control circuit 622 controls the second normal pulse selection circuit 612 so as to selectively output a normal pulse Pm4 having a voltage level one level smaller than that of the normal pulse Pm5 once in 100 successive outputs.

And when the power source voltage Vc exceeds the minimum voltage level of 1.7v of the normal pulse Pm4 and the normal pulse Pm4 is selectively output, the second stepping motore 406-3 is driven by the normal pulse Pm4.

At this time, the second load compensation control circuit 622 controls the second high speed pulse selection circuit 613 to change the high speed pulse Pf 3 to Pf2 and selectively output the high speed pulse Pf2.

Accordingly, at this stage, when the normal timekeeping mode is changed to the alarm mode, the second stepping motore 406-3 is driven by the high speed pulse Pf4.

Referring to the Table 4, the voltage range capable of driving the motor of the high speed pulse Pf2 is 1.4~2.8V and thus the power source voltage Vc of 1.7V can sufficiently drive the second stepping motor 406-3.

Further, when the power source voltage Vc is increased to 1.9V, and after when the normal pulse Pm3 is output successively 100 times, the second load compensation control circuit 622 controls the second normal pulse selection circuit 612 so as to output the normal pulse Pm3 having the voltage level which is one level smaller than that of the normal pulse output previously.

Therefore, the second stepping motor 406-3 can be driven by the normal pulse Pm3 having the minimum voltage level of 1.9V.

At this stage, the second load compensation control circuit 622 does not control the second normal pulse selection circuit 612 to change the selection of the high speed pulse Pf and to maintain the high speed pulse Pf2.

Accordingly, in this stage, when the normal timekeeping mode is changed to the alarm mode, the second stepping motore 406-3 can be driven by the high speed pulse Pf2 with high rotational speed.

As seen from the Table 4, the voltage range capable of driving the motor of the high speed pulse Pf2 is 1.4~2.8V and thus the power source voltage Vc of 1.9V can sufficiently drive the second stepping motor 406-3.

The explanation was made about the high speed rotation, the same operation can be similarly applied to the reverse rotational operation.

Namely, the second load compensation control circuit 622 controls the second reverse rotation pulse selection circuit 614 as the same manner as to control the second high speed pulse selection circuit 613.

And the reverse rotation pulse Pb which can select the second reverse rotation pulse selection circuit 614 is selected so that the reverse rotation pulse has the same the voltage range capable of driving the motor as the high speed pulse Pf1 has.

Namely, when the high speed pulse Pf1 is selected the reverse rotation pulse Pb1 is selected and as the same manner, when the high speed pulse Pf2 is selected, the reverse rotation pulse Pb2 is selected and when the high speed pulse Pf3 is selected, the reverse rotation pulse Pb3 is selected and further when the high speed pulse Pf4 is selected, the reverse rotation pulse Pb4 is selected.

However, in a case may be, there is a case in which the second stepping motor 406-3 cannot be driven by the normal pulse Pm for a long time.

For example, such case corresponds to any one of the case when the operation of correction of the time has been carried out for a long time under an alarm mode, or when the alarm mode is unduly remained and a minute hand 825 or hour hand 826 has been stopped for a long time displaying an alarm setting time.

In these cases, a certain amount of time had passed since the second stepping motor 406-3 had been driven by the last normal pulse Pm, therefore, the driving condition thereof may be changed due to the voltage of the electric two-layered condenser 570 or the like.

In this case, when the high speed pulse Pf of the reverse rotation pulse Pb is selected and output by the normal pulse Pm used previous period, the pulse may falls outside of the voltage range capable of driving the motor thereof so that the erroneous operation will occur to cause the watch to show incorrect time.

In order to avoid this problem, the minute hand drive control circuit 623 is controlled by the erroneous operation preventing circuit 655 and thus when the second stepping motor 406-3 has not been driven by the normal pulse Pm, for a long time, the driving operation by high speed rotation or reverse rotation is tentatively stopped and the driving operation is switched to multi-load compensation operation by the normal pulse Pm with 16 Hz which is the maximum speed under which the normal pulse Pm can be driven in the multi-load compensation operation.

Accordingly, under this operation mode, a suitable normal pulse Pm for a current driving condition is selected and a suitable high speed pulse Pf or a suitable reverse rotation pulse Pb is again selected by the normal pulse Pm to thereby the driving operation can be restarted.

The circuit operation thereabout will be explained hereunder.

At every time when a one pulse of either the high speed pulse Pf or the reverse rotation pulse Pb, i.e., non-normal pulse, is output from the minute hand drive control circuit 623, a signal H is output.

The erroneous operation preventing circuit 655 is counting the number of signal H generated from the minute hand drive control circuit 623. And when the number thereof reaches at 2000, the erroneous operation preventing circuit 655 controls the the minute hand drive control circuit 623 to stop the generation of any one of the high speed pulse Pf or the reverse rotation pulse Pb and select and output the normal pulse Pm the frequency thereof being 16 Hz and which is output from the second normal pulse selection circuit 612, instead.

And simultaneously, the erroneous operation preventing circuit 655 controls the second load compensation control circuit 622 to have second normal pulse selection circuit 612 selected the normal pulse Pm4 having a middle size among the normal pulses of Pm1~Pm8.

Further, the erroneous operation preventing circuit 655 controls the second load compensation control circuit 622 so that as mentioned above, in normal time, when the normal pulse Pm4 can drive the motor in successive 100 times, the normal pulse Pm4 is changed to the normal pulse Pm3 having a voltage one level below that of the normal pulse Pm4, but in this case, when once the normal pulse Pm4 can drive the motor, the pulse Pm4 is just change to the normal pulse Pm2 having a voltage level two levels below the that of the normal pulse Pm4 and output same.

On the other hand, when the normal pulse Pm2 can not drive the motor, it is considered that the normal pulse Pm4 or Pm3 would be a suitable normal pulse Pm under this circumstance and thus as shown in the Table 6, the high speed pulse Pf2 and the reverse rotation pulse Pb2 are suitable high speed pulse Pf and reverse rotation pulse Pb under these circumstance.

Therefore, the erroneous operation preventing circuit 655 controls the minute hand drive control circuit 623 to restart to drive the motor with the high speed pulse Pf2 or the reverse rotation pulse Pb2.

And when the motor can be driven by the normal pulse Pm2, it is considered that the normal pulse Pm2 or Pm1 would be a suitable normal pulse Pm under this circumstance and thus as shown in the Table 6, the high speed pulse Pf1 and the reverse rotation pulse Pb1 are suitable high speed pulse Pf and reverse rotation pulse Pb under these circumstance.

Accordingly, the erroneous operation preventing circuit 655 controls the minute hand drive control circuit 623 to restart to drive the motor with the high speed pulse Pf1 or the reverse rotation pulse Pb1.

And when the normal pulse Pm4 which was first output, cannot drive the motor, the compensation drive pulse Pmh is output so as compensately drive the motor and then the normal pulse Pm6 having voltage two levels up compared with the same of the normal pulse generated previously.

When the motor can be driven by the normal pulse Pm6, it is considered that the normal pulse Pm6 or Pm5 would be a suitable normal pulse Pm under this circumstance and thus as shown in the Table 6, the high speed pulse Pf3 and the reverse rotation pulse Pb3 are suitable high speed pulse Pf and reverse rotation pulse Pb under these circumstance.

Accordingly, the erroneous operation preventing circuit 655 controls the minute hand drive control circuit 623 to restart to drive the motor with the high speed pulse Pf3 or the reverse rotation pulse Pb3.

And when the normal pulse Pm6 cannot drive the motor, it is considered that the normal pulse Pm7 or Pm8 would be a suitable normal pulse Pm under this circumstance and thus as shown in the Table 6, the high speed pulse Pf4 and the reverse rotation pulse Pb4 are suitable high speed pulse Pf and reverse rotation pulse Pb under these circumstance.

Accordingly, the erroneous operation preventing circuit 655 controls the minute hand drive control circuit 623 to restart to drive the motor with the high speed pule Pf4 or the reverse rotation pulse Pb4.

In this circumstance, number of the high speed pulse Pf is reduced to the extent that the motor is driven by the normal pulse Pm and the number of the reverse rotation pulse Pb is increased to the extent that the motor is driven by the normal pulse Pm, so that the timekeeping operation can be maintain in a correct condition.

On the other hand, at every when one pulse of the normal pulse Pm is output, a signal J is output.

The erroneous operation preventing circuit 655 monitors time duration measured from the time when the J signal was output to the time when the next J signal will be output and when such time duration in that no signal J is output, exceeds one hour, the erroneous operation preventing circuit 655 controls the minute hand drive control circuit 623 and the second load compensation control circuit 622 to stop the drive of the motor by the high speed pulse Pf and reverse rotation pulse Pb and to select a suitable normal pulse Pm through the multi-load compensation operation. And further, after when the high speed pulse Pf and reverse rotation pulse Pb are selected, the driving operation will be restarted with such the high speed pulse Pf and reverse rotation pulse Pb.

As explained above, the operations as mentioned above, can effectively compensate the reduction in voltage due to the continuous driving operation by the high speed pulse Pf and reverse rotation pulse Pb or due to the discharge of the electric two-layered condenser 570 during a time in that no normal pulse Pm is output for long time.

In the examples as mentioned above, the second stepping motor 406-3 and the first stepping motor 406-1 are provided independently though, the controlling method of the second stepping motor 406-3 is the same manner as used in the first stepping motor 406-1.

On the other hand, in the present invention, both motors can be combined into one motor to control it under the same method.

As explained above, even in an electric watch the voltage of the power source can be varied, high speed rotation and reverse rotation can be carried out by taking a multi-load compensation operation in that a non-normal pulse having a voltage range capable of driving the motor corresponding to a minimum voltage level of the selected normal pulse, is selectively output.

Accordingly, even in an electric watch, such as a solar watch, in which a power source voltage of which is easily varied, an alarm function of chronographical function can be installed therein and thus the width of the commercial goods can be expanded.

Namely, even a third stepping motor 406-2 which is usually stopped and cannot operate the multi-load compensation operation so that the driving condition thereof being indefinite, the driving condition thereof can be estimated by a normal pulse used in the other stepping motor always driven by carrying out the multi-load compensation operation such as the first stepping motor 406-1 and thus it can be accurately driven by a non-normal pulse which was determined as a suitable one.

Accordingly, a solar battery driven watch having a high speed rotational function such as a chronographical function can be provided.

More over, as in the second stepping motor 406-3, when a non-normal pulse is determined by a normal pulse used in the same stepping motor, not only a voltage condition but also a load condition are took into account, and thus this conception can be applied to a stepping motor in which load can in varied.

Further, the present invention can provide a solar battery driven watch in which the hour/minut hand having a calender load, can be accurately driven with high speed rotation or reverse rotation and also provided with an alarm function.

In these embodiments as mentioned above, although, the explanation had been made to an electronic watch having hands working by re-chagerable battery which can show a remarkable effect thereof, it is apparent that the present invention can be applied to an electronic watch having hands working by normal mercury battery or lithium battery as a power source and the same effect as explained in the above-mentioned embodiments can obtained.

What is claimed is:

1. An electronic watch comprising:

a power supply;

an oscillator circuit;

means for generating a drive pulse;

a drive motor which drives a hand, in response to a drive pulse output from said drive pulse generating means;

drive circuit means for controlling drive of said motor;

means for controlling said drive circuit means; and means, connected to said drive circuit control means, for detecting a control condition in said drive circuit control means, said control condition detection means being provided with, a first non-proper condition detecting means for detecting a non-proper condition of said drive motor, which sense an occurrence of a condition in which proper drive of said drive motor is not possible under a prescribed condition, a first instructing means for instructing a change of a control mode which instructs said drive circuit control means to change the control mode that is currently being executed, in response to said detection signal output from said first non-proper condition detecting means, a second non-proper condition detecting means for detecting a non-proper condition of said drive motor, which sense an occurrence of a condition in which proper drive of said drive motor is not possible under a prescribed condition even after the control mode had been changed for a predetermined period, and a second instructing means for instructing a change of a control mode which instructs said drive circuit control means to change the currently executed control mode instructed by said second non-proper condition detecting means, to the original control mode when a non-proper condition of said drive motor has been detected within said predetermined period, which instructs said drive circuit control means to change the currently executed control mode instructed by said second non-proper condition detecting means, to further separate control mode when non-proper condition of said drive motor has been detected within said predetermined period.

2. An electronic watch according to claim 1, wherein said drive pulse generation means comprises a group of drive pulse generation circuits which generate a plurality of types of drive pulses, said group including a normal hand-drive pulse generation circuit which generates a drive pulse for normal hand drive based on a prescribed frequency generated from said oscillator circuit.

3. An electronic watch according to claim 1, wherein aid control mode change instructing means, in response to a detection signal of said non-proper condition detection means, outputs an instruction to said drive circuit control means so as to stop the control mode which is currently being executed.

4. An electronic watch according to claim 1, wherein said control mode change instructing means, in response to a detection signal of said non-proper condition detection means, outputs an instruction to said drive circuit control means so as to change control mode which is currently being executed to another control mode.

5. An electronic watch according to claim 1, wherein said control mode change instructing means, in response to a detection signal of said non-proper condition detection means, outputs an instruction to said drive circuit control means so as to replace a drive pulse used in the control mode currently being executed to a another drive pulse.

6. An electronic watch comprising:

a power supply;

an oscillator circuit;

means for generating a drive pulse;

a drive motor which drives a hand, in response to a drive pulse output from said drive pulse generating means;

drive circuit means for controlling drive of said motor;

means for controlling said drive circuit means; and means, connected to said drive circuit control means, for detecting a control condition in said drive circuit control means, said drive pulse generation means including at least a normal hand-drive pulse generating circuit, a fast-forward (high-speed) pulse generation circuit which generates a fast-forward pulse in response to an operation of an external operating element, a reverse-rotation pulse generating circuit which generates a reverse-rotation pulse in response to an operation of an external operating element, and said control condition detection means being provided with means for detecting a non-proper condition, and with a control mode change instructing circuit which, in response to an output signal of said non-proper condition detection means, causes a drive output signal output from each one of said pulse generation circuits to selectively pass, wherein in response to a discrimination signal output from said non-proper condition detection circuit, said mode change instructing circuit prohibits said drive circuit control means from passing a reverse-rotation pulse.

7. An electronic watch according to claim 6, wherein said non-proper condition detection means comprising a voltage level discrimination circuit that detects the voltage level of said power supply, and said drive pulse generation means is provided with a low-voltage fast-forward pulse generating means that generates a low-voltage fast-forward pulse which has a width that is greater than said fast-forward pulse, and wherein when said power supply voltage is outside of a prescribed voltage range, in response to a discrimination signal output from said non-proper condition detection circuit, said mode change instructing circuit permits said drive circuit control means to pass a reverse-rotation pulse.

8. An electronic watch comprising:

a power supply;

an oscillator circuit;

means for generating a drive pulse;

a drive motor which drives a hand in response to a drive pulse output from said drive pulse generating means;

drive circuit means for controlling drive of said motor;

means for controlling said drive circuit means; and means, connected to said drive circuit control means, for detecting a control condition in said drive circuit control means, said drive pulse generating means including at least a normal hand-drive pulse generating circuit, a compensation drive pulse generation circuit, and a fast-forward (high-speed) pulse generation circuit, said drive motor and said motor drive circuit means comprising a first drive motor which is driven by said normal hand-drive pulse, a first driving circuit means, a second drive motor driven by high speed pulse having higher driving speed than said normal hand drive pulse and a second driving circuit means, said drive circuit control means including a load compensation control system which detects whether or not said first drive motor rotated in response to a prescribed drive pulse which is supplied by said first drive circuit means and in the case in which a judgement is made than the first drive motor did not rotate, which supplies a prescribed compensation drive pulse to said first drive circuit means, thereby compensating the rotation of the first drive motor, and said control condition circuit means being provided with a non-proper condition detection means comprising a monitor circuit which monitors a rotating condition of the second drive motor, and being further provided with a control mode change instructing means which, in response to a detection signal which indicates the rotation condition of said second drive motor, stops execution of the load compensation system for said first drive motor.

9. An electronic watch according to claim 8, wherein in the case in which said control mode change instructing means stops the execution of the load compensation system with respect to said first drive motor by means of a detection signal from said non-proper condition detection means, said compensation drive pulse is supplied to said first drive motor.

10. An electronic watch comprising:

a power supply;

an oscillator circuit;

means for generating a drive pulse;

a drive motor which drives a hand, in response to a drive pulse output from said drive pulse generating means;

drive circuit means for controlling drive of said motor;

means for controlling said drive circuit means; and means, connected to said drive circuit control means, for detecting a control condition in said drive circuit control means, said drive pulse generating means including at least a normal hand-drive pulse generation circuit which generates a normal hand-drive pulse and a non-normal drive pulse generation circuit which generates a non-normal hand-drive pulse that differs from the normal hand-drive pulse, and also comprising a first drive motor which is driven by said normal hand-drive pulse, a first drive circuit means, a second drive motor which is driven by said non-normal hand-drive pulse and a second drive circuit means, and configured so that, from said normal hand-drive pulse generation circuit and non-normal hand-drive pulse generation circuit, a plurality of normal hand-drive pulses and compensation pulse having mutually differing drive capacities, and a plurality of non-normal hand-drive pulses and compensation pulses having mutually differing drive capacities are individually output, said drive circuit control means including a load compensation control system which detects whether or not said first drive motor rotated in response to a prescribed drive pulse which is supplied by said first drive circuit means and in the case in which a judgement is made that the first drive motor did not rotate, which supplies a prescribed compensation drive pulse to said first drive circuit means, thereby compensating the rotation of the first drive motor, and said control condition detection means being provided with, a non-proper condition detection means which outputs predicted voltage information from said power supply voltage in said load compensation control system, and with a control mode change instructing means comprising a selection circuit which, based on the information of said non-proper condition detection means, selects at least one drive pulse from at least one drive pulse group of the normal hand-drive pulse group and non-normal hand-drive pulse group which are output from said normal hand-drive pulse generation circuit and said non-normal hand-drive pulse generation circuit.

11. An electronic watch according to claim 10, wherein said drive circuit control means includes a loae compensation control system in which after when the rotation of said first motor has been detected by changing a drive pulse for said first motor was changed, a second pulse is changed.

12. An electronic watch according to claim 10, wherein said first drive motor and said second drive motor are one and the same drive motor.

13. An electronic watch according to claim 10, wherein said non-normal hand-drive pulse generation circuit is a high-speed pulse generation circuit.

14. An electronic watch according to claim 10, wherein said non-normal hand-drive pulse generation circuit is a reverse-rotation pulse generation circuit.

15. An electronic watch comprising:

a power supply;

an oscillator circuit;

means for generating a drive pulse, comprising a group of drive pulse generation circuits which generate a plurality of types of drive pulses, said group including a normal hand-drive pulse generation circuit which generates a drive pulse for normal hand drive based on a prescribed frequency generated from said oscillator circuit, and at least one drive pulse generation circuit selected from the group comprising a compensation drive pulse generation circuit, a pulse generation circuit for a rotation detection signal of said drive motor, a low-voltage hand-drive pulse generation circuit, a fast-forward (high-speed) pulse generation circuit, a low-voltage fast-forward pulse generation circuit, a reverse-rotation pulse generation circuit, and a functional hand drive high-speed rotation pulse generation circuit;

a drive motor which drives at least one of an hour/minute hand, a second hand, or a functional hand, in response to a drive pulse output from said drive pulse generating means;

drive circuit means for controlling drive of said motor;

means for controlling said drive circuit means; and means, connected to said drive circuit control means, for detecting a control condition in said drive circuit control means, said control condition detection means being provided with, means for detecting a non-proper condition which sense an occurrence of a condition in which proper drive of said drive motor is not possible under a prescribed condition, and means for instructing a change of a control mode which instructs said drive circuit control means to change the control mode that is currently being executed, in response to said detection signal output from said non-proper condition detecting means.

16. An electronic watch according to claim 15, wherein one pulse generation circuit which is selected from at least a normal hand-drive pulse generation circuit, a fast-forward (high-speed) pulse generation circuit, a reverse-rotation pulse generation circuit, and a functional hand drive high-speed rotation pulse generation circuit which are included in said drive pulse generation means further comprises individual pulse generation circuits which generate a plurality of types of drive pulses having mutually differing drive capacities.

17. An electronic watch according to claim 15, wherein said compensation drive pulse generation means includes one pulse generation circuit selected from said normal hand-drive pulse generation circuit, said fast-forward (high-speed) pulse generation circuit, said reverse-rotation pulse generation circuit, and said functional hand drive high-speed rotation pulse generation circuit.

18. An electronic watch comprising:

a power supply;

an oscillator circuit;

means for generating a drive pulse;

a drive motor which drives at least one of an hour/minute hand, a second hand, or a functional hand, in response to a drive pulse output from said drive pulse generating means;

drive circuit means for controlling drive of said motor;

means for controlling said drive circuit means, including a load compensation control system which detects whether or not said drive motor rotated in response to a prescribed drive pulse supplied by said drive circuit means, and if a judgement is made that said drive motor did not rotate, supplies a prescribed compensation drive pulse to said drive circuit means, thereby compensating the rotation of said drive motor; and means, connected to said drive circuit control means, for detecting a control condition in said drive circuit control means, said control condition detection means being provided with, means for detecting a non-proper condition which sense an occurrence of a condition in which proper drive of said drive motor is not possible under a prescribed condition, and means for instructing a change of a control mode which instructs said drive circuit control means to change the control mode that is currently being executed, in response to said detection signal output from said non-proper condition detecting means.

19. An electronic watch comprising:

a power supply;

an oscillator circuit;

means for generating a drive pulse;

a drive motor which drives at least one of an hour/minute hand, a second hand, or a functional hand, in response to a drive pulse output from said drive pulse generating means;

drive circuit means for controlling drive of said motor;

means for controlling said drive circuit means; and means, connected to said drive circuit control means, for detecting a control condition in said drive circuit control means, said control condition detection means being provided with, means for detecting a non-proper condition which sense an occurrence of a condition in which proper drive of said drive motor is not possible under a prescribed condition, including means for detecting a voltage level of said power supply, and means for instructing a change of a control mode which instructs said drive circuit control means to change the control mode that is currently being executed, in response to said detection signal output from said non-proper condition detecting means.

20. An electronic watch comprising:

a power supply;

an oscillator circuit;

means for generating a drive pulse;

a drive motor which drives at least one of an hour/minute hand, a second hand, or a functional hand, in response to a drive pulse output from said drive pulse generating means;

drive circuit means for controlling drive of said motor;

means for controlling said drive circuit means; and means, connected to said drive circuit control means, for detecting a control condition in said drive circuit control means, said control condition detection means being provided with, means for detecting a non-proper condition which sense an occurrence of a condition in which proper drive of said drive motor is not possible under a prescribed condition, including a second motor which is positioned adjacent to said motor, and means for detecting a drive condition of the second motor with respect to which prescribed drive control is being executed, and means for instructing a change of a control mode which instructs said drive circuit control means to change the control mode that is currently being executed, in response to said detection signal output from said non-proper condition detecting means.

21. An electronic watch comprising:

a power supply;

an oscillator circuit;

means for generating a drive pulse;

a drive motor which drives at least one of an hour/minute hand, a second hand, or a functional hand, in response to a drive pulse output from said drive pulse generating means;

drive circuit means for controlling drive of said motor;

means for controlling said drive circuit means; and means, connected to said drive circuit control means, for detecting a control condition in said drive circuit control means, said control condition detection means being provided with, means for detecting a non-proper condition which sense an occurrence of a condition in which proper drive of said drive motor is not possible under a prescribed condition, including means for detecting a predicted voltage level of said power supply which is recognized by a load compensation control system, and means for instructing a change of a control mode which instructs said drive circuit control means to change the control mode that is currently being executed, in response to said detection signal output from said non-proper condition detecting means.

22. An electronic watch comprising:

a power supply, wherein an output voltage of said power supply changes with the passage of time;

an oscillator circuit;

means for generating a drive pulse;

a drive motor which drives at least one of an hour/minute hand, a second hand, or a functional hand, in response to a drive pulse output from said drive pulse generating means;

drive circuit means for controlling drive of said motor;

means for controlling said drive circuit means; and means, connected to said drive circuit control means, for detecting a control condition in said drive circuit control means, said control condition detection means being provided with, means for detecting a non-proper condition which sense an occurrence of a condition in which proper drive of said drive motor is not possible under a prescribed condition, and means for instructing a change of a control mode which instructs said drive circuit control means to change the control mode that is currently being executed, in response to said detection signal output from said non-proper condition detecting means.

23. An electronic watch according to claim 22, wherein said power supply comprises one type selected from a secondary battery, and a large capacitance condenser.

* * * * *

UNITED STATES PATENT AND TRADEMARK OFFICE
CERTIFICATE OF CORRECTION

PATENT NO. : 5,933,392
DATED : August 3, 1999
INVENTOR(S) : Koichi Sato, et al.

It is certified that error appears in the above-identified patent and that said Letters Patent is hereby corrected as shown below:

Column 1, Line 20: "top" should read --to--

Column 2, Line 41-42: "The coil switching pulse Pk1 is from Pk2 are sequentially output." should read --The coil switching pulse Pk1 is output approximately 6 ms after the normal drive pulse P1. from Pk2 sequentially output.--

Column 2, Line 67: "form" should read --from--

Column 3, Line 14" this repeated" should read --this is repeated--

Column 4, Line 60: "O2" should read --O1--

Column 6, Line 4: "the" should read --The--

Column 9, Line 22: "as" should read --was--

Column 12, Line 12: "Specially" should read --Specifically--

Column 13, Line 4: "dour" should read --four--

Column 15, Line 37: "property" should read --properly--

Column 17, Line 14: "form" should read --from--

UNITED STATES PATENT AND TRADEMARK OFFICE

CERTIFICATE OF CORRECTION

PATENT NO. : 5,933,392

DATED : August 3, 1999

INVENTOR(S) : Koichi Sato, et al.

It is certified that error appears in the above-identified patent and that said Letters Patent is hereby corrected as shown below:

Column 17, Line 41: "408" should read --405--

Column 17, Line 51: "410" should read --401--

Column 18, Line 55: "pules" should read --pulse--

Column 19, Line 65: "an-channel" should read --n-channel--

Column 22, Line 33: "82" should read --S2--

Column 23, Line 26: "drove" should read --drive--

Column 26, Line 52: "At" should read --at--

Column 26, Line 64: "fro" should read --from--

Column 27, Line 32: "suing" should read --using--

Column 28, Line 33: "gruop" should read --group--

Column 29, Line 41: "dives" should read --drives--

Column 31, Line 23: "form" should read --from--

Column 32, Line 41: "Pa1~Pa8" should read --Ps1~Ps8--

UNITED STATES PATENT AND TRADEMARK OFFICE
CERTIFICATE OF CORRECTION

PATENT NO. : 5,933,392
DATED : August 3, 1999
INVENTOR(S) : Koichi Sato, et al.

It is certified that error appears in the above-identified patent and that said Letters Patent is hereby corrected as shown below:

Column 34, Line 20: "same" should read --sake--

Column 34, Line 32: "1-3" should read --1^3--

Column 36, Line 50: "614" should read --624--

Column 38, Line 23: "ti" should read --it--

Column 40, Line 6: "pulse Pc." should read --pulse selection circuit 611 and not performing switching of the high- speed pulse Pc.--

Column 40, Line 12: "selected" should read --selects--

Column 41, Lines 10 and 11: "th is" should read --this--

Column 44, Line 2: "simultaneouslyy" should read --simultaneously--

Column 44, Line 7: "lad" should read --load--

Column 44, Line 53: "data" should read --date--

Column 44, Line 54: "Vo" should read --Vc--

Column 46, Line 6: "compasation" should read --compensation--

UNITED STATES PATENT AND TRADEMARK OFFICE

CERTIFICATE OF CORRECTION

PATENT NO. : 5,933,392

DATED : August 3, 1999

INVENTOR(S) : Koichi Sato, et al.

It is certified that error appears in the above-identified patent and that said Letters Patent is hereby corrected as shown below:

Column 46, Line 16: "motre" should read --motor--

Column 46, Line 25: "motre" should read --motor--

Column 46, Line 26: "Vo" should read --Vc--

Column 46, Line 43: "vo" should read --Vc--

Column 46, Line 50: "motre" should read --motor--

Column 47, Line 5: "motre" should read --motor--

Column 46, Line 50: "motre" should read --motor--

UNITED STATES PATENT AND TRADEMARK OFFICE

CERTIFICATE OF CORRECTION

PATENT NO. : 5,933,392

DATED : August 3, 1999

INVENTOR(S) : Koichi Sato et al.

It is certified that error appears in the above-identified patent and that said Letters Patent is hereby corrected as shown below:

Column 47, Line 5: "motre" should read --motor--

Column 50, Line 14: "minut" should read --minute--

Column 50, Line 20: "re-chagerable" should read --re-chargeable--

Column 50, Line 41: "lode" should read --load--

Signed and Sealed this

Twenty-seventh Day of February, 2001

*Attest:*

NICHOLAS P. GODICI

*Attesting Officer*

*Acting Director of the United States Patent and Trademark Office*